United States Patent
Asamura et al.

(10) Patent No.: US 7,146,044 B2
(45) Date of Patent: Dec. 5, 2006

(54) COLOR CONVERSION DEVICE AND METHOD

(75) Inventors: Masako Asamura, Tokyo (JP); Shuichi Kagawa, Tokyo (JP); Yoshiko Hatano, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 360 days.

(21) Appl. No.: 10/862,461

(22) Filed: Jun. 8, 2004

(65) Prior Publication Data

US 2004/0223642 A1 Nov. 11, 2004

Related U.S. Application Data

(60) Division of application No. 09/349,946, filed on Jul. 8, 1999, now Pat. No. 6,766,049, which is a continuation of application No. 09/312,712, filed on May 17, 1999, now Pat. No. 6,125,202, which is a division of application No. 08/925,082, filed on Sep. 8, 1997, now Pat. No. 5,917,959, which is a division of application No. 08/667,931, filed on Jun. 24, 1996, now Pat. No. 5,729,636, which is a division of application No. 08/600,204, filed on Feb. 12, 1996, now Pat. No. 5,588,050, which is a continuation of application No. 08/292,012, filed on Aug. 18, 1994, now abandoned.

(30) Foreign Application Priority Data

Jul. 10, 1998 (JP) .................................. 10-195931

(51) Int. Cl.
*G06K 9/00* (2006.01)
*G06K 9/36* (2006.01)
*G06K 9/46* (2006.01)
*G06K 9/40* (2006.01)

(52) U.S. Cl. ........................ 382/167; 382/162; 382/232

(58) Field of Classification Search ................ 382/162, 382/167, 274, 232; 358/455, 461, 518, 520, 358/523
See application file for complete search history.

(56) References Cited

U.S. PATENT DOCUMENTS

| | | | |
|---|---|---|---|
| 4,639,770 A | 1/1987 | Jung et al. | |
| 4,665,435 A | 5/1987 | Miura | |
| 4,740,833 A | 4/1988 | Shiota et al. | |
| 4,887,150 A | 12/1989 | Chiba et al. | |
| 4,989,079 A | 1/1991 | Ito | |
| 5,233,412 A | 8/1993 | Nishihara | |
| 5,315,416 A * | 5/1994 | Taniuchi et al. | ............ 358/537 |
| 5,343,312 A | 8/1994 | Hibi et al. | |

(Continued)

FOREIGN PATENT DOCUMENTS

EP 1028586 A3 8/2000

(Continued)

*Primary Examiner*—Yon J. Couso
(74) *Attorney, Agent, or Firm*—Birch, Stewart, Kolasch & Birch, LLP

(57) ABSTRACT

A color conversion device and method are provided in which six hues and inter-hue areas are corrected independently, and the conversion characteristics can be changed flexibly, and which does not require a large-capacity memory. Coefficients of second-order and first-order calculation terms relating to the respective hues, first-order calculation term using comparison-result data relating to the respective inter-hue areas, and product terms based on the comparison-result data and the hue data are changed so as to change the target hue or inter-hue area, without influencing other hues or inter-hue areas.

4 Claims, 40 Drawing Sheets

U.S. PATENT DOCUMENTS

| | | | |
|---|---|---|---|
| 5,436,733 A | 7/1995 | Terada et al. | |
| 5,588,050 A | 12/1996 | Kagawa et al. | |
| 5,633,953 A * | 5/1997 | Kouzaki | 382/167 |
| 5,659,406 A | 8/1997 | Imao et al. | |
| 5,729,636 A | 3/1998 | Kagawa et al. | |
| 5,809,213 A | 9/1998 | Bhattacharjya | |
| 5,933,252 A | 8/1999 | Emori et al. | |
| 5,963,201 A * | 10/1999 | McGreggor et al. | 715/722 |
| 6,434,268 B1 | 8/2002 | Asamura et al. | |
| 6,621,497 B1 | 9/2003 | Sugiura et al. | |
| 2001/0003456 A1 | 6/2001 | Kagawa et al. | |
| 2001/0003543 A1 | 6/2001 | Kagawa et al. | |

FOREIGN PATENT DOCUMENTS

| | | |
|---|---|---|
| GB | 2050751 A | 1/1981 |
| JP | 6339188 | 8/1988 |
| JP | 63227181 | 9/1988 |
| JP | 230226 | 7/1990 |
| JP | 548885 | 2/1993 |
| JP | 5-183742 | 7/1993 |
| JP | 7170404 | 7/1995 |
| JP | 8-321964 | 12/1996 |
| JP | 11-17974 | 1/1999 |
| JP | 11-308472 | 11/1999 |

* cited by examiner

FIG.3

| IDENTIFICATION CODE S1 | MAXIMUM $\beta$ | MINIMUM $\alpha$ | HUE DATA WHICH IS ZERO* |
|---|---|---|---|
| 0 | Ri | Gi | g、c |
| 1 | Ri | Bi | b、c |
| 2 | Gi | Ri | r、m |
| 3 | Gi | Bi | b、m |
| 4 | Bi | Ri | r、y |
| 5 | Bi | Gi | g、y |

*$r = Ri - \alpha$、$g = Gi - \alpha$、$b = Bi - \alpha$
$y = \beta - Bi$、$m = \beta - Gi$、$c = \beta - Ri$

FIG.4

| IDENTIFICATION CODE S1 | Q1 | Q2 | P1 | P2 |
|---|---|---|---|---|
| 0 | r | b | m | y |
| 1 | r | g | y | m |
| 2 | g | b | c | y |
| 3 | g | r | y | c |
| 4 | b | g | c | m |
| 5 | b | r | m | c |

$Q1 \geqq Q2$、$P1 \geqq P2$

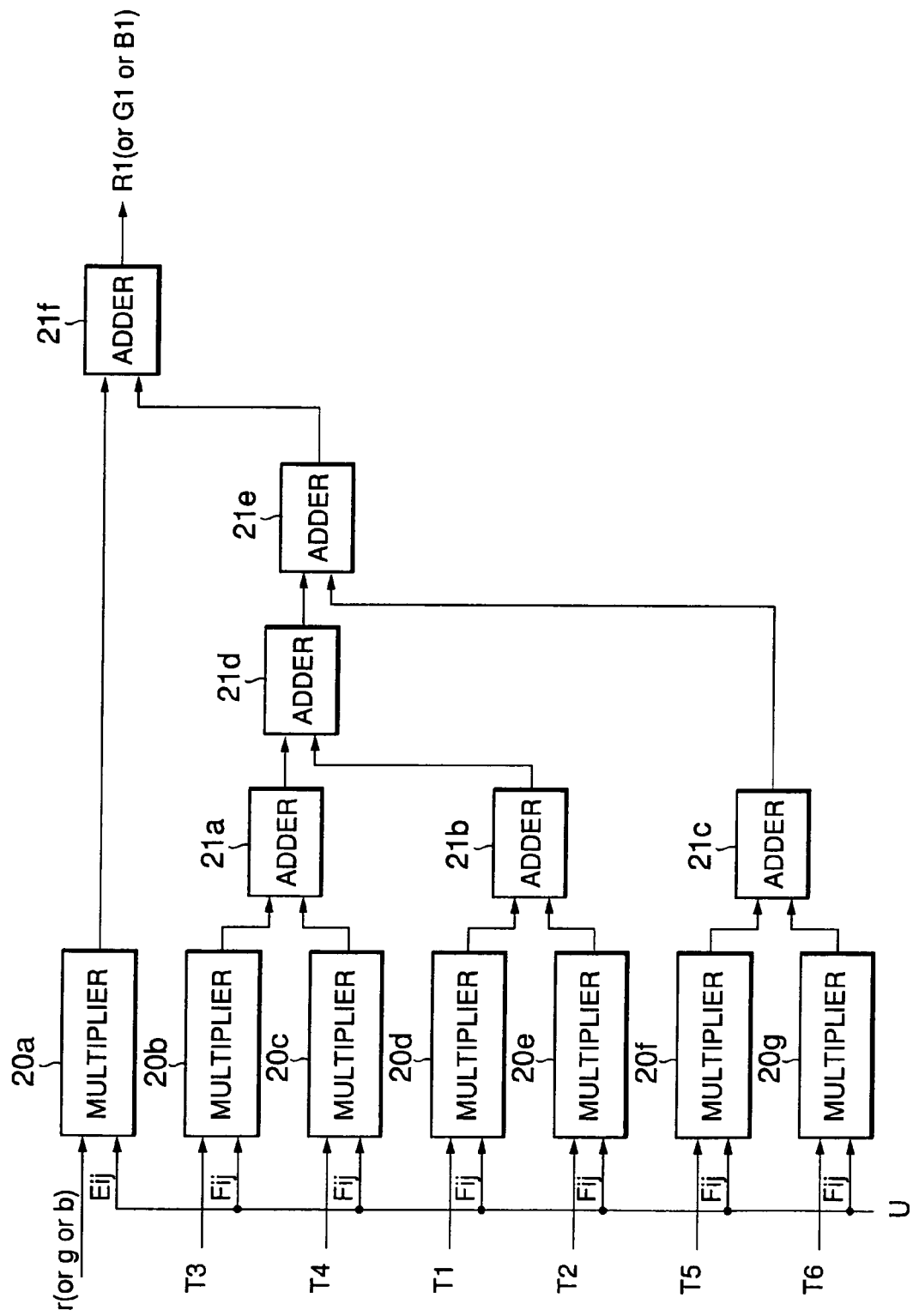

FIG.11A

| HUE | EFFECTIVE SECOND-ORDER TERM | EFFECTIVE FIRST-ORDER TERM |
|---|---|---|
| RED | m✕y | m✕y/(m+y) |
| GREEN | y✕c | y✕c/(y+c) |
| BLUE | c✕m | c✕m/(c+m) |
| CYAN | g✕b | g✕b/(g+b) |
| MAGENTA | b✕r | b✕r/(b+r) |
| YELLOW | r✕g | r✕g/(r+g) |

FIG.11B

| HUE | EFFECTIVE FIRST-ORDER TERM USING COMPARISON-RESULT DATA | EFFECTIVE SECOND-ORDER TERM USING COMPARISON-RESULT DATA |
|---|---|---|
| RED-YELLOW | min(r,hry) | r✕hry |
| YELLOW-GREEN | min(g,hgy) | g✕hgy |
| GREEN-CYAN | min(g,hgc) | g✕hgc |
| CYAN-BLUE | min(b,hbc) | b✕hbc |
| BLUE-MAGENTA | min(b,hbm) | b✕hbm |
| MAGENTA-RED | min(r,hrm) | r✕hrm |

T1=P1×P2  T3=Q1×Q2  T5=min(Q1,min(aq×Q2,ap×P2))

$T2=\dfrac{P1\times P2}{P1+P2}$  $T4=\dfrac{Q1\times Q2}{Q1+Q2}$  T6'=P1×min(aq×Q2,ap×P2)

FIG.18A

| HUE | EFFECTIVE SECOND-ORDER TERM | EFFECTIVE FIRST-ORDER TERM |
|---|---|---|
| RED | m×y | m×y/(m+y) |
| GREEN | y×c | y×c/(y+c) |
| BLUE | c×m | c×m/(c+m) |
| CYAN | g×b | g×b/(g+b) |
| MAGENTA | b×r | b×r/(b+r) |
| YELLOW | r×g | r×g/(r+g) |

FIG.18B

| HUE | EFFECTIVE FIRST-ORDER TERM USING COMPARISON-RESULT DATA | EFFECTIVE SECOND-ORDER TERM USING COMPARISON-RESULT DATA |
|---|---|---|
| RED-YELLOW | min(r,hry) | y×hry |
| YELLOW-GREEN | min(g,hgy) | y×hgy |
| GREEN-CYAN | min(g,hgc) | c×hgc |
| CYAN-BLUE | min(b,hbc) | c×hbc |
| BLUE-MAGENTA | min(b,hbm) | m×hbm |
| MAGENTA-RED | min(r,hrm) | m×hrm |

$T1 = P1 \times P2$  $T3 = Q1 \times Q2$  $T5' = \min(P1, \min(aq \times Q2, ap \times P2))$ $T2 = \dfrac{P1 \times P2}{P1 + P2}$  $T4 = \dfrac{Q1 \times Q2}{Q1 + Q2}$  $T6' = P1 \times \min(aq \times Q2, ap \times P2)$

FIG.21A

| HUE | EFFECTIVE SECOND-ORDER TERM | EFFECTIVE FIRST-ORDER TERM |
|---|---|---|
| RED | m×y | m×y/(m+y) |
| GREEN | y×c | y×c/(y+c) |
| BLUE | c×m | c×m/(c+m) |
| CYAN | g×b | g×b/(g+b) |
| MAGENTA | b×r | b×r/(b+r) |
| YELLOW | r×g | r×g/(r+g) |

FIG.21B

| HUE | EFFECTIVE FIRST-ORDER TERM USING COMPARISON-RESULT DATA | EFFECTIVE SECOND-ORDER TERM USING COMPARISON-RESULT DATA |
|---|---|---|
| RED-YELLOW | min(y,hry) | y×hry |
| YELLOW-GREEN | min(y,hgy) | y×hgy |
| GREEN-CYAN | min(c,hgc) | c×hgc |
| CYAN-BLUE | min(c,hbc) | c×hbc |
| BLUE-MAGENTA | min(m,hbm) | m×hbm |
| MAGENTA-RED | min(m,hrm) | m×hrm |

T1=P1×P2   T3=Q1×Q2   T5'=min(P1,min(aq×Q2,ap×P2))

$T2=\dfrac{P1\times P2}{P1+P2}$   $T4=\dfrac{Q1\times Q2}{Q1+Q2}$   T6=P1×min(aq×Q2,ap×P2)

FIG.23A

| HUE | EFFECTIVE SECOND-ORDER TERM | EFFECTIVE FIRST-ORDER TERM |
|---|---|---|
| RED | m×y | m×y/(m+y) |
| GREEN | y×c | y×c/(y+c) |
| BLUE | c×m | c×m/(c+m) |
| CYAN | g×b | g×b/(g+b) |
| MAGENTA | b×r | b×r/(b+r) |
| YELLOW | r×g | r×g/(r+g) |

FIG.23B

| HUE | EFFECTIVE FIRST-ORDER TERM USING COMPARISON-RESULT DATA | EFFECTIVE SECOND-ORDER TERM USING COMPARISON-RESULT DATA |
|---|---|---|
| RED-YELLOW | min(y,hry) | r×hry |
| YELLOW-GREEN | min(y,hgy) | g×hgy |
| GREEN-CYAN | min(c,hgc) | g×hgc |
| CYAN-BLUE | min(c,hbc) | b×hbc |
| BLUE-MAGENTA | min(m,hbm) | b×hbm |
| MAGENTA-RED | min(m,hrm) | r×hrm |

T1=P1×P2   T3=Q1×Q2   T5=min(Q1,min(aq×Q2,ap×P2))

T7=min(P1,P2)   T8=min(Q1,Q2)   T6=Q1×min(aq×Q2,ap×P2)

FIG.28A

| HUE | EFFECTIVE SECOND-ORDER TERM | EFFECTIVE FIRST-ORDER TERM |
|---|---|---|
| RED | m✕y | min(m,y) |
| GREEN | y✕c | min(y,c) |
| BLUE | c✕m | min(c,m) |
| CYAN | g✕b | min(g,b) |
| MAGENTA | b✕r | min(b,r) |
| YELLOW | r✕g | min(r,g) |

FIG.28B

| HUE | EFFECTIVE FIRST-ORDER TERM USING COMPARISON-RESULT DATA | EFFECTIVE SECOND-ORDER TERM USING COMPARISON-RESULT DATA |
|---|---|---|
| RED-YELLOW | min(r,hry) | r✕hry |
| YELLOW-GREEN | min(g,hgy) | g✕hgy |
| GREEN-CYAN | min(g,hgc) | g✕hgc |
| CYAN-BLUE | min(b,hbc) | b✕hbc |
| BLUE-MAGENTA | min(b,hbm) | b✕hbm |
| MAGENTA-RED | min(r,hrm) | r✕hrm |

T1=P1×P2  T3=Q1×Q2  T5=min(Q1,min(aq×Q2,ap×P2))

T7=min(P1,P2)  T8=min(Q1,Q2)  T6'=P1×min(aq×Q2,ap×P2)

FIG.34A

| HUE | EFFECTIVE SECOND-ORDER TERM | EFFECTIVE FIRST-ORDER TERM |
|---|---|---|
| RED | m×y | min(m,y) |
| GREEN | y×c | min(y,c) |
| BLUE | c×m | min(c,m) |
| CYAN | g×b | min(g,b) |
| MAGENTA | b×r | min(b,r) |
| YELLOW | r×g | min(r,g) |

FIG.34B

| HUE | EFFECTIVE FIRST-ORDER TERM USING COMPARISON-RESULT DATA | EFFECTIVE SECOND-ORDER TERM USING COMPARISON-RESULT DATA |
|---|---|---|
| RED-YELLOW | min(r,hry) | y×hry |
| YELLOW-GREEN | min(g,hgy) | y×hgy |
| GREEN-CYAN | min(g,hgc) | c×hgc |
| CYAN-BLUE | min(b,hbc) | c×hbc |
| BLUE-MAGENTA | min(b,hbm) | m×hbm |
| MAGENTA-RED | min(r,hrm) | m×hrm |

T1=P1×P2  T3=Q1×Q2  T5'=min(P1,min(aq×Q2,ap×P2))

T7=min(P1,P2)  T8=min(Q1,Q2)  T6'=P1×min(aq×Q2,ap×P2)

FIG.36A

| HUE | EFFECTIVE SECOND-ORDER TERM | EFFECTIVE FIRST-ORDER TERM |
|---|---|---|
| RED | m✕y | min(m,y) |
| GREEN | y✕c | min(y,c) |
| BLUE | c✕m | min(c,m) |
| CYAN | g✕b | min(g,b) |
| MAGENTA | b✕r | min(b,r) |
| YELLOW | r✕g | min(r,g) |

FIG.36B

| HUE | EFFECTIVE FIRST-ORDER TERM USING COMPARISON-RESULT DATA | EFFECTIVE SECOND-ORDER TERM USING COMPARISON-RESULT DATA |
|---|---|---|
| RED-YELLOW | min(y,hry) | y✕hry |
| YELLOW-GREEN | min(y,hgy) | y✕hgy |
| GREEN-CYAN | min(c,hgc) | c✕hgc |
| CYAN-BLUE | min(c,hbc) | c✕hbc |
| BLUE-MAGENTA | min(m,hbm) | m✕hbm |
| MAGENTA-RED | min(m,hrm) | m✕hrm |

T1=P1×P2  T3=Q1×Q2  T5'=min(P1,min(aq×Q2,ap×P2))

T7=min(P1,P2)  T8=min(Q1,Q2)  T6=Q1×min(aq×Q2,ap×P2)

FIG.38A

| HUE | EFFECTIVE SECOND-ORDER TERM | EFFECTIVE FIRST-ORDER TERM |
|---|---|---|
| RED | m×y | min(m,y) |
| GREEN | y×c | min(y,c) |
| BLUE | c×m | min(c,m) |
| CYAN | g×b | min(g,b) |
| MAGENTA | b×r | min(b,r) |
| YELLOW | r×g | min(r,g) |

FIG.38B

| HUE | EFFECTIVE FIRST-ORDER TERM USING COMPARISON-RESULT DATA | EFFECTIVE SECOND-ORDER TERM USING COMPARISON-RESULT DATA |
|---|---|---|
| RED-YELLOW | min(y,hry) | r×hry |
| YELLOW-GREEN | min(y,hgy) | g×hgy |
| GREEN-CYAN | min(c,hgc) | g×hgc |
| CYAN-BLUE | min(c,hbc) | b×hbc |
| BLUE-MAGENTA | min(m,hbm) | b×hbm |
| MAGENTA-RED | min(m,hrm) | r×hrm |

COLOR CONVERSION DEVICE AND METHOD

This application claims priority under 35 U.S.C. §120 of prior application Ser. No. 09/349,946 filed on Jul. 8, 1999 now U.S. Pat. No. 6,766,049, which is a continuation of application Ser. No. 09/312,712 filed on May 17, 1999 (now U.S. Pat. No. 6,125,202), which is a divisional application of application Ser. No. 08/925,082 filed on Sep. 8, 1997 (now U.S. Pat. No. 5,917,959), which is a divisional application of application Ser. No. 08/667,931 filed on Jun. 24, 1996 (now U.S. Pat. No. 5,729,636), which is a divisional application of application Ser. No. 08/600,204 filed on Feb. 12, 1996 (now U.S. Pat No. 5,588,050), which is a continuation of application Ser. No. 08/292,012 filed on Aug. 18, 1994, which was abandoned.

BACKGROUND OF THE INVENTION

The present invention relates to data processing used for a full-color printing related equipment such as a printer, a video printer, or a scanner, an image processor for forming computer graphic images or a display device such as a monitor. More specifically, the invention relates to a color conversion device and a color conversion method for performing color conversion for image data of three colors of red, green and blue in accordance with the equipment used.

Color conversion in printing is an indispensable technology for compensating deterioration of image quality due to color mixing property due to the fact that the ink is not of a pure color, or the non-linearity (in the hue) of the image-printing, in order to output a printed image with a high color reproducibility. Also, in a display device such as a monitor or the like, color conversion is performed in order to output (display) an image having desired color reproducibility in accordance with conditions under which the device is used or the like when an inputted color signal is to be displayed.

Conventionally, two methods have been available for the foregoing color conversion: a table conversion method and a matrix calculation method.

In the table conversion method, image data of red, green and blue (referred to "R, G and B", hereinafter) are inputted to obtain image data of R, G and B stored beforehand in a memory such as ROM or complementary color data of yellow, magenta and cyan (referred to as "Y, M and C", hereinafter). Since an arbitrary conversion characteristic can be employed, this table conversion method has an advantageous in that color conversion can be effected with good color reproducibility.

However, in a simple structure for storing data for each combination of image data, a large-capacity memory of about 400 Mbit must be used. For example, even in the case of a compression method for memory capacity disclosed in Japanese Patent Kokai Publication No. S63-227181, memory capacity is about 5 Mbit. Therefore, a problem inherent in the table conversion system is that since a large-capacity memory is necessary for each conversion characteristic, it is difficult to implement the method by means of an LSI, and it is also impossible to deal with changes in the condition under which the conversion is carried out.

On the other hand, in the case of the matrix calculation method, for example, for obtaining printing data of Y, M and C from image data of R, G and B, the following formula (42) is used as a basic calculation formula.

$$\begin{bmatrix} Y \\ M \\ C \end{bmatrix} = (Aij) \begin{bmatrix} R \\ G \\ B \end{bmatrix} \quad (42)$$

Here, i=1 to 3, and j=1 to 3.

However, by the simple linear calculation of the formula (42), it is impossible to provide a good conversion characteristic because of a non-linearity of an image-printing or the like.

A method has been proposed for providing a conversion characteristic to improve the foregoing characteristic. This method is disclosed in Japanese Patent Application Kokoku Publication H2-30226, directed to "color correction calculation device, and employs a matrix calculation formula (43) below.

$$\begin{bmatrix} Y \\ M \\ C \end{bmatrix} = (Dij) \begin{bmatrix} R \\ G \\ B \\ R*G \\ G*B \\ B*R \\ R*R \\ G*G \\ B*B \\ N \end{bmatrix} \quad (43)$$

Here, N is a constant, i=1 to 3, and j=1 to 10.

In the foregoing formula (43), since image data having a mixture of an achromatic component and a color component is directly used, mutual interference occur in computation. In other words, if one of the coefficients is changed, influence is given to the components or hues other than the target component or hue (the component or hue for which the coefficient is changed). Consequently, a good conversion characteristic cannot be realized.

A color conversion method disclosed in Japanese Patent Application Kokai Publication H7-170404 is a proposed solution to this problem. FIG. 39 is a block circuit diagram showing the color conversion method for conversion of image data of R, G and B into printing data of C, M and Y, disclosed in Japanese Patent Application Kokai Publication H5-260943. A reference numeral 100 denotes a complement calculator; 101, a minimum and maximum calculator; 102, a hue data calculator; 103, a polynomial calculator; 104, a matrix calculator; 105, a coefficient generator; and 106, a synthesizer.

Next, the operation will be described. The complement calculator 100 receives image data R, G and B, and outputs complementary color data Ci, Mi and Yi which have been obtained by determining 1's complements. The minimum and maximum calculator 101 outputs a maximum value β and a minimum value α of this complementary color data and an identification code S for indicating, among the six hue data, data which are zero.

The hue data calculator 102 receives the complementary color data Ci, Mi and Yi and the maximum and minimum values β and α, and outputs six hue data r, g, b, y, m and c which are obtained by executing the following subtraction:

$r=\beta-Ci$, $g=\beta-Mi$, $b=\beta-Yi$, $y=Yi-\alpha$, $m=Mi-\alpha$, and $c=Ci-\alpha$. Here, among the six hue data, at least two are of a value "zero."

The polynomial calculator 103 receives the hue data and the identification code S, selects, from r, g and b, two data Q1 and Q2 which are not zero and, from y, m and c, two data P1 and P2 which are not zero. Based on these data, the polynomial calculator 103 computes polynomial data: T1=P1*P2, T3=Q1*Q2, T2=T1/(P1+P2), and T4=T3/(Q1+Q2), and then outputs the results of the calculation.

The coefficient generator 105 generates calculation coefficients U(Fij) and fixed coefficients U(Fij) for the polynomial data based on information regarding the identification code S. The matrix calculator 104 receives the hue data y, m and c, the polynomial data T1 to T4 and the coefficients U, and outputs a result of the following formula (44) as color ink data C1, M1 and Y1.

$$\begin{bmatrix} C1 \\ M1 \\ Y1 \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \end{bmatrix} \quad (44)$$

The synthesizer 106 adds together the color ink data C1, M1 and Y1 and data $\alpha$ which is the achromatic data, and outputs printing data C, M and Y. Accordingly, the following formula (45) is used for obtaining printing data.

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \end{bmatrix} + \begin{bmatrix} \alpha \\ \alpha \\ \alpha \end{bmatrix} \quad (45)$$

The formula (45) is a general formula for a group of pixels.

FIGS. 40A to 40F, which are schematic diagrams, show relations between six hues of red (R), green (G), blue (B), yellow (Y), cyan (C) and magenta (M) and hue data y, m, c, r, g and b, and each hue data relates to or extends to cover three hues.

FIGS. 41A to 41F, which are schematic diagrams, show relations between the six hues and product terms m*y, r*g, y*c, g*b, c*m and b*r, and it is seen that each hue data relates to specified hue among the six hues.

Thus, each of the six product terms m*y, c*m, y*c, r*g, g*b and b*r relates to only one specific hue among the six hues of red, blue, green, yellow, cyan and magenta. In other words, only m*y is an effective product term for red; c*m for blue; y*c for green; r*g for yellow; g*b for cyan; and b*r for magenta.

Also, each of the six fraction terms m*y/(m+y), c*m/(c+m), y*c/(y+c), r*g/(r+g), g*b/(g+b) and b*r/(b+r) in the formula (45) relates to only one specific hue among the six hues.

As apparent from the foregoing, according to the color conversion method shown in FIG. 39, by changing coefficients for the product terms and the fraction terms regarding the specific hue, only the target hue can be adjusted without influencing other hues.

Each of the foregoing product terms is determined by a second-order computation for chroma, and each of the fraction terms is determined by a first-order computation for chroma. Thus, by using both of the product terms and the fraction terms, the non-linearity of an image-printing for chroma can be corrected.

However, even in this color conversion method, the problems of the non-linearity of image-printing for hues remains to be solved. If an area in a color space occupied by specific hues is to be expanded or reduced, according to the user's preference, e.g., specifically, if expansion or reduction of an area of red in a color space including magenta, red and yellow is desired, the conventional color conversion method of the matrix computation type could not meet with such a desire.

The problems of the conventional color conversion method or color conversion device are summarized as follows. Where the color conversion device is of a table conversion method employing a memory such as ROM, a large-capacity memory is required, and a conversion characteristic cannot be flexibly changed. Where the color conversion device uses a matrix calculation method, although it is possible to change only a target hue, it is not possible to correct the inter-hue areas between adjacent ones of the six hues of red, blue, green, yellow, cyan and magenta, good conversion characteristics cannot be realized throughout the entire color space.

SUMMARY OF THE INVENTION

The invention has been made to overcome the problems described above, and its object is to provide a color conversion device and a color conversion method with which it is possible to adjust the six hues of red, blue, green, yellow, cyan and magenta, and the six inter-hue areas, with which the conversion characteristics can be flexibly varied, and which does not require a large-capacity memory.

According to a first aspect of the invention, there is provided a color conversion device comprising:

calculating means for calculating maximum and minimum values $\beta$ and $\alpha$ of image information for each pixel;

hue data calculating means for calculating hue data r, g, b, y, m and c based on the image information, and the maximum and minimum values $\beta$ and $\alpha$ outputted from said calculating means;

means for generating comparison-result data based on said hue data outputted from said hue data calculating means;

first calculating means for performing calculation on outputs from said comparison-result data generating means and said hue data outputted from said hue data calculating means;

second calculating means for performing calculation on said hue data outputted from said hue data calculating means;

coefficient generating means for generating predetermined matrix coefficients; and means for performing matrix calculation using the comparison-result data from said comparison-result data generating means, outputs from said first and second calculating means, the hue data from said hue data calculating means, the minimum value α from said calculating means and the coefficients from said coefficient generating means, to thereby obtain color-converted image information.

With the above arrangement, it is possible to independently correct, in addition to the six hues of red, blue, green, yellow, cyan and magenta, the six inter-hue areas of red-yellow, yellow-green, green-cyan, cyan-blue, blue-magenta, and magenta-red.

It is also possible to flexibly change the conversion characteristics, and the large-capacity memory is not required.

It may be so arranged that said calculating means for calculating said maximum and minimum values β and α includes means for calculating maximum and minimum values β and α of image data R, G and B which is image information for each pixel, said hue data calculating means includes means for calculating hue data r, g, b, y, m and c by performing subtraction:

$r=R-\alpha,$ $g=G-\alpha,$ $b=B-\alpha,$ $y=\beta-B,$ $m=\beta-G,$ and $c=\beta-R,$ on said image data R, G and B and said maximum and minimum values β and α outputted from said calculating means, said comparison-result data generating means includes:

multiplying means for multiplying said hue data by predetermined calculation coefficients aq1 to aq6 and ap1 to ap6, first comparison-result data generating means for obtaining comparison-result data $hry=\min(aq1*g, \text{ and } ap1*m),$ $hrm=\min(aq2*b, \text{ and } ap2*y),$ $hgy=\min(aq3*r, \text{ and } ap3*c),$ $hgc=\min(aq4*b, \text{ and } ap4*y),$ $hbm=\min(aq5*r, \text{ and } ap5*c),$ and $hbc=\min(aq6*g, \text{ and } ap6*m),$ (where min(A, B) represent minimum values of A and B), between respective outputs from said multiplying means, and second comparison-result data generating means for obtaining comparison-result data between said comparison-result data outputted from said first comparison-result data generating means and said hue data, said first calculating means includes means for obtaining product terms based on said outputs from said first comparison-result data generating means and said hue data, said second calculating means includes means for obtaining product terms and fraction terms on said hue data, and said matrix calculation means performs matrix calculation using the comparison-result data from said comparison-result data generating means, the outputs from said first and second calculating means, the hue data from said hue data calculating means and the minimum value α from said calculating means, to obtain the color-converted image data.

It may be so arranged that said calculating means for calculating said maximum and minimum values β and α includes means for calculating maximum and minimum values β and α of complementary color data C, M and Y of cyan, magenta and yellow which is image information for each pixel, said hue data calculating means includes means for calculating hue data r, g, b, y, m and c by performing subtraction:

$r=\beta-C,$ $g=\beta-M,$ $b=\beta-Y,$ $y=Y-\alpha,$ $m=M-\alpha,$ and $c=C-\alpha,$ on said complementary color data C, M and Y and said maximum and minimum values β and α outputted from said calculating means, said comparison-result data generating means includes:

multiplying means for multiplying said hue data by predetermined calculation coefficients aq1 to aq6 and ap1 to ap6, first comparison-result data generating means for obtaining comparison-result data $hry=\min(aq1*g, \text{ and } ap1*m),$ $hrm=\min(aq2*b, \text{ and } ap2*y),$ $hgy=\min(aq3*r, \text{ and } ap3*c),$ $hgc=\min(aq4*b, \text{ and } ap4*y),$ $hbm=\min(aq5*r, \text{ and } ap5*c),$ and $hbc=\min(aq6*g, \text{ and } ap6*m),$ (where min(A, B) represent minimum values of A and B), between respective outputs from said multiplying means, and second comparison-result data generating means for obtaining comparison-result data between said comparison-result data outputted from said first comparison-result data generating means and said hue data, said first calculating means includes means for obtaining product terms based on said outputs from said first comparison-result data generating means and said hue data, said second calculating means includes means for obtaining product terms and fraction terms on said hue data, and said matrix calculation means performs matrix calculation using the comparison-result data from said comparison-result data generating means, the outputs from said first and second calculating means, the hue data from said hue data calculating means and the minimum value α from said calculating means, to obtain the color-converted image data.

It may be so arranged that said calculating means for calculating said maximum and minimum values β and α includes means for calculating maximum and minimum values β and α of image data R, G and B which is image information for each pixel, said hue data calculating means includes means for calculating hue data r, g, b, y, m and c by performing subtraction:

$r=R-\alpha,$ $g=G-\alpha,$ $b=B-\alpha,$ $y=\beta-B,$ $m=\beta-G,$ and $c=\beta-R,$ on said image data R, G and B and said maximum and minimum values β and α outputted from said calculating means, said comparison-result data generating means includes:

multiplying means for multiplying said hue data by predetermined calculation coefficients aq1 to aq6 and ap1 to ap6, first comparison-result data generating means for obtaining comparison-result data $hry=\min(aq1*g, \text{ and } ap1*m),$ $hrm=\min(aq2*b, \text{ and } ap2*y),$ $hgy=\min(aq3*r, \text{ and } ap3*c),$ $hgc=\min(aq4*b, \text{ and } ap4*y),$ $hbm=\min(aq5*r, \text{ and } ap5*c),$ and $hbc=\min(aq6*g, \text{ and } ap6*m),$ (where min(A, B) represent minimum values of A and B), between respective outputs from said multiplying means, and second comparison-result data generating means for obtaining comparison-result data between said comparison-result data outputted from said first comparison-result data generating means and said hue data, means for determining comparison-result data between the hue data r, g and b, and between the hue data y, m and c;

said first calculating means includes means for obtaining product terms based on said outputs from said first comparison-result data generating means and said hue data, said second calculating means includes means for obtaining product terms on said hue data, and said matrix calculation means performs matrix calculation using the comparison-result data from said comparison-result data generating means, the outputs from said first and second calculating means, the hue data from said hue data calculating means and the minimum value α from said calculating means, to obtain the color-converted image data.

It may be so arranged that said calculating means for calculating said maximum and minimum values β and α includes means for calculating maximum and minimum values β and α of complementary color data C, M and Y which is image information for each pixel, said hue data calculating means includes means for calculating hue data r, g, b, y, m and c by performing subtraction:

$r=\beta-C,$ $g=\beta-M,$ $b=\beta-Y,$ $y=Y-\alpha,$ $m=M-\alpha,$ and $c=C-\alpha,$ on said complementary color data C, M and Y and said maximum and minimum values β and α outputted from said calculating means, said comparison-result data generating means includes:

multiplying means for multiplying said hue data by predetermined calculation coefficients aq1 to aq6 and ap1 to ap6, first comparison-result data generating means for obtaining comparison-result data $hry=\min(aq1*g, \text{ and } ap1*m),$ $hrm=\min(aq2*b, \text{ and } ap2*y),$ $hgy=\min(aq3*r, \text{ and } ap3*c),$ $hgc=\min(aq4*b, \text{ and } ap4*y),$ $hbm=\min(aq5*r, \text{ and } ap5*c),$ and $hbc=\min(aq6*g, \text{ and } ap6*m),$ (where min(A, B) represent minimum values of A and B), between respective outputs from said multiplying means, and second comparison-result data generating means for obtaining comparison-result data between said comparison-result data outputted from said first comparison-result data generating means and said hue data, means for determining comparison-result data between the hue data r, g and b, and between the hue data y, m and c;

said first calculating means includes means for obtaining product terms based on said outputs from said first comparison-result data generating means and said hue data, said second calculating means includes means for obtaining product terms on said hue data, and said matrix calculation means performs matrix calculation using the comparison-result data from said comparison-result data generating means, the outputs from said first and second calculating means, the hue data from said hue data calculating means and the minimum value α from said calculating means, to obtain the color-converted image data.

It may be so arranged that said second comparison-result data generating means obtains comparison-result data between said comparison-result data hry, hrm, hgy, hgc, hbm and hbc and said hue data r, g and b, said first calculating means obtains product terms between said comparison-result data hry, hrm, hgy, hgc, hbm and hbc outputted from said first comparison-result data generating means and said hue data r, g and b, said coefficient generating means generates predetermined matrix coefficients Eij (i=1 to 3, and j=1 to 3) and Fij (i=1 to 3, and j=1 to 25), and said matrix calculation means performs matrix calculation of the following formula (3) on said comparison-result data, said calculation terms using said comparison-result data, said calculation terms based on said hue data, and said minimum value α outputted from said calculating means, to thereby obtain color-converted image data.

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ r*hry \\ r*hrm \\ g*hgy \\ g*hgc \\ b*hbm \\ b*hbc \\ \alpha \end{bmatrix} \quad (3)$$

With the above arrangement, by changing the coefficients for the calculation terms relating to the specific hue, and the first-order and second-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components.

It may be so arranged that said second comparison-result data generating means obtains comparison-result data between said comparison-result data hry, hrm, hgy, hgc, hbm and hbc and said hue data y, m and c, said first calculating means obtains product terms between said comparison-result data hry, hrm, hgy, hgc, hbm and hbc outputted from said first comparison-result data generating means and said hue data y, m and c, said coefficient generating means generates predetermined matrix coefficients Eij (i=1 to 3, and j=1 to 3) and Fij (i=1 to 3, and j=1 to 24), and said matrix calculation means performs matrix calculation of the following formula (10) on said comparison-result data, said calculation terms using said comparison-result data, said calculation terms based on said hue data, and said minimum value α outputted from said calculating means, to thereby obtain color-converted image data.

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ y*hry \\ y*hgy \\ c*hgc \\ c*hbc \\ m*hbm \\ m*hrm \end{bmatrix} + \begin{bmatrix} \alpha \\ \alpha \\ \alpha \end{bmatrix} \quad (10)$$

With the above arrangement, it is possible to independently correct, in addition to the six hues of red, blue, green, yellow, cyan and magenta, the six inter-hue areas of red-yellow, yellow-green, green-cyan, cyan-blue, blue-magenta, and magenta-red.

It is also possible to flexibly change the conversion characteristics, and the large-capacity memory is not required.

It may be so arranged that said second comparison-result data generating means obtains comparison-result data between said comparison-result data hry, hrm, hgy, hgc, hbm and hbc and said hue data r, g, and b, said first calculating means obtains product terms between said comparison-result data hry, hrm, hgy, hgc, hbm and hbc outputted from said first comparison-result data generating means and said hue data r, g and b, said coefficient generating means generates predetermined matrix coefficients Eij (i=1 to 3, and j=1 to 3) and Fij (i=1 to 3, and j=1 to 25), and said matrix calculation means performs matrix calculation of the following formula (19) on said comparison-result data, said calculation terms using said comparison-result data, said calculation terms based on said hue data, and said minimum value α outputted from said calculating means, to thereby obtain color-converted image data.

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c,m) \\ \min(m,y) \\ \min(y,c) \\ \min(r,g) \\ \min(g,b) \\ \min(b,r) \\ \min(r,hry) \\ \min(r,hrm) \\ \min(g,hgy) \\ \min(g,hgc) \\ \min(b,hbm) \\ \min(b,hbc) \\ r*hry \\ r*hrm \\ g*hgy \\ g*hgc \\ b*hbm \\ b*hbc \\ \alpha \end{bmatrix} \quad (19)$$

With the above arrangement, by changing the coefficients for the calculation terms relating to the specific hue, and the first-order and second-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components.

It may be so arranged that said second comparison-result data generating means obtains comparison-result data between said comparison-result data hry, hrm, hgy, hgc, hbm and hbc and said hue data y, m and c, said first calculating means obtains product terms between said comparison-result data hry, hrm, hgy, hgc, hbm and hbc outputted from said first comparison-result data generating means and said hue data y, m and c, said coefficient generating means generates predetermined matrix coefficients Eij (i=1 to 3, and j=1 to 3) and Fij (i=1 to 3, and j=1 to 25), and said matrix calculation means performs matrix calculation of the following formula (28) on said comparison-result data, said calculation terms using said comparison-result data, said calculation terms based on said hue data, and said minimum value α outputted from said calculating means, to thereby obtain color-converted image data.

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c,m) \\ \min(m,y) \\ \min(y,c) \\ \min(r,g) \\ \min(g,b) \\ \min(b,r) \\ \min(y,hry) \\ \min(y,hgy) \\ \min(c,hgc) \\ \min(c,hbc) \\ \min(m,hbm) \\ \min(m,hrm) \\ y*hry \\ y*hgy \\ c*hgc \\ c*hbc \\ m*hbm \\ m*hrm \\ \alpha \end{bmatrix} \quad (28)$$

With the above arrangement, by changing the coefficients for the calculation terms relating to the specific hue, and the first-order and second-order terms relating to the inter-hue areas, it is possible to adjust only the target hue or inter-hue area among the six hues of red, blue, green, yellow, cyan and magenta, and the six inter-hue areas, without influencing other hues and inter-hue areas, and by changing the coefficients relating to the minimum value α which is the achromatic data, it is possible to adjust only the achromatic component without influencing the hue components.

It may be so arranged that said coefficient generating means generates predetermined matrix coefficients Eij (i=1 to 3, and j=1 to 3) of the following formula (33) and matrix coefficients Fij (i=1 to 3, and j=1 to 24, or j=1 to 25), each of said coefficients Fij being set to a predetermined value.

$$(Eij) = \begin{bmatrix} 1 & 0 & 0 \\ 0 & 1 & 0 \\ 0 & 0 & 1 \end{bmatrix} \quad (33)$$

It may be so arranged that said calculating means includes means for calculating the maximum and minimum values β and α of image information for each pixel and generating and outputting an identification code for identifying the hue data having a value zero, according to which component of the image information is the maximum and minimum for each pixel, said comparison-result data generating means generates comparison-result data based on said identification code outputted from said calculating means, said coefficient generating means generates matrix coefficients based on said identification code outputted from said calculating means, and said matrix calculation means performs, according to said identification code from said calculating means, by performing matrix calculation using said coefficients from said coefficient generating means, to obtain color-converted image information.

It may be so arranged that said multiplying means performs, by setting said calculation coefficients aq1 to aq6 and ap1 to ap6 to a value given by $2^n$, with n being an integer 0, 1, 2, ..., calculation on said hue data and said calculation coefficients, by means of bit shifting.

According to a second aspect of the invention, there is provided a color conversion method for obtaining color-converted image information, comprising the steps of:

calculating maximum and minimum values β and α of image information for each pixel;

calculating hue data r, g, b, y, m and c based on said image information and said calculated maximum and minimum values β and α;

generating comparison-result data using said calculated hue data;

performing calculation on said comparison-result data and said calculated hue data;

performing calculation between said respective hue data; and performing matrix calculation using said comparison-result data, outputs of said calculation, said calculated hue data, said minimum value α, and based on predetermined matrix coefficients.

The method may further comprise the steps of:

calculating the maximum and minimum values β and α of image data R, G and B which is image information for each pixel;

calculating hue data r, g, b, y, m and c by performing subtraction $r=R-\alpha,$ $g=G-\alpha,$ $b=B-\alpha,$ $y=\beta-B,$ $m=\beta-G,$ and $c=\beta-R,$ on said inputted image data R, G and B and said maximum and minimum values β and α;

multiplying said hue data by predetermined calculation coefficients aq1 to aq6 and ap1 to ap6;

obtaining comparison-result data between respective outputs of said multiplication, said comparison-result data being $hry=\min(aq1*g, ap1*m),$ $hrm=\min(aq2*b, ap2*y),$ $hgy=\min(aq3*r, ap3*c),$ $hgc=\min(aq4*b, ap4*y),$ $hbm=\min(aq5*r, ap5*c),$ and $hbc=\min(aq6*g, ap6*m),$ with min(A, B) representing the minimum value of A and B;

obtaining comparison-result data between said comparison-result data and said hue data;

obtaining product terms based on said comparison-result data hry, hrm, hgy, hgc, hbm and hbc, and said hue data;

obtaining product terms, and fraction terms based on said hue data; and performing matrix calculation using said comparison-result data, the results of said calculation, said hue data, and said minimum value α, to thereby obtain color-converted image data.

The method may further comprise the steps of:

calculating the maximum and minimum values β and α of complementary color data C, M and Y of cyan, magenta and yellow which is image information for each pixel;

calculating hue data r, g, b, y, m and c by performing subtraction $r=\beta-C,$ $g=\beta-M,$ $b=\beta-Y,$ $y=Y-\alpha,$ $m=M-\alpha,$ and $c=C-\alpha,$ on said complementary color data C, M and Y and said maximum and minimum values β and α;

multiplying said hue data by predetermined calculation coefficients aq1 to aq6 and ap1 to ap6;

obtaining comparison-result data between respective outputs of said multiplication, said comparison-result data being $hry=\min(aq1*g, ap1*m),$ $hrm=\min(aq2*b, ap2*y),$ $hgy=\min(aq3*r, ap3*c),$ $hgc=\min(aq4*b, ap4*y),$ $hbm=\min(aq5*r, ap5*c),$ and $hbc=\min(aq6*g, ap6*m),$ with min(A, B) representing the minimum value of A and B;

obtaining comparison-result data between said comparison-result data and said hue data;

obtaining product terms based on said comparison-result data hry, hrm, hgy, hgc, hbm and hbc, and said hue data;

obtaining product terms, and fraction terms based on said hue data; and performing matrix calculation using said comparison-result data, the results of said calculation, said hue data, and said minimum value α, to thereby obtain color-converted image data.

The method may further comprise the steps of:

calculating the maximum and minimum values β and α of image data R, G and B which is image information for each pixel;

calculating hue data r, g, b, y, m and c by performing subtraction $$r = R - \alpha,$$
$$g = G - \alpha,$$
$$b = B - \alpha,$$
$$y = \beta - B,$$
$$m = \beta - G, \text{ and}$$
$$c = \beta - R,$$

on said image data R, G and B and said maximum and minimum values β and α;

multiplying said hue data by predetermined calculation coefficients aq1 to aq6 and ap1 to ap6;

obtaining comparison-result data between respective outputs of said multiplication, said comparison-result data being $$hry = \min(aq1*g, ap1*m),$$
$$hrm = \min(aq2*b, ap2*y),$$
$$hgy = \min(aq3*r, ap3*c),$$
$$hgc = \min(aq4*b, ap4*y),$$
$$hbm = \min(aq5*r, ap5*c), \text{ and}$$
$$hbc = \min(aq6*g, ap6*m),$$

with min(A, B) representing the minimum value of A and B;

obtaining comparison-result data between said comparison-result data and said hue data;

obtaining comparison-result data between said hue data r, g, and b, and between said hue data y, m and c;

obtaining product terms based on said comparison-result data hry, hrm, hgy, hgc, hbm and hbc, and said hue data;

obtaining product terms based on said hue data; and performing matrix calculation using said comparison-result data, the results of said calculation, said hue data, and said minimum value α, to thereby obtain color-converted image data.

The method may further comprise the steps of:

calculating the maximum and minimum values β and α of complementary color data C, M and Y which is image information for each pixel;

calculating hue data r, g, b, y, m and c by performing subtraction $$r = \beta - C,$$
$$g = \beta - M,$$
$$b = \beta - Y,$$
$$y = Y - \alpha,$$
$$m = M - \alpha, \text{ and}$$
$$c = C - \alpha,$$

on said complementary color data C, M and Y and said maximum and minimum values β and α;

multiplying said hue data by predetermined calculation coefficients aq1 to aq6 and ap1 to ap6;

obtaining comparison-result data between respective outputs of said multiplication, said comparison-result data being $$hry = \min(aq1*g, ap1*m),$$
$$hrm = \min(aq2*b, ap2*y),$$
$$hgy = \min(aq3*r, ap3*c),$$
$$hgc = \min(aq4*b, ap4*y),$$
$$hbm = \min(aq5*r, ap5*c), \text{ and}$$
$$hbc = \min(aq6*g, ap6*m),$$

with min(A, B) representing the minimum value of A and B;

obtaining comparison-result data between said comparison-result data and said hue data;

obtaining comparison-result data between said hue data r, g and b, and between said hue data y, m and c;

obtaining product terms based on said comparison-result data hry, hrm, hgy, hgc, hbm and hbc, and said hue data;

obtaining product terms based on said hue data; and performing matrix calculation using said comparison-result data, the results of said calculation, said hue data, and said minimum value α, to thereby obtain color-converted image data.

BRIEF DESCRIPTION OF THE DRAWINGS

In the accompanying drawings:

FIG. 3 is a table showing an example of the relation between the value of the identification code and the maximum and minimum values β and α, and zero hue data in the color conversion device of Embodiment 1;

FIG. 4 is a table showing the operation of a zero remover of the polynomial calculator in the color conversion device of Embodiment 1;

FIG. 5 is a block diagram showing a part of an example of configuration of a matrix calculator in the color conversion device of Embodiment 1;

FIGS. 11A and 11B are tables showing the relations between the hues and inter-hue areas, and the effective calculation terms in the color conversion device of Embodiment 1;

FIGS. 18A and 18B are tables showing the relations between the hues and inter-hue areas and the effective calculation terms in the color conversion device of Embodiment 5;

FIGS. 21A and 21B are tables showing the relations between the hues and inter-hue areas, and the effective calculation terms in the color conversion device of Embodiment 9;

FIGS. 23A and 23B are tables showing the relations between the hues and inter-hue areas, and the effective calculation terms in the color conversion device of Embodiment 13;

FIGS. 28A and 28B are tables showing the relations between the hues and inter-hue areas, and the effective calculation terms in the color conversion device of Embodiment 17;

FIGS. 34A and 34B are tables showing the relations between the hues and inter-hue areas, and the effective calculation terms in the color conversion device of Embodiment 21;

FIGS. 36A and 36B are tables showing the relations between the hues and inter-hue areas, and the effective calculation terms in the color conversion device of Embodiment 25;

FIGS. 38A and 38B are tables showing the relations between the hues and inter-hue areas, and the effective calculation terms in the color conversion device of Embodiment 29;

DETAILED DESCRIPTION OF THE PREFERRED EMBODIMENTS

Next, the preferred embodiments of the present invention will be described in detail with reference to the accompanying drawings.

Embodiment 1

Figure 1:
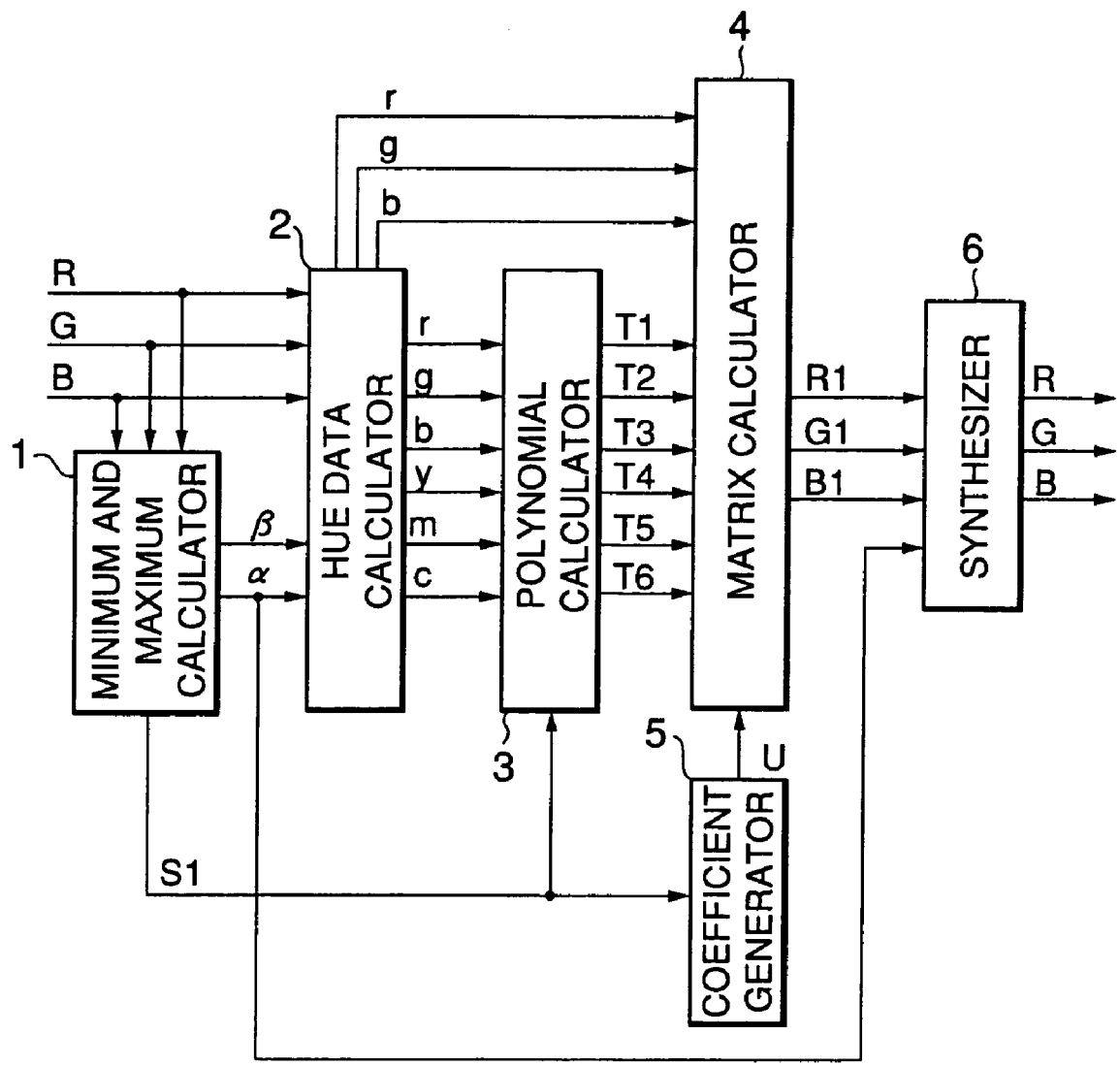
FIG. 1 is a block diagram showing an example of configuration of a color conversion device of Embodiment 1.

FIG. 1 is a block diagram showing an example of configuration of a color conversion device of Embodiment 1 of the present invention. In the drawing, reference marks R, G and B denote image data which are image information for respective pixels. Reference numeral 1 denotes a minimum and maximum calculator for calculating a maximum value $\beta$ and a minimum value $\alpha$ of the inputted image data R, G and B, and generating and outputting an identification code S1 for indicating, among the six hue data, data which are zero, as will be better understood from the following description; 2, a hue data calculator for calculating hue data r, g, b, y, m and c from the image data R, G and B and the outputs from the minimum and maximum calculator; 3, a polynomial calculator; 4, a matrix calculator; 5, a coefficient generator; and 6, a synthesizer.

Figure 2:
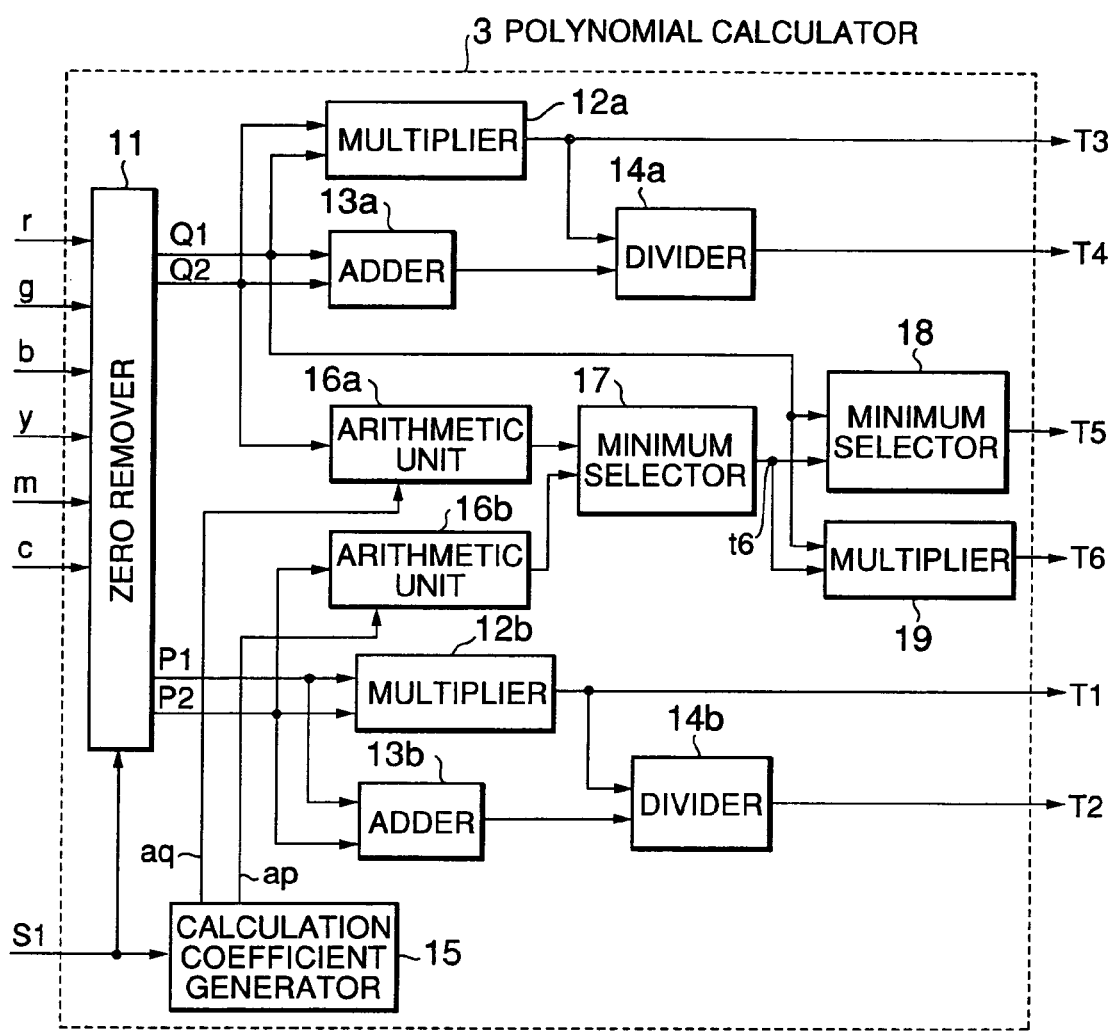
FIG. 2 is a block diagram showing an example of configuration of a polynomial calculator in the color conversion device of Embodiment 1.
Figure 6A:
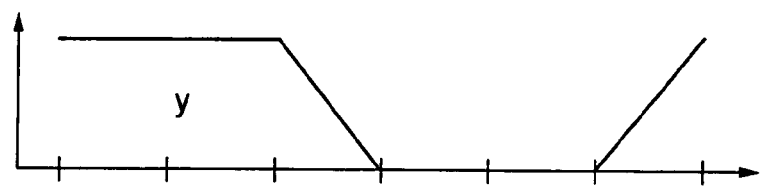
FIGS. 6A to 6F are schematic diagram showing the relations between the six hues and hue data.
Figure 6B:
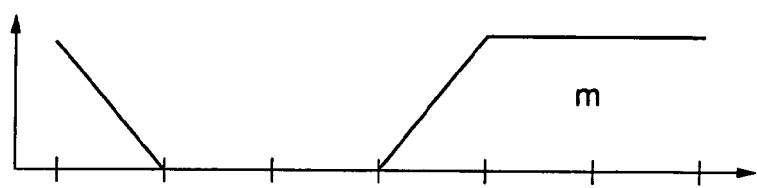
Figure 6C:
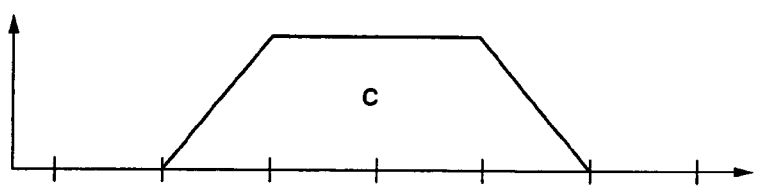
Figure 6D:
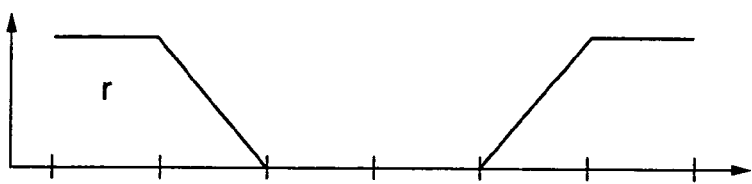
Figure 6E:
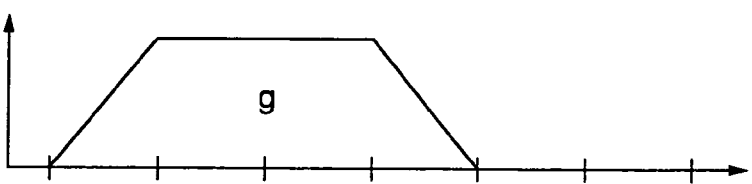
Figure 6F:
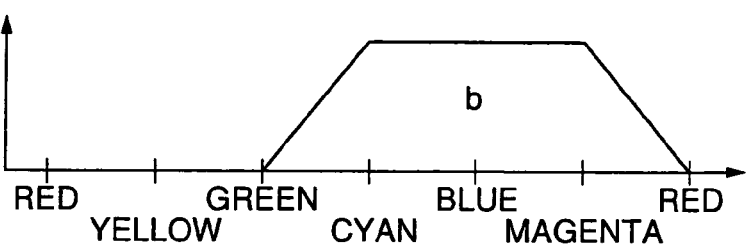
Figure 7A:
FIGS. 7A to 7F are schematic diagram showing the relations between the hues and the product terms in the color conversion device of Embodiment 1.
Figure 7B:
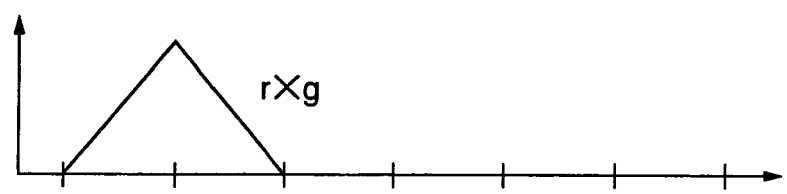
Figure 7C:
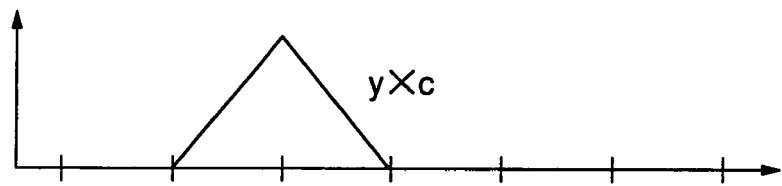
Figure 7D:
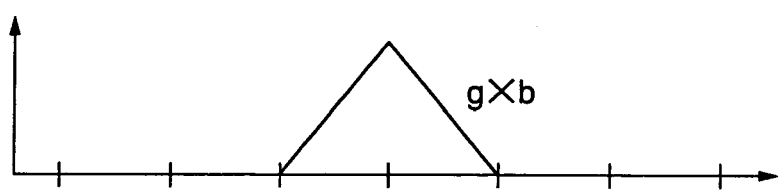
Figure 7E:
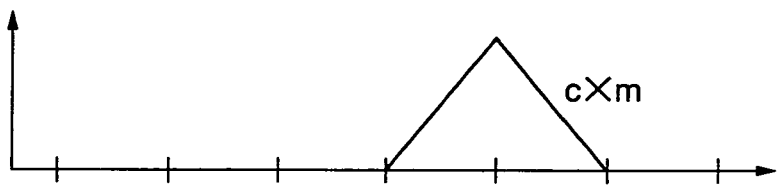
Figure 7F:
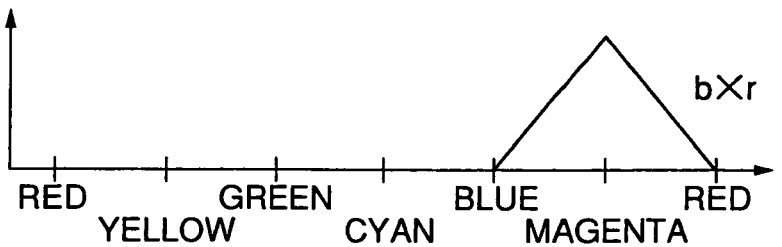
Figure 8A:
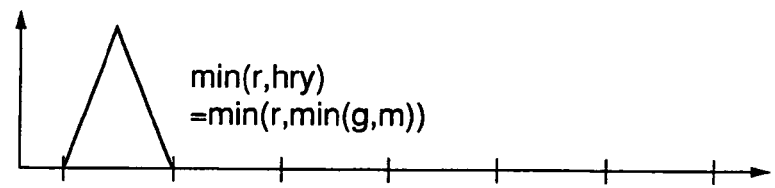
FIGS. 8A to 8F are schematic diagrams showing the relations between the hues and the first-order terms using comparison-result data in the color conversion device of Embodiment 1.
Figure 8B:
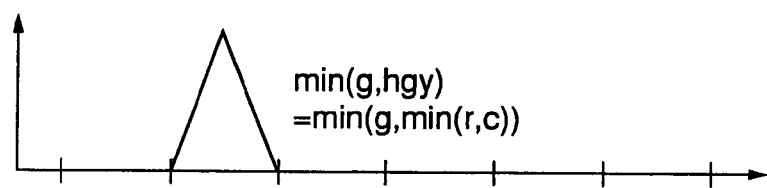
Figure 8C:
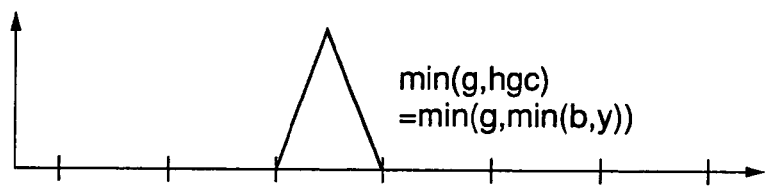
Figure 8D:
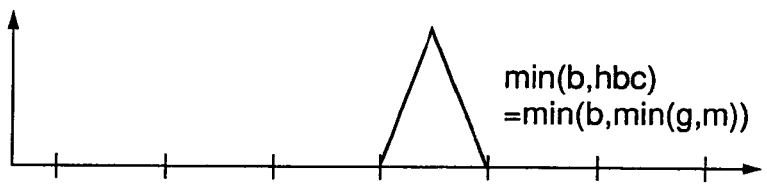
Figure 8E:
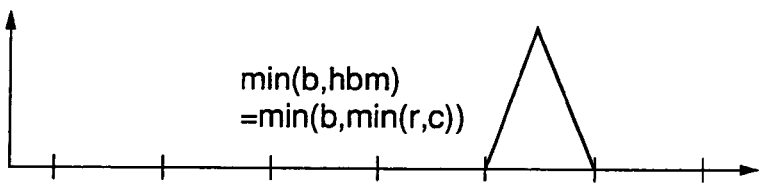
Figure 8F:
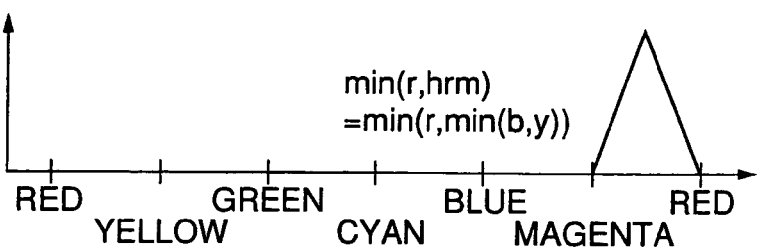
Figure 9A:
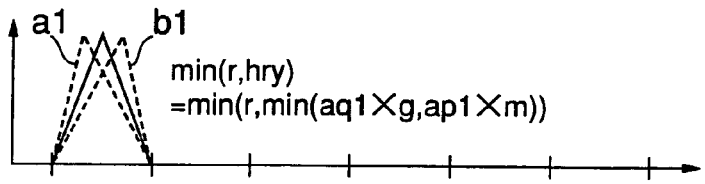
FIGS. 9A to 9F are schematic diagrams showing the relations between the hues and the first-order terms using comparison-result data when calculation coefficients are changed in a calculation coefficient generator of the polynomial calculator in the color conversion device of Embodiment 1.
Figure 9B:
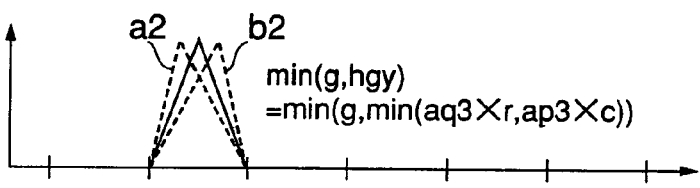
Figure 9C:
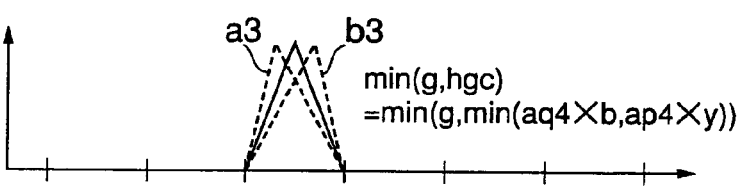
Figure 9D:
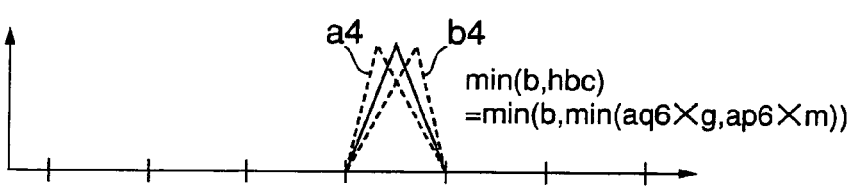
Figure 9E:
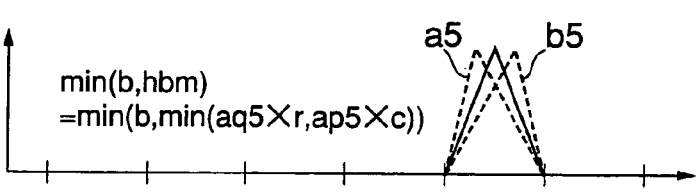
Figure 9F:
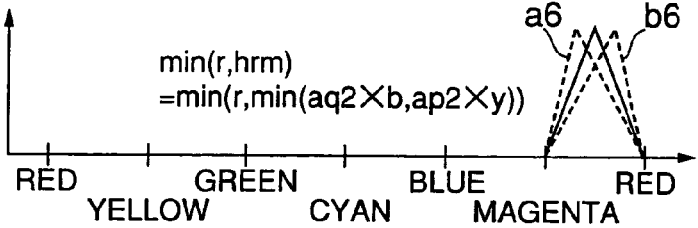
Figure 10A:
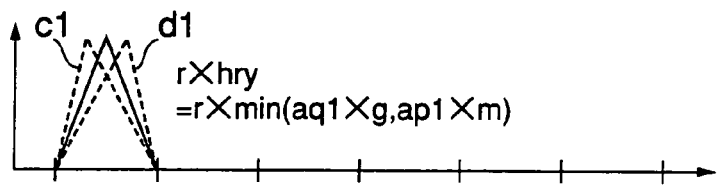
FIGS. 10A to 10F are schematic diagrams showing the relations between the hues and the second-order terms using comparison-result data in the color conversion device of Embodiment 1.
Figure 10B:
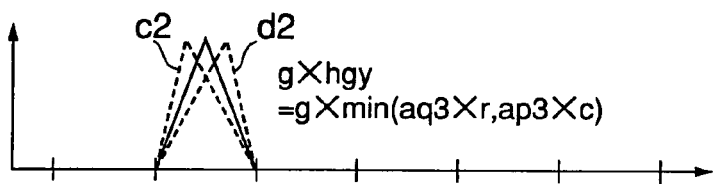
Figure 10C:
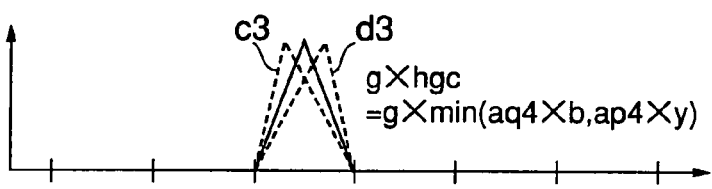
Figure 10D:
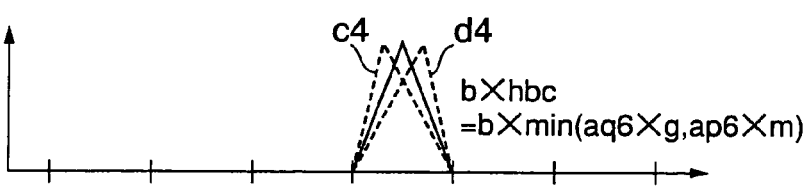
Figure 10E:
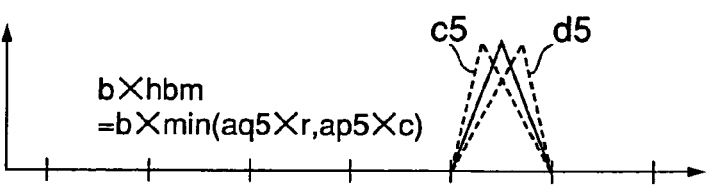
Figure 10F:
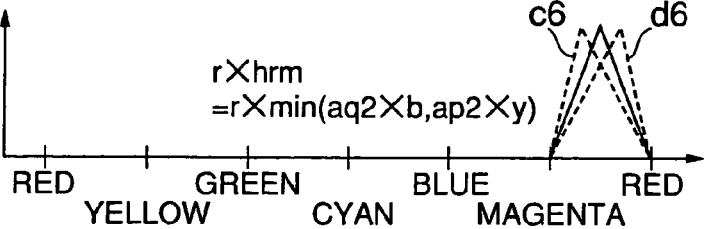

FIG. 2 is a block diagram showing an example of configuration of the polynomial calculator 3. In the drawing, a reference numeral 11 denotes a zero remover for removing, from the inputted hue data, data which is of a value zero; 12a and 12b, multipliers; 13a and 13b, adders; 14a and 14b, dividers; and 15, a calculation coefficient generator for generating and outputting calculation coefficients based on the identification code from the minimum and maximum calculator 1. Reference numerals 16a and 16b denote arithmetic units for performing multiplication between the calculation coefficients outputted from the calculation coefficient generator 15 and the inputted data; and 17 and 18, minimum selectors for selecting and outputting the minimum value of the inputted data. Reference numeral 19 denote a multiplier.

Next, the operation will be described. The inputted image data R, G and B (Ri, Gi and Bi) are sent to the minimum and maximum calculator 1 and the hue data calculator 2. The minimum and maximum calculator 1 calculates and output a maximum value β and a minimum value α of the inputted image data Ri, Gi and Bi, and also generates and outputs an identification code S1 for indicating, among the six hue data, data which are zero. The hue data calculator 2 receives the image data Ri, Gi and Bi and the maximum and minimum values β and α from the minimum and maximum calculator 1, performs subtraction of r=Ri−α, g=Gi−α, b=Bi−α, y=β−Bi, m=β−Gi and c=β−Ri, and outputs six hue data r, g, b, y, m and c.

The maximum and minimum values β and α calculated by the minimum and maximum calculator 1 are respectively represented as follows: β=MAX (Ri, Gi, Bi), and α=MIN (Ri, Gi, Bi). Since the six hue data r, g, b, y, m and c calculated by the hue data calculator 2 are obtained by the subtraction of r=Ri−α, g=Gi−α, b=Bi−α, y=β−Bi, m=β−Gi and c=β−Ri, there is a characteristic that at least two among these six hue data are of a value zero. For example, if a maximum value β is Ri and a minimum value α is Gi (β=Ri, and α=Gi), g=0 and c=0. If a maximum value β is Ri and a minimum value α is Bi (β=Ri, and α=Bi), b=0 and c=0. In other words, in accordance with a combination of Ri, Gi and Bi which are the largest and the smallest, respectively, one of r, g and b, and one of y, m and c, i. e., in total two of them have a value zero.

Thus, the minimum and maximum calculator 1 generate and outputs the identification code S1 for indicating, among the six hue data, data which are zero. The identification code S1 can assume one of the six values, depending on which of Ri, Gi and Bi are of the maximum and minimum values β and α. FIG. 3 shows a relationship between the values of the identification code S1 and the maximum and minimum values β and α of Ri, Gi and Bi and hue data which has a value zero. In the drawing, the values of the identification code S1 represent just an example, and the values may be other than those shown.

Then, the six hue data r, g, b, y, m and c outputted from the hue data calculator 2 are sent to the polynomial calculator 3, and the hue data r, g and b are also sent to the matrix calculator 4. The polynomial calculator 3 also receives the identification code S1 outputted from the minimum and maximum calculator 1, and performs calculation by selecting, from the hue data, two data Q1 and Q2 which are not zero, and from the hue data y, m and c, two data P1 and P2 which are not of a value zero. Next, this operation will be described by referring to FIG. 2.

The hue data from the hue data calculator 2 and the identification code S1 from the minimum and maximum calculator 1 are inputted to the zero remover 11 in the polynomial calculator 3. The zero remover 11 outputs, based on the identification code S1, the two data Q1 and Q2 which are not of a value zero, among the hue data r, g and b and the two data P1 and P2 which are not of a value zero, among the hue data y, m and c. Here, the data Q1, Q2, P1 and P2 outputted from the zero remover 11 are the hue data excluding data which are of a value zero, and satisfy the relationships Q1≧Q2 and P1≧P2. In other words, Q1, Q2, P1 and P2 are determined as shown in FIG. 4, and then outputted. For example, In FIGS. 3 and 4, if an identification code S1 is of a value zero, Q1 and Q2 are obtained from the hue data r and b, and P1 and P2 are obtained from the hue data y and m, and since the maximum value β is Ri and the minimum value α is Gi, r (=β−α)≧b (=Bi−α) and m (=β−α)≧y (β−Bi), so the outputs are given by Q1=r, Q2=b, P1=m and P2=y. As in the case of FIG. 3, the values of identification code S1 in FIG. 4 represent just an example, and may be other than those shown in FIG. 4.

The data Q1 and Q2 outputted from the zero remover 11 are inputted to the multiplier 12a, which calculates and outputs the product T3=Q1*Q2. The data P1 and P2 outputted from the zero remover 11 are inputted to the multiplier 12b, which calculates and outputs the product T1=P1*P2. The adders 13a and 13b respectively output the sums Q1+Q2 and P1+P2. The divider 14a receives T3 from the multiplier 12a and Q1+Q2 from the adder 13a, and outputs a quotient T4=T3/(Q1+Q2). The divider 14b receives T1 from the multiplier 12b and P1+P2 from the adder 13b, and outputs a quotient T2=T1/(P1+P2).

The identification code S1 is inputted from the minimum and maximum calculator 1 to the calculation coefficient generator 15, which generates signals indicating calculation coefficients aq and ap, used for multiplication on the data Q2 and P2, based on the identification code S1, and the calculation coefficients aq are supplied to the arithmetic unit 16a, and the coefficients ap are outputted to the arithmetic unit 16b. These calculation coefficients aq and ap corresponding to the respective hue data Q2 and P2 are generated based on the identification code S1, and each of the calculation coefficients aq and ap can assume one of the six values, corresponding to the value of the identification code S1, as shown in FIG. 4. The arithmetic unit 16a receives the data Q2 from the zero remover 11, performs multiplication of aq*Q2, with aq being the calculation coefficient from the calculation coefficient generator 15, and sends the result to the minimum selector 17. The arithmetic unit 16b receives the data P2 from the zero remover 11, performs multiplication of ap*P2, with ap being the calculation coefficient from the calculation coefficient generator 15, and sends the result to the minimum selector 17.

The minimum selector 17 selects the minimum value t6=min (aq*Q2, ap*P2) of the outputs from the arithmetic units 16a and 16b, and outputs the minimum value to the minimum selector 18, and the multiplier 19. The data Q1 outputted from the zero remover 11 is also inputted to the minimum selector 18. The minimum selector 18 thus outputs the minimum value T5=min(Q1, min(aq*Q2, ap*P2) of Q1 and t6=min(aq*Q2, ap*P2). The multiplier 19 also receives the data Q1 outputted from the zero remover 11, and performs multiplication Q1 and t6=min(aq*Q2, ap*P2) and outputs the product T6=Q1*min(aq*Q2, ap*P2). The foregoing polynomial data T1, T2, T3, T4, T5, and T6 are outputted from the polynomial calculators 3. The outputs of this polynomial calculator 3 are sent to the matrix calculator 4.

The coefficient generator 5 shown in FIG. 1 generates calculation coefficients U (Fij) and fixed coefficients U (Eij) for the polynomial data based on the identification code S1, and sends the same to the matrix calculator 4. The matrix calculator 4 receives the hue data r, g and b from the hue data calculator 2, the polynomial data T1 to T6 from the polynomial calculator 3 and the coefficients U from the coefficient generator 5, and outputs the results of calculation according to the following formula (34) as image data R1, G1 and B1.

$$\begin{bmatrix} R1 \\ G1 \\ B1 \end{bmatrix} = (Eij) \begin{bmatrix} r \\ g \\ b \end{bmatrix} + (Fij) \begin{bmatrix} T1 \\ T2 \\ T3 \\ T4 \\ T5 \\ T6 \end{bmatrix} \quad (34)$$

For (Eij), i=1 to 3 and j=1 to 3, and for (Fij), i=1 to 3 and j=1 to 6.

FIG. 5 is a block diagram showing an example of configuration of part of the matrix calculator 4. Specifically, it shows how Ri is calculated and outputted. In the drawing, reference numerals 20a to 29g denote multipliers; 21a to 21f, adders.

Next, the operation of the matrix calculator 4 of FIG. 5 will be described. The multipliers 20a to 20g receive the hue data r, the polynomial data Ti to T6 from the polynomial calculator 3 and the coefficients U (Eij) and U (Fij) from the coefficient generator 5, and output the products thereof. The adders 21a and 21b receive the products outputted from the multipliers 20b to 20e, add the inputted data and outputs the sums thereof. The adder 21c receives the products outputted from the multipliers 20f and 20g, and outputs the sum thereof. The adder 21d adds the data from the adders 21a and 21b, and the adder 21e adds the outputs from the adders 21d and 21c. The adder 21f adds the output from the adder 21e and the output from the multiplier 20a, and outputs the sum total thereof as image data R1. In the example of configuration shown in FIG. 5, if the hue data r is replaced by the hue data g or b, image data G1 or Bi can be calculated.

The part of the coefficients (Eij) and (Fij) corresponding to the hue data r, g and b are used. In other words, if three configuration, each similar to that of FIG. 5, are used in parallel for the hue data r, g and b, matrix calculation can be performed at a higher speed.

The synthesizer 6 receives the image data R1, G1 and B1 from the matrix calculator 4 and the minimum value α outputted from the minimum and maximum calculator 1 representing the achromatic data, performs addition, and outputs image data R, G and B. The formula used for obtaining the image data obtained by color conversion by the method of FIG. 1 is therefore as follows:

$$\begin{bmatrix} R \\ G \\ B \end{bmatrix} = (Eij)\begin{bmatrix} r \\ g \\ b \end{bmatrix} + (Fij)\begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ r*hry \\ r*hrm \\ g*hgy \\ g*hgc \\ b*hbm \\ b*hbc \end{bmatrix} + \begin{bmatrix} \alpha \\ \alpha \\ \alpha \end{bmatrix} \quad (1)$$

Here, for (Eij), i=1 to 3 and j=1 to 3, and for (Fij), i=1 to 3 and j=1 to 24, and $hry=\min(aq1*g, ap1*m)$, $hrm=\min(aq2*b, ap2*y)$, $hgy=\min(aq3*r, ap3*c)$, $hgc=\min(aq4*b, ap4*y)$, $hbm=\min(aq5*r, ap5*c)$, and $hbc=\min(aq6*g, ap6*m)$, and aq1 to aq6 and ap1 to ap6 indicate calculation coefficients generated by the calculation coefficient generator 15 of FIG. 2.

The difference between the number of calculation terms in the formula (1) and the number of calculation terms in FIG. 1 is that FIG. 1 shows a method of calculation for each pixel excluding data resulting in the calculation terms which are of a value zero, while the formula (1) represents a general formula for a set of pixels. In other words, the six hue data have such a characteristic that at least two of them are zero, as described above with reference to FIG. 3. For example, in the case where the value of the identification code S1 is 0, with the maximum and minimum values β and α shown in FIG. 3 being respectively Ri and Gi, equations g=0 and c=0 hold. Accordingly, the twenty-four calculation terms in the formula (1) except the six calculation terms of m*y, b*r, b*r/(b+r), m*y/(m+y), min (r, hrm) and r*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (1) can be reduced to six effective data, and this reduction is achieved by exploiting a characteristic of the hue data.

The combination of effective data is changed according to image data of the target pixel. For all image data, all the polynomial data can be effective.

FIGS. 6A to 6F schematically show relations between the six hues and the hue data y, m, c, r, g and b. Each hue data relates to three hues.

FIGS. 7A to 7F schematically show relations between the six hues and the product terms m*y, r*g, y*c, g*b, c*m and b*r, and it can be understood that each product term is a second-order term for a specified hue. For example, if W is a constant, since r=W and g=b=0 hold for red, y=m=W and c=0 are obtained. Accordingly, y*m=W*W is realized, and the other five terms are all zero. In other words, only m*y is an effective second-order term for red. Similarly, y*c is the only effective term for green; c*m for blue; g*b for cyan; b*r for magenta; and r*g for yellow.

Each of the foregoing formulae (1) and (34) includes a first-order fraction term effective only for one hue. Those fraction terms are: r*g/(r+g), g*b/(g+b), b*r/(b+r), m*y/(m+y), c*m/(c+m), and y*c/(y+c), and there are thus six such fraction terms. These have first-order term characteristics. For example, if W is a constant, since r=W and g=b=0 hold for red, y=m=W and c=0 are obtained. Then, m*y/(m+y)=W/2, and the other five terms are all zero. Accordingly, only m*y/(m+y) is an effective first-order term for red. Similarly, y*c/(y+c) is an only effective first-order term for green; c*m/(c+c) for blue; g*b/(g+b) for cyan; b*r/(b+r) for magenta; and r*g/(r+g) for yellow. Here, if a numerator and a denominator are both zero, then a first-order term should be set to zero.

Next, a difference between the first-order and second-order terms will be described. As described above, for red, if W is a constant, m*y=W*W is realized, and the other product terms are all zero. Here, since the constant W indicates the magnitudes of the hue signals y and m, the magnitude of the constant W depends on the color brightness or chroma. With m*y=W*W, the product term m*y is a second-order function for chroma. The other product terms are also second-order functions for chroma regarding the hues to which these terms are effective. Accordingly, influence given by each product term to color reproduction is increased in a second-order manner as chroma is increased. In other words, the product term is a second-order term which serves as a second-order correction term for chroma in color reproduction.

On the other hand, for red, if W is a constant, m*y/(m+y)=W/2 is realized, and the other fraction terms are all zero. Here, the magnitude of the constant W depends of color brightness or chroma. With m*y/(m+y)=W/2, the fraction term m*y/(m+y) is a first-order function for chroma. The other fraction terms are also first-order functions for chroma regarding the hues to which these terms are effective. Accordingly, the influence given by each fraction term to color reproduction is a first-order function for chroma. In other words, the fraction term is a first-order term which serves as a first-order correction term for chroma in color reproduction.

FIGS. 8A to 8F schematically show relations between the six hues and first-order calculation terms using comparison-result data, min(r, hry), min(g, hgy), min(g, hgc), min (b, hbc), min(b, hbm) and min(r, hrm). It is assumed that the values of calculation coefficients aq1 to aq6 and ap1 to ap6, in $hry=\min(aq1*g, ap1*m),$ $hrm=\min(aq2*b, ap2*y),$ $hgy=\min(aq3*r, ap3*c),$ $hgc=\min(aq4*b, ap4*y),$ $hbm=\min(aq5*r, ap5*c),$ and $hbc=\min(aq6*g, ap6*m),$ in the foregoing formulae (1) and (34) are set to "1". It can be understood from FIGS. 8A to 8F, that the first-order calculation terms using the comparison-result data relate to changes in the six inter-hue areas of red-green, yellow-green, green-cyan, cyan-blue, blue-magenta, and magenta-red. In other words, for a red-yellow inter-hue area, r=W, g=W/2, b=0. W being a constant, so that y=W, m=W/2, c=0, so that min(r, hry)=min(r, min(g, m))=W/2, and the five other terms are all zero. Accordingly, only min(r, hry)=min (r, min(g, m)) is an effective first-order calculation term for red-yellow. Similarly, only min(g, hgy) is an effective first-order calculation term for yellow-green; min(g, hgc) for green-cyan; min(b, hbc) for cyan-blue; min(b, hbm) for blue-magenta; and min(r, hrm) for magenta-red.

FIGS. 9A to 9F schematically show relations between the six hues and the first-order calculation terms using comparison-result data when the calculation coefficients aq1 to aq6 and ap1 to ap6 are changed in hry, hrm, hgy, hgc, hbm and hbc in the foregoing formulae (1) and (34). The broken lines a1 to a6 shows the characteristics when, for example, aq1 to aq6 assume values larger than ap1 to ap6. The broken lines b1 to b6 shows the characteristics when, for example, ap1 to ap6 assume values larger than aq1 to aq6.

Specifically, for red to yellow, only min(r, hry)=min (r, min(aq1*g, ap1*m)) is an effective first-order calculation term. If, for example, the ratio between aq1 and ap1 is 2:1, the peak value of the calculation term is shifted toward red, as indicated by the broken line a1 in FIG. 9A, and thus it can be made an effective calculation term for an area closer to red in the inter-hue area of red-yellow. On the other hand, for example if the ratio between aq1 and ap1 is 1:2, the relationship is as indicated by the broken line b1 in FIG. 9A, the peak value of the calculation term is shifted toward yellow, and thus it can be made an effective calculation term for an area closer to yellow in the inter-hue area of red to yellow. Similarly, by respectively changing:

aq3 and ap3 in min(g, hgy) for yellow to green,
aq4 and ap4 in min(g, hgc) for green to cyan,
aq6 and ap6 in min(b, hbc) for cyan to blue,
aq5 and ap5 in min(b, hbm) for blue to magenta and
aq2 and ap2 in min(r, hrm) for magenta to red, in the inter-hue areas between adjacent ones of these hues, effective areas can be changed.

FIGS. 10A to 10F schematically show relations between the six hues and second-order terms of r*hry, g*hgy, g*hgc, b*hbc, b*hbm and r*hrm, which are product terms based on the comparison-result data and the hue data. In the drawings, broken lines c1 to c6 and d1 to d6 represent characteristics obtained when the calculation coefficients aq1 to aq6 and ap1 to ap6 in hry, hrm, hgy, hgc,-hbm and hbc are changed. Solid lines represent characteristics obtained when the values of the calculation coefficients aq1 to aq6 and ap1 to ap6 are 1. From FIGS. 10A to 10F, it can be understood that the second-order terms using comparison-result data contribute to changes in the inter-hue areas of red to yellow, yellow to green, green to cyan, cyan to blue, blue to magenta, and magenta to red. In other words, for example, for the inter-hue area of red to yellow, since r=W, g=W/2 and b=0, with W being a constant, y=W, m =W/2, c=0, and r*hry=r*min(g, m)=W*W/2, and the other five terms are all zero. Accordingly, only r*hry is an effective second-order term for red-yellow. Similarly, only g*hgy is an effective term for yellow-green; g*hgc for green-cyan; b*hbc for cyan-blue; b*hbm for blue-magenta; and r*hrm for magenta-red.

Next, differences between the first-order terms and the second-order terms among the calculation terms using comparison-result data will be described. As described above, for the inter-hue area of red-yellow, for example, r*hry=W*W/2, with W being a constant, and the other product terms are all zero. Then, min(r, hry)=W/2, and the other terms are all zero. Here, since the constant W represents a magnitude of a hue signal, a size of the constant W depends on color brightness or chroma of a pixel, and the product term r*hry is a second-order function of the chroma. The other product terms are also second-order functions of the chroma in the inter-hue areas where the terms are effective. Accordingly, an effect of each product term on color reproduction is increased as in a second-order fashion with the increase of the chroma. In other words, the product term is a second-order term which serves as a second-order compensation term for the chroma in the color reproduction.

On the other hand, with regard to the first-order term min(r, hry), the first-order term min(r, hry)=W/2, and is a first-order function of the chroma. The other terms are also first-order functions of the chroma in the inter-hue areas where the terms are effective. Accordingly, an effect of the first-order term based on each comparison-result data is a first-order function of the chroma. In other words, the first-order term based on each comparison-result data is a first-order term which serves as a first-order compensation term for the chroma in the color reproduction.

FIGS. 11A to 11B respectively show relations between the six hues and inter-hue areas and effective calculation terms. Thus, if the coefficient generator 5 changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3 are changed, part of the inter-hue area where a calculation term in the inter-hue area is effective can be changed without giving any influence to the other hues.

Next, an example of coefficients generated by the coefficient generator 5 of Embodiment 1 described above with reference to FIG. 1 will be described. The following formula (33) shows an example of coefficients U (Eij) generated by the coefficient generator 5.

$$(Eij) = \begin{bmatrix} 1 & 0 & 0 \\ 0 & 1 & 0 \\ 0 & 0 & 1 \end{bmatrix} \quad (33)$$

If the coefficients U (Eij) in the foregoing formula are all zero this represents the case where no color conversion is executed. Among the coefficients U (Fij) for the product terms, the fraction terms, and the first-order and second-order terms using comparison-result data, coefficients relating to the calculation terms for the hues or the inter-hue areas to be changed are determined, and the other coefficients are set to be zero. In this way, adjustment of only the target hues or inter-hue areas can be made. For example, by setting the coefficients for the first-order calculation term m*y/(m+y) for red, the hue red is changed, and by changing the inter-hue area red-yellow, the coefficients of the first-order term min(r, hry) and the coefficients of the second-order term r*hry are used.

Furthermore, if, in the polynomial calculator 3, the values of calculation coefficients aq1 to aq6 and ap1 to ap6 in $hry=\min(aq1*g, ap1*m)$, $hrm=\min(aq2*b, ap2*y)$, $hgy=\min(aq3*r, ap3*c)$, $hgc=\min(aq4*b, ap4*y)$, $hbm=\min(aq5*r, ap5*c)$, and $hbc=\min(aq6*g, ap6*m)$ are changed so as to assume integral values of 1, 2, 4, 8, . . . , i.e., $2^n$ (where n is an integer), multiplication can be achieved in the arithmetic units 16a and 16b by bit shifting.

As apparent from the foregoing, by changing the coefficients of the calculation terms relating to specific hues or inter-hue areas, it is possible to adjust only the target hue among the six hues of red, blue, green, yellow, cyan and magenta, without affecting other hues, and it is possible to correct the six inter-hue areas of red-yellow, yellow-green, green-cyan, cyan-blue, blue-magenta, and magenta-red independently.

Moreover, the product terms and the second-order terms using comparison-result data represent second-order calculations with respect to the chroma, and the fraction terms and the first-order terms using comparison-result data represent first-order calculations with respect to the chroma, and by using both the first-order terms and the second-order terms, it is possible to correct the non-linearity of the chroma in image printing or the like. Accordingly, it is possible to obtain a color conversion device or color conversion method with which the conversion characteristics can be flexibly varied, and which does not require a large-capacity memory. In addition, in the Embodiment 1, the color conversion is performed on the input image data R, G, and B, so that it is possible to perform good color reproduction in a display device such as a monitor, or an image processing device using image data represented by R, G and B, and greater advantages can be obtained.

In Embodiment 1 described above, the hue data r, g and b, y, m and c, and the maximum and minimum values $\beta$ and $\alpha$ were calculated based on the inputted image data R, G and B so as to obtain the calculation terms for the respective hues, and after the matrix calculation, the image data R, G and B were obtained. However, after the outputted image data are obtained, the data R, G and B may be converted into complementary color data C, M and Y. In this case, the same effects will be realized.

Furthermore, in Embodiment 1 described above, the processing was performed by the hardware configuration of FIG. 1. Needless to say, the same processing can be performed by software in the color conversion device, and in this case, the same effects as those of Embodiment 1 will be provided.

Embodiment 2

In Embodiment 1, the hue data r, g and b, y, m and c, and the maximum and minimum values $\beta$ and $\alpha$ were calculated based on the inputted image data R, G and B so as to obtain the calculation terms for the respective hues, and after the matrix calculation, the image data R, G and B were obtained. But the image data R, G and B may first be converted into complementary color data C, M and Y, which are an example of image information, and then color conversion may be executed by inputting the complementary color data C, M and Y.

Figure 12:
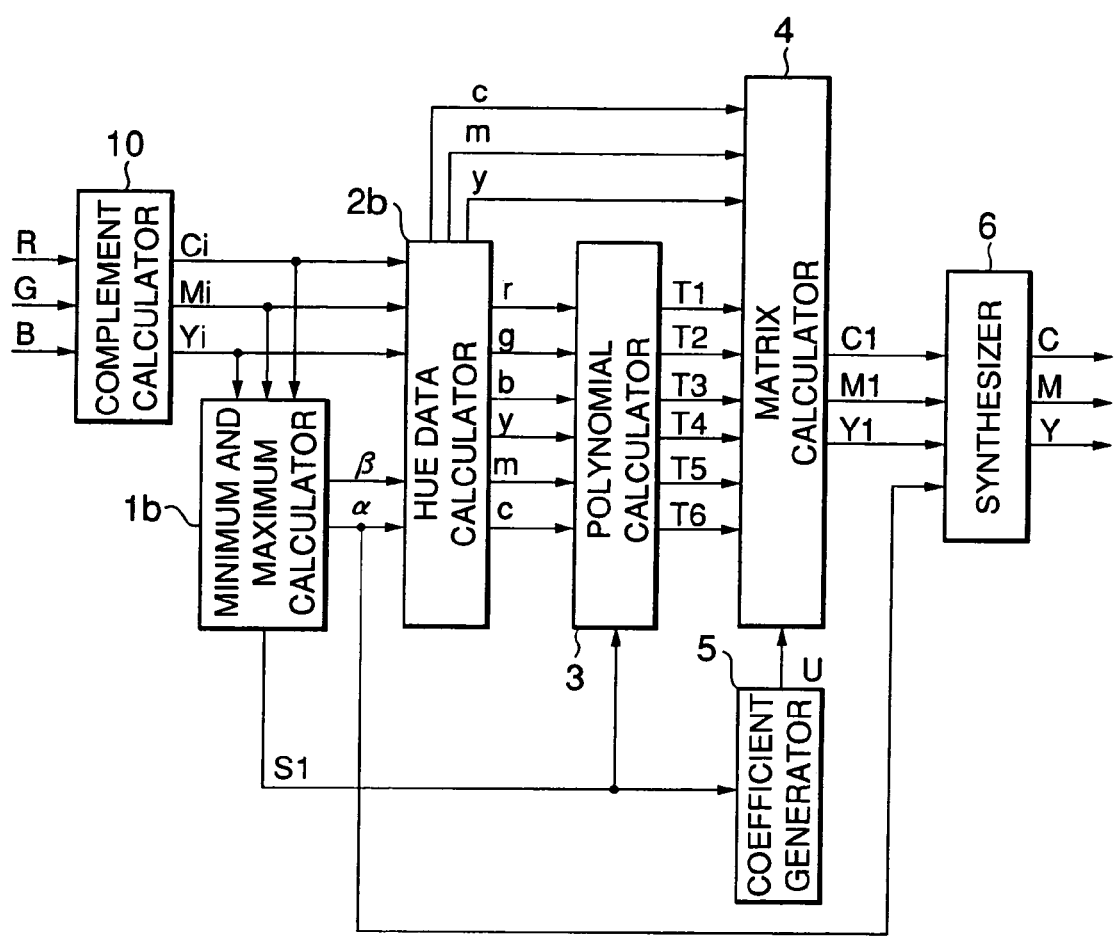
FIG. 12 is a block diagram showing an example of configuration of a color conversion device of Embodiment 2.

FIG. 12 is a block diagram showing an example of configuration of a color conversion device of Embodiment 2 of the present invention. In the drawing, the complementary color data Ci, Mi, and Yi are an example of image information, reference numerals 3 to 6 denote the same members as those described with reference to FIG. 1 in connection with Embodiment 1. Reference numeral 10 denotes a complement calculator; 1b, a minimum and maximum calculator for generating maximum and minimum values $\beta$ and $\alpha$ of complementary color data and an identification code for indicating, among the six hue data, data which are zero; and 2b, a hue data calculator for calculating hue data r, g, b, y, m and c based on complementary color data C, M and Y from the complement calculator 10 and outputs from the minimum and maximum calculator 1b.

Next, the operation will be described. The complement calculator 10 receives the image data R, G and B, and outputs complementary color data Ci, Mi and Yi obtained by determining 1's complements. The minimum and maximum calculator 1b outputs the maximum and minimum values $\beta$ and $\alpha$ of these complementary color data and an identification code S1 for indicating, among the six hue data, data which are zero.

Then, the hue data calculator 2b receives the complementary color data Ci, Mi and Yi and the maximum and minimum values β and α from the minimum and maximum calculator 1b, performs subtraction of r=β−Ci, g=β−Mi, b=β−Yi, y=Yi−α, m=Mi−α, and c=Ci−α, and outputs six hue data r, g, b, y, m and c. Here, at least two among these six hue data are zero. The identification code S1 outputted from the minimum and maximum calculator 1b is used for specifying, among the six hue data, data which is zero. The value of the identification code depends on which of Ci, Mi and Yi the maximum and minimum values β and α are. Relations between the data among the six hue data which are zero, and the values of the identification code are the same as those in Embodiment 1, and thus further explanation will be omitted.

Then, the six hue data r, g, b, y, m and c outputted from the hue data calculator 2 are sent to the polynomial calculator 3, and the hue data c, m and y are also sent to the matrix calculator 4. The polynomial calculator 3 also receives the identification code S1 outputted from the minimum and maximum calculator 1, and performs calculation by selecting, from the hue data, two data Q1 and Q2 which are not zero, and from the hue data y, m and c, two data P1 and P2 which are not of a value zero. The operations are similar to those described in connection with Embodiment 1 with reference to FIG. 2, and their details are omitted.

The outputs from the polynomial calculator 3 are sent to the matrix calculator 4. The coefficient generator 5 generates calculation coefficients U (Fij) and fixed coefficients U (Eij) for the polynomial data based on the identification code S1, and sends the generated coefficients to the matrix calculator 4. Based on the hue data c, m and y from the hue data calculator 2b, polynomial data T1 to T6 from the polynomial calculator 3 and coefficients U from the coefficient generator 5, the matrix calculator 4 outputs the results of calculation according to the following formula (35), as image data C1, M1 and Y1.

$$\begin{bmatrix} C1 \\ M1 \\ Y1 \end{bmatrix} = (Eij) \begin{bmatrix} c \\ m \\ y \end{bmatrix} + (Fij) \begin{bmatrix} T1 \\ T2 \\ T3 \\ T4 \\ T5 \\ T6 \end{bmatrix} \quad (35)$$

For (Eij), i=1 to 3 and j=1 to 3, and for (Fij), i=1 to 3 and j=1 to 6.

The operation at the matrix calculator 4 is similar to that described with reference to FIG. 5 in connection with Embodiment 1, but the inputted hue data is c (or m, y) and C1 (or M1, Y1) is calculated and outputted. The detailed description thereof is therefore omitted.

The synthesizer 6 receives the image data C1, M1 and Y1 from the matrix calculator 4 and the minimum value α outputted from the minimum and maximum calculator 1b representing the achromatic data, performs addition, and outputs image data C, M and Y. The formula used for obtaining the color-converted image data by the color-conversion device of FIG. 12 is therefore as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ r*hry \\ r*hrm \\ g*hgy \\ g*hgc \\ b*hbm \\ b*hbc \end{bmatrix} + \begin{bmatrix} \alpha \\ \alpha \\ \alpha \end{bmatrix} \quad (2)$$

Here, for (Eij), i=1 to 3 and j=1 to 3, and for (Fij), i=1 to 3 and j=1 to 24, and $hry=\min(aq1*g, ap1*m)$, $hrm=\min(aq2*b, ap2*y)$, $hgy=\min(aq3*r, ap3*c)$, $hgc=\min(aq4*b, ap4*y)$, $hbm=\min(aq5*r, ap5*c)$, and $hbc=\min(aq6*g, ap6*m)$, and aq1 to aq6 and ap1 to ap6 indicate calculation coefficients generated by the calculation coefficient generator 15 of FIG. 2.

The difference between the number of calculation terms in the formula (2) and the number of calculation terms in FIG. 12 is that FIG. 12 shows a method of calculation for each pixel excluding data resulting in the calculation terms which are of a value zero, while the formula (2) represents a general formula for a set of pixels. In other words, as in Embodiment 1, the six hue data have such a characteristic that at least two of them are zero. For example, in the case where the value of the identification code S1 is 0, with the maximum and minimum values β and α shown in FIG. 3 being respectively Ri and Gi, equations g=0 and c=0 hold. Accordingly, the twenty-four calculation terms in the formula (2) except the six calculation terms of m*y, b*r, b*r/(b+r), m*y/(m+y), min(r, hrm) and r*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (2) can be reduced to six effective data, and this reduction is achieved by exploiting a characteristic of the hue data.

The combination of effective data changes depending on the image data of the target pixel (the pixel in question), and all the polynomial data are effective in all the image data.

The calculation terms of the above formula (2) produced by the polynomial calculator are identical to those of formula (1) in Embodiment 1, and the relations between the six hues and inter-hue areas, and the effective calculation terms are identical to those shown in FIGS. 11A and 11B. Accordingly, as in the case of Embodiment 1, by changing coefficients of the effective calculation terms for hues or inter-hue areas to be adjusted in the coefficient generator 5, it is possible to adjust only the target hues or inter-hue area.

Further, by changing coefficients generated by the calculation coefficient generator 15 in the polynomial calculator 3, the calculation terms effective in the areas can be changed without influencing the other hues.

If the coefficients U (Ejj) generated by the coefficient generator 5 of Embodiment 2 are set as in the formula (33), and the coefficients U (Fij) are all set to zero, no color conversion is performed, as was described in connection with Embodiment 1. By means of those coefficients U (Fij) for the product terms, fraction terms and calculation terms based on comparison-result data, the hues or inter-hue areas to which the calculation terms relate can be adjusted. By setting the coefficients for the calculation terms which relate to the hues or inter-hue areas to be changed, and setting the other coefficients to zero, it is possible to adjust only the particular hues or inter-hue areas.

As apparent from the foregoing, by changing the coefficients of the product term and fraction terms relating to specific hues, it is possible to adjust only the target hue among the six hues of red, blue, green, yellow, cyan and magenta, without affecting other hues. By changing the coefficients for the first-order terms and second-order terms derived through comparison of the hue data, it is possible to correct the six inter-hue areas of red-yellow, yellow-green, green-cyan, cyan-blue, blue-magenta, and magenta-red independently.

Moreover, the product terms and the second-order terms using comparison-result data represent second-order calculations with respect to the chroma, and the fraction terms and the first-order terms using comparison-result data represent first-order calculations with respect to the chroma. By using both the first-order terms and the second-order terms, it is possible to correct the non-linearity of the chroma in image printing or the like. Accordingly, it is possible to obtain a color conversion device or color conversion method with which the conversion characteristics can be flexibly varied, and which does not require a large-capacity memory. In addition, in the Embodiment 2, the input image data R, G, and B are converted to complementary color data C, M, and Y, and the color conversion is performed on the complementary color data C, M, and Y, so that it is possible to perform good color reproduction of print data C, M, and Y in a printing device or the like.

In the above-description of Embodiment 2, hardware is used to perform the processing of the configuration shown in FIG. 12. Identical processing can be performed by software in the color conversion device, and an effect identical to that of Embodiment 2 can be obtained.

Embodiment 3

In Embodiment 1, part of the matrix calculator 4 is assumed to be as shown in the block diagram of FIG. 5, and the hue data and the calculation terms, and the minimum value α of R, G, B, are added together, as shown in formula (1), to produce the image data R, G, B. As an alternative, coefficients for the minimum value α which is achromatic data may be generated in the coefficient generator, as shown in FIG. 13, to adjust the achromatic component.

Figure 13:
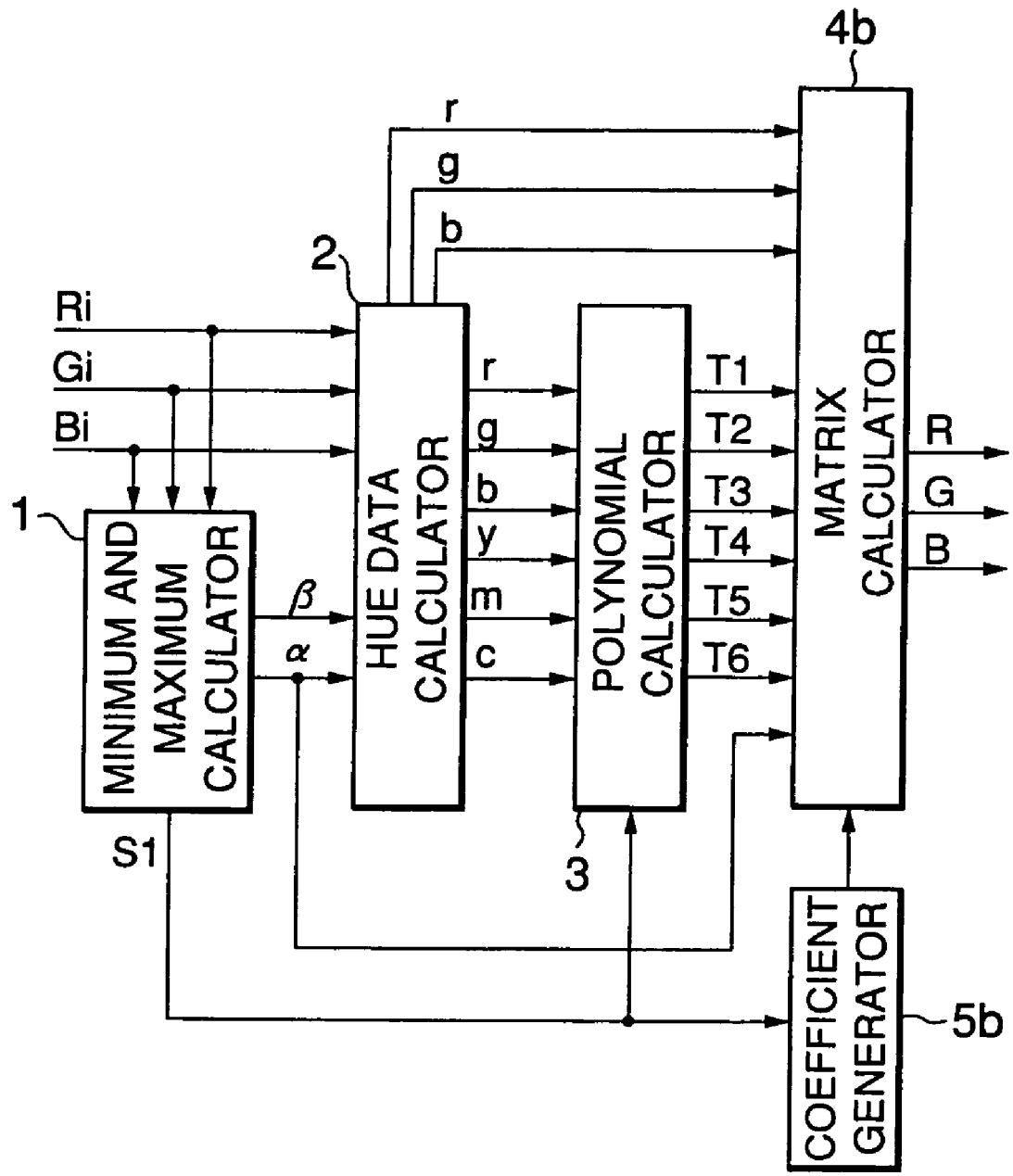
FIG. 13 is a block diagram showing an example of configuration of a color conversion device of Embodiment 3.

FIG. 13 is a block diagram showing an example of configuration of the color conversion device according to Embodiment 3. In the figure, reference numerals 1 to 3 denote members identical to those described in connection with Embodiment 1 with reference to FIG. 1. Reference numeral 4b denotes a matrix calculator, and 5b denotes a coefficient generator.

The operation will next be described. The operations at the minimum and maximum calculator 1 for determining the maximum value β, the-minimum value α, and the identification code S1, based on the input data, at the hue data calculator 2 for determining the six hue data, and at the polynomial calculator 3 for determining the calculation terms are identical to those of Embodiment 1, so their details are omitted.

The coefficient generator 5b in FIG. 13 generates calculation coefficients U (Fij) and fixed coefficients U (Eij) for the polynomial data based on the identification code S1, and sends the generated coefficients to the matrix calculator 4b. Based on the hue data r, g, and b from the hue data calculator 2, polynomial data T1 to T6 from the polynomial calculator 3, the minimum value from the minimum and maximum calculator 1, and coefficients U from the coefficient generator 5b, the matrix calculator 4b performs calculation in accordance with the following formula (36) to adjust the achromatic component.

$$\begin{bmatrix} R \\ G \\ B \end{bmatrix} = (Eij) \begin{bmatrix} r \\ g \\ b \end{bmatrix} + (Fij) \begin{bmatrix} T1 \\ T2 \\ T3 \\ T4 \\ T5 \\ T6 \\ \alpha \end{bmatrix} \quad (36)$$

For (Eij), i=1 to 3 and j=1 to 3, and for (Fij), i=1 to 3 and j=1 to 7.

Figure 14:
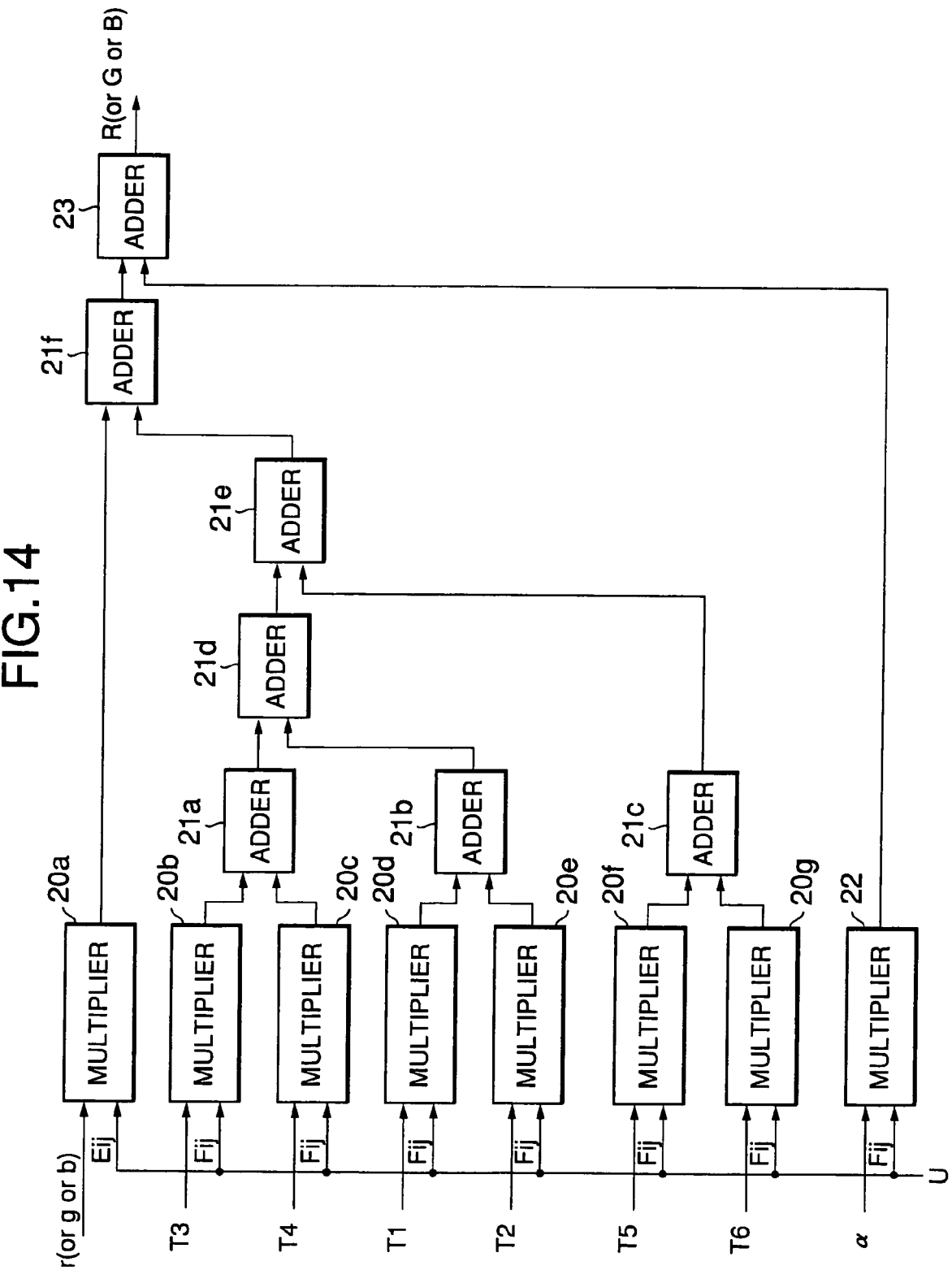
FIG. 14 is a block diagram showing a part of configuration of a matrix calculator 4b in the color conversion device of Embodiment 3.

FIG. 14, which is a block diagram, shows an example of configuration of part of the matrix calculator 4b. In FIG. 14, reference numerals 20a to 20g, 21a to 21f denote members identical to those in the matrix calculator 4 of Embodiment 1. Reference numeral 22 denotes a multiplier which receives the minimum value α from the minimum and maximum calculator 1 representing the achromatic component, and the coefficients U from the coefficient generator 5b, and determines the product thereof. Reference numeral 23 denotes an adder.

Next, the operation of the matrix calculator 4b of FIG. 14 will be described. The multipliers 20a to 20g receive the hue data r, the polynomial data T1 to T6 from the polynomial calculator 3 and the coefficients U (Eij) and U (Fij) from the coefficient generator 5, and output the products thereof. The adders 21a and 21f add the products and/or sums. Their operations are identical to those in the matrix calculator 4 in Embodiment 1. The multiplier 22 receives he minimum value α of the R, G, B, from the minimum and maximum calculator 1, which corresponds to the achromatic component, and the coefficients U (Fij) from the coefficient generator 5b, and determines the product thereof, which is sent to the adder 23, and added to the output of the adder 21f. The total sum is outputted as output R of the image data R. In the example of configuration shown in FIG. 14, if the hue data r is replaced by the hue data g or b, image data G or B can be calculated.

The part of the coefficients (Eij) and (Fij) corresponding to the hue data r, g and b are used. In other words, if three configurations, each similar to that of FIG. 14, are used in parallel for the hue data r, g and b, matrix calculation can be performed at a higher speed.

Thus, the matrix calculator 4b performs calculation on the various calculation terms and the minimum value α which is the achromatic data, using coefficients, adding the result to the hue data, to produce image data R, G and B. The formula used for producing the image data is given below:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ r*hry \\ r*hrm \\ g*hgy \\ g*hgc \\ b*hbm \\ b*hbc \\ \alpha \end{bmatrix} \quad (3)$$

Here, for (Eij), i=1 to 3 and j=1 to 3, and for (Fij), i=1 to 3 and j=1 to 25.

The difference between the number of calculation terms in the formula (3) and the number of calculation terms in FIG. 13 is that FIG. 13 shows a method of calculation for each pixel excluding data resulting in the calculation terms in the polynomial calculator which are of a value zero, while the formula (3) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-five calculation terms in the formula (3) except the seven calculation terms of m*y, b*r, b*r/(b+r), m*y/(m+y), min(r, hrm), r*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (3) can be reduced to seven effective data, and this reduction is achieved by exploiting a characteristic of the hue data.

The combination of effective data is changed according to image data of the target pixel. For all image data, all the polynomial data can be effective.

If all the coefficients relating to the minimum value α are of a value "1," the achromatic data is not converted, and will be a value identical to that of the achromatic data in the input data. If the coefficients in the matrix calculation are changed, it is possible to select reddish black, bluish black or the like, so that it is possible to adjust the achromatic component.

As apparent from the foregoing, by changing the coefficients of the product terms and the fraction terms relating to the specific hues, and the coefficients of the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 3, the color conversion is performed on the input image data R, G, and B, so that it is possible to achieve good color reproduction in a display device such as a monitor, or an image processing device using image data represented by R, G and B, and greater advantages can be obtained.

In Embodiment 3 described above, the hue data r, g and b, y, m and c, and the maximum and minimum values β and α were calculated based on the inputted image data R, G and B so as to obtain the calculation terms for the respective hues, and after the matrix calculation, the image data R, G and B were obtained. However, after the outputted image data are obtained, the data R, G and B may be converted into complementary color data C, M and Y. In this case, the same effects will be realized.

In the above-description of Embodiment 3, hardware is used to perform the required processing. Identical processing can be performed by software, as was also stated in connection with Embodiment 1, and an effect identical to that of Embodiment 3 can be obtained.

Embodiment 4

In Embodiment 2, the configuration is such that the hue data and the calculation terms, and the minimum value α are added together, as shown in formula (2). As an alternative, coefficients for the minimum value α which is achromatic data may be generated in the coefficient generator, as shown in FIG. 15, to adjust the achromatic component.

Figure 15:
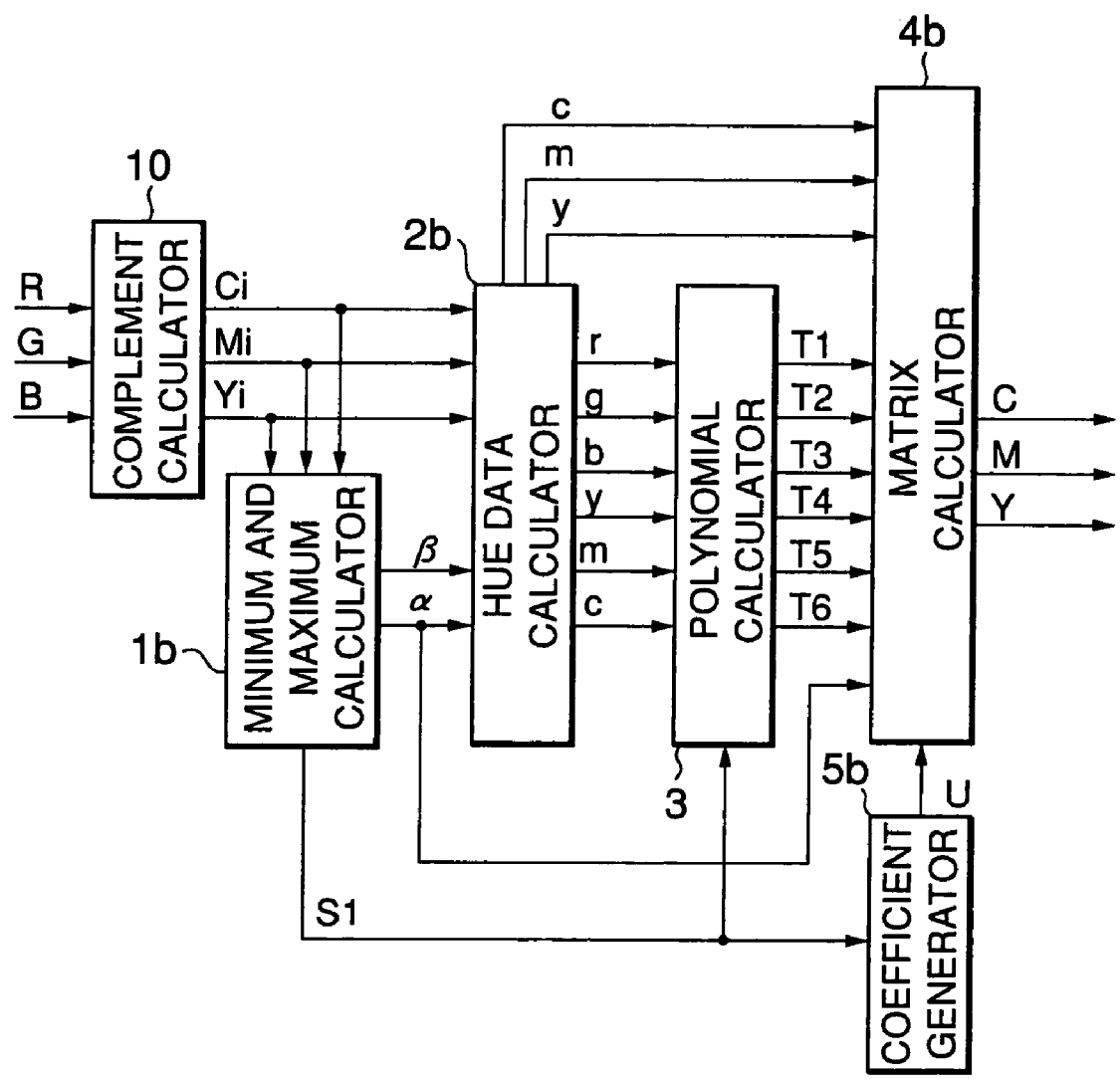
FIG. 15 is a block diagram showing an example of configuration of a color conversion device of Embodiment 4.

FIG. 15 is a block diagram showing an example of configuration of the color conversion device according to Embodiment 4. In the figure, reference numerals 10, 1b, 2b and 3 denote members identical to those of Embodiment 2 shown in FIG. 12, while reference numerals 4b and 5b denote members identical to those of Embodiment 3 shown in FIG. 13.

The operation will next be described. The image data R, G and B are inputted to the complement calculator 10, which produces the complementary color data Ci, Mi and Yi by determining 1's complements. The minimum and maximum calculator 1b determines the maximum value β, the minimum value α, and the identification code S1, while the hue data calculator 2b determines the six hue data. The polynomial calculator 3 determines the calculation terms. These operations are identical to those of Embodiment 2 with regard to the complementary color data C, M and Y, so their details are omitted.

The coefficient generator 5b in FIG. 15 generates calculation coefficients U (Fij) and fixed coefficients U (Eij) for the polynomial data based on the identification code S1, and sends the generated coefficients to the matrix calculator 4b. Based on the hue data c, m, and y from the hue data calculator 2b, polynomial data T1 to T6 from the polynomial calculator 3, the minimum value from the minimum and maximum calculator 1b, and coefficients U from the coefficient generator 5b, the matrix calculator 4b performs calculation in accordance with the following formula (37) to adjust the achromatic component.

$$\begin{bmatrix} C \\ M \\ Y \end{bmatrix} = (Eij) \begin{bmatrix} c \\ m \\ y \end{bmatrix} + (Fij) \begin{bmatrix} T1 \\ T2 \\ T3 \\ T4 \\ T5 \\ T6 \\ \alpha \end{bmatrix} \quad (37)$$

For (Eij), i=1 to 3 and j=1 to 3, and for (Fij), i=1 to 3 and j=1 to 7.

The operation of the matrix calculator 4b is similar to that described with reference to FIG. 14 in connection with Embodiment 3, with the inputted hue data c (or m or y) being substituted to determine and output C (or M or Y), so that its details description is omitted.

Thus, the matrix calculator 4b performs calculation on the various calculation terms and the minimum value $\alpha$ which is the achromatic data, using coefficients, adding the result to the hue data, to produce image data C, M, and Y. The formula used for producing the image data is given below:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ r*hry \\ r*hrm \\ g*hgy \\ g*hgc \\ b*hbm \\ b*hbc \\ \alpha \end{bmatrix} \quad (4)$$

Here, for (Eij), i=1 to 3 and j=1 to 3, and for (Fij), i=1 to 3 and j=1 to 25.

The difference between the number of calculation terms in the formula (4) and the number of calculation terms in FIG. 15 is that FIG. 15 shows a method of calculation for each pixel excluding data resulting in the calculation terms in the polynomial calculator which are of a value zero, while the formula (4) represents a general formula for a set of pixels. In other words, the six hue data have such a characteristic that at least two of them are zero, as in the above-described embodiments. For example, in the case where the value of the identification code S1 is 0, with the maximum and minimum values $\beta$ and $\alpha$ shown in FIG. 3 being respectively Ri and Gi, equations g=0 and c=0 hold. Accordingly, the twenty-five calculation terms in the formula (4) except the seven calculation terms of m*y, b*r, b*r/(b+r), m*y/(m+y), min(r, hrm), r*hrm, and $\alpha$, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (4) can be reduced to seven effective data, and this reduction is achieved by exploiting a characteristic of the hue data.

The combination of effective data is changed according to image data of the target pixel. For all image data, all the polynomial data can be effective.

If all the coefficients relating to the minimum value $\alpha$ are of a value "1," the achromatic data is not converted, and will be a value identical to that of the achromatic data in the input data. If the coefficients in the matrix calculation are changed, it is possible to select reddish black, bluish black or the like, so that it is possible to adjust the achromatic component.

As apparent from the foregoing, by changing the coefficients of the product terms and the fraction terms relating to the specific hues, and the coefficients of the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value $\alpha$ which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 4, the color conversion is performed on the complementary color data C, M, and Y, having been obtained by conversion from the input image data R, G, and B, so that it is possible to achieve good color reproduction in color conversion of the printing data C, M, and Y in a printing device or the like, and greater advantages can be obtained.

In the above-description of Embodiment 4, hardware is used to perform the required processing. Identical processing can be performed by software, as was also stated in connection with the above-described embodiments, and an effect identical to that of Embodiment 4 can be obtained.

Embodiment 5

In Embodiments 1 to 4 described above, an example of the polynomial calculator 3 shown in FIG. 2 was used, and the polynomial data of the formulas (1) to (4) are calculated and outputted. As an alternative, a configuration shown in FIG. 16 may be used to calculate polynomial data.

Figure 16:
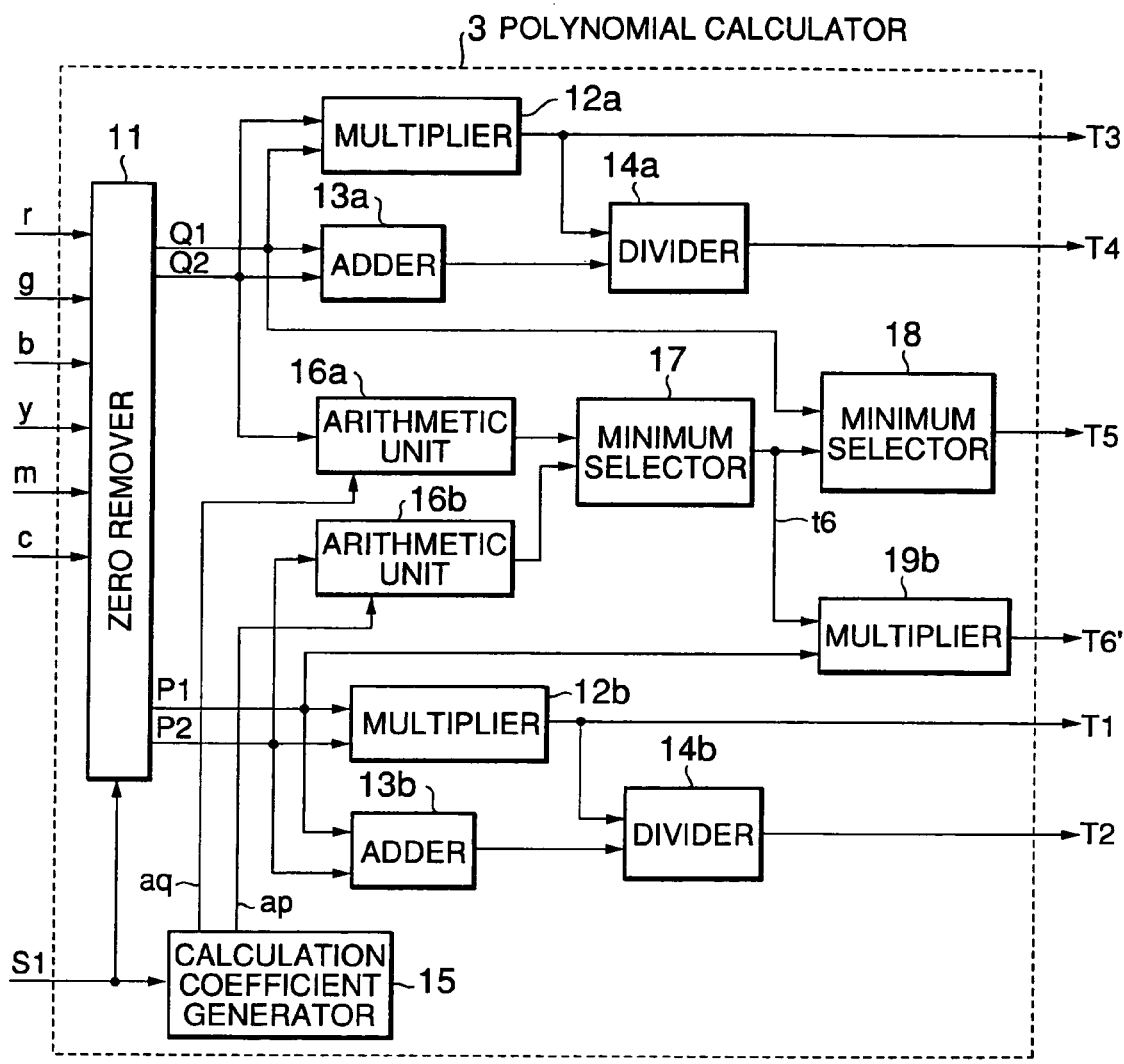
FIG. 16 is a block diagram showing another example of configuration of a polynomial calculator in a color conversion device of Embodiment 5.
Figure 17A:
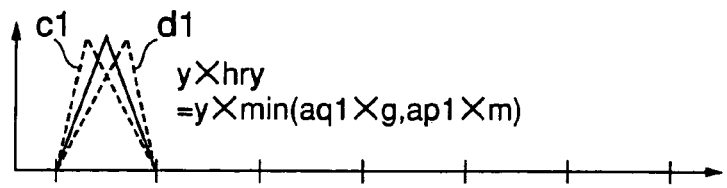
FIGS. 17A to 17F are schematic diagrams showing the relations between the hues and the second-order terms using comparison-result data in the color conversion device of Embodiment 5.
Figure 17B:
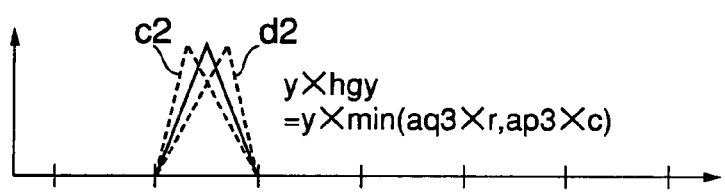
Figure 17C:
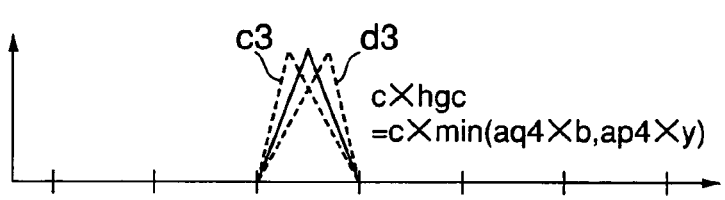
Figure 17D:
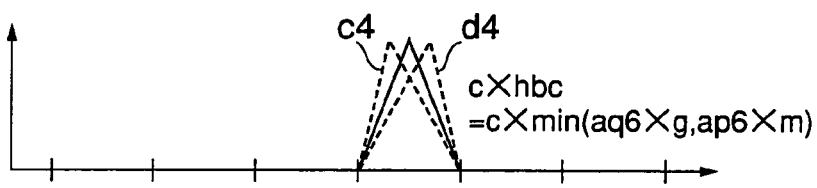
Figure 17E:
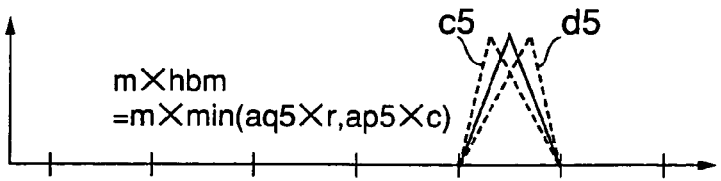
Figure 17F:
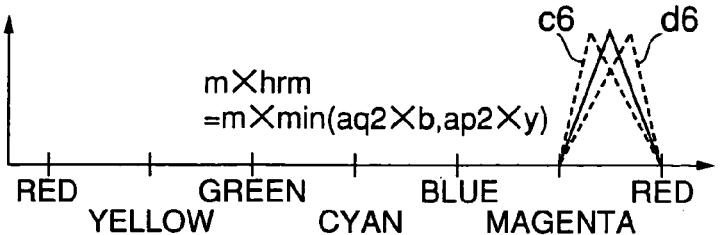

FIG. 16 is a block diagram showing another example of configuration of the polynomial calculator 3. In the drawing, reference numerals 11 to 18 denote members identical to those of the polynomial calculator shown in FIG. 2. Reference numeral 19b denotes a multiplier.

Next, the operation of the polynomial calculator 3 shown in FIG. 16 will be described. The operation of the zero remover 11, and the operation for outputting T3=Q1*Q2, T4=T3/(Q1+Q2), T1=P1*P2 and T2=T1/(P1+P2) by the multipliers 12a and 12b, the adders 13a and 13b and the dividers 14a and 14b and the operation for outputting t6=min (aq*Q2, ap*P2) by the the calculation coefficient generator 15, the calculators 16a and 16b and the minimum value selector 17, and the operation for outputting the minimum values T5=min(Q1, min(aq*Q2, ap*P2)) between Q1 and t6 by the minimum value selector 18 are identical to those of the embodiment described above with reference to FIG. 2. Thus, detailed explanation thereof will be omitted.

The output t6=min(aq*Q2, ap*P2) from the minimum value selector 17 is also supplied to the multiplier 19b, which also receives the data P1 from the zero remover 11, and performs multiplication P1 by t6=min(aq*Q2, ap*P2), and outputs the product T6'=P1*min(aq*Q2, ap*P2). Accordingly, the polynomial data T1, T2, T3, T4, T5 and T6' are outputted from the polynomial calculator shown in FIG. 16, and these outputs of the polynomial calculator are sent to the matrix calculator 4 or 4b.

Thus, according to the polynomial calculator 3 described with reference to FIG. 16, the formula used for determining the image data R, G and B obtained by color conversion by the method described with reference to FIG. 1 in connection with Embodiment 1 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ y*hrm \\ m*hrm \\ y*hgy \\ c*hgc \\ m*hbm \\ c*hbc \end{bmatrix} + \begin{bmatrix} \alpha \\ \alpha \\ \alpha \end{bmatrix} \quad (5)$$

Here, for (Eij), i=1 to 3, and j=1 to 3, and for (Fij), i=1 to 3, and j=1 to 24, and $hry=\min(aq1*g, ap1*m)$, $hrm=\min(aq2*b, ap2*y)$, $hgy=\min(aq3*r, ap3*c)$, $hgc=\min(aq4*b, ap4*y)$, $hbm=\min(aq5*r, ap5*c)$, and $hbc=\min(aq6*g, ap6*m)$, and aq1 to aq6 and ap1 to ap6 indicate calculation coefficients generated by the calculation coefficient generator shown in FIG. 16.

The difference between the number of calculation terms in the formula (5) and the number of calculation terms in FIG. 16 is that FIG. 16 shows a method of calculation for each pixel excluding data resulting in the calculation terms which are of a value zero, while the formula (5) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-four calculation terms in the formula (5) except the six calculation terms of m*y, b*r, b*r/(b+r), m*y/(m+y), min(r, hrm), and m*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (5) can be reduced to six effective data, and this reduction is achieved by exploiting a characteristic of the hue data. The combination of effective data is changed according to image data of the target pixel. For all image data, all the polynomial data can be effective.

FIGS. 17A to 17F schematically show relations between the six hues and second-order terms of y*hry, y*hgy, c*hgc, c*hbc, m*hbm and m*hrm, which are product terms based on the comparison-result data and the hue data. In the drawings, broken lines c1 to c6 and d1 to d6 represent characteristics obtained when the calculation coefficients aq1 to aq6 and ap1 to ap6 in hry, hrm, hgy, hgc, hbm and hbc are changed. Solid lines represent characteristics obtained when the values of the calculation coefficients aq1 to aq6 and ap1 to ap6 are 1. From FIGS. 17A to 17F, it can be understood that the second-order terms using comparison-result data contribute to changes in the inter-hue areas of red to yellow, yellow to green, green to cyan, cyan to blue, blue to magenta, and magenta to red.

In other words, for example, for the inter-hue area of red to yellow, since r=W, g=W/2 and b=0, with W being a constant, y=W, m=W/2, c=0, and y*hry=W*W/2, and the other five terms are all zero.

Here, since the constant W represents a magnitude of a hue signal, a size of the constant W depends on color brightness or chroma of a pixel, and the product term r*hry is a second-order function of the chroma. The other product terms are also second-order functions with respect to the chroma in the inter-hue areas where the terms are effective. Accordingly, an effect of each product term on color reproduction is increased as in a second-order fashion with the increase of the chroma. In other words, the product term is a second-order term which serves as a second-order compensation term for the chroma in the color reproduction. Accordingly, only y*hry is an effective second-order term for red-yellow. Similarly, only y*hgy is an effective term for yellow-green; c*hgc for green-cyan; c*hbc for cyan-blue; m*hbm for blue-magenta; and m*hrm for magenta-red.

FIGS. 18A and 18B respectively show relations between the six hues and inter-hue areas and effective calculation terms. Thus, if the coefficient generator changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3 are changed, part of the inter-hue area where a calculation term in the inter-hue area is effective can be changed without giving any influence to the other hues.

As apparent from the foregoing, by changing the coefficients of the product terms and the fraction terms relating to the specific hues, it is possible to adjust only the target hue, among the six hues of red, blue, green, yellow, cyan and magenta, without affecting other hues. Moreover, by changing the coefficients relating the first-order and second-order calculation terms using comparison-result data based on the hue data, it is possible to independently correct the inter-hue areas of red-yellow, yellow-green, green-cyan, cyan-blue, blue-magenta, and magenta-red, to change the six inter-hue areas. Furthermore, the product terms and the second-order terms using comparison-result data represent second-order calculations with respect to chroma, and the fraction terms and the first-order terms using comparison-result data represent first-order calculations with respect to chroma. As a result, by using both of the first-order and second-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 5, the color conversion is performed on the input image data R, G, and B, so that it is possible to achieve good color reproduction in a display device, such a monitor, or an image processing device using image data represented by R, G, and B, and greater advantages can be obtained.

In the above-description of Embodiment 5, hardware is used to perform the processing of the configuration of FIG. 16. Identical processing can be performed by software, and an effect identical to that of Embodiment 5 can be obtained.

Embodiment 6

According to the polynomial calculator 3 described with reference to FIG. 16 in connection with Embodiment 5, the formula used for determining the complementary color data C, M and Y obtained by color conversion by the method described with reference to FIG. 12 in connection with Embodiment 2 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ y*hry \\ m*hrm \\ y*hgy \\ c*hgc \\ m*hbm \\ c*hbc \end{bmatrix} + \begin{bmatrix} \alpha \\ \alpha \\ \alpha \end{bmatrix} \quad (6)$$

Here, for (Eij), i=1 to 3, and j=1 to 3, and for (Fij), i=1 to 3, and j=1 to 24, and $hry=\min(aq1*g, ap1*m),$ $hrm=\min(aq2*b, ap2*y),$ $hgy=\min(aq3*r, ap3*c),$ $hgc=\min(aq4*b, ap4*y),$ $hbm=\min(aq5*r, ap5*c),$ and $hbc=\min(aq6*g, ap6*m),$ and aq1 to aq6 and ap1 to ap6 indicate calculation coefficients generated by the calculation coefficient generator 15 shown in FIG. 16.

The difference between the number of calculation terms in the formula (6) and the number of calculation terms in FIG. 16 is that FIG. 16 shows a method of calculation for each pixel excluding data resulting in the calculation terms which are of a value zero, while the formula (6) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-four calculation terms in the formula (6) except the six calculation terms of m*y, b*r, b*r/(b+r), m*y/(m+y), min(r, hrm), and m*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (6) can be reduced to six effective data, and this reduction is achieved by exploiting a characteristic of the hue data. The combination of effective data is changed according to image data of the target pixel. For all image data, all the polynomial data can be effective.

The calculation terms by the polynomial calculator according to the formula (6) are identical to those of the formula (5) in Embodiment 5, and the relations between the six hues and inter-hue areas, and the effective calculation terms is identical to those shown in FIGS. 18A and 18B. Accordingly, as in Embodiment 5, if the coefficient generator changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3 are changed, part of the inter-hue area where a calculation term in the inter-hue area is effective can be changed without giving any influence to the other hues.

As apparent from the foregoing, by changing the coefficients of the product terms and the fraction terms relating to the specific hues, it is possible to adjust only the target hue, among the six hues of red, blue, green, yellow, cyan and magenta, without affecting other hues. Moreover, by changing the coefficients relating the first-order and second-order calculation terms using comparison-result data based on the hue data, it is possible to independently correct the inter-hue areas of red-yellow, yellow-green, green-cyan, cyan-blue, blue-magenta, and magenta-red, to change the six inter-hue areas. Furthermore, the product terms and the second-order terms using comparison-result data represent second-order calculations with respect to chroma, and the fraction terms and the first-order terms using comparison-result data represent first-order calculations with respect to chroma. As a result, by using both of the first-order and second-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 6, the color conversion is performed on the complementary color data obtained by conversion from the input image data R, G, and B, so that it is possible to achieve good color reproduction in color conversion of printing data C, M and Y in a printing device or the like, and greater advantages can be obtained.

Embodiment 7

According to the polynomial calculator 3 described with reference to FIG. 16 in connection with Embodiment 5, the formula used for determining the image data R, G and B obtained by color conversion by the method described with reference to FIG. 13 in connection with Embodiment 3 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ y*hry \\ m*hrm \\ y*hgy \\ c*hgc \\ m*hbm \\ c*hbc \\ \alpha \end{bmatrix} \quad (7)$$

Here, for (Eij), i=1 to 3, and j=1 to 3, and for (Fij), i=1 to 3, and j=1 to 25.

The difference between the number of calculation terms in the formula (7) and the number of calculation terms in the polynomial calculator in FIG. 16 is that FIG. 16 shows a method of calculation for each pixel excluding data resulting in the calculation terms which are of a value zero, while the formula (7) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-five calculation terms in the formula (7) except the seven calculation terms of m*y, b*r, b*r/(b+r), m*y/(m+y), min(r, hrm), m*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (7) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms and the fraction terms relating to the specific hues, and the coefficients of the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 7, the color conversion is performed on the input image data R, G, and B, so that it is possible to achieve good color reproduction in a display device such as a monitor, or an image processing device using image data represented by R, G and B, and greater advantages can be obtained.

Embodiment 8

According to the polynomial calculator 3 described with reference to FIG. 16 in connection with Embodiment 5, the formula used for determining the complementary color data C, M and Y obtained by color conversion by the method described with reference to FIG. 15 in connection with Embodiment 4 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(r, hry) \\ \min(r, hrm) \\ \min(g, hgy) \\ \min(g, hgc) \\ \min(b, hbm) \\ \min(b, hbc) \\ y*hry \\ m*hrm \\ y*hgy \\ c*hgc \\ m*hbm \\ c*hbc \\ \alpha \end{bmatrix} \quad (8)$$

Here, for (Eij), i=1 to 3, and j=1 to 3, and for (Fij), i=1 to 3, and j=1 to 25.

The difference between the number of calculation terms in the formula (8) and the number of calculation terms in the polynomial calculator in FIG. 16 is that FIG. 16 shows a method of calculation for each pixel excluding data resulting in the calculation terms which are of a value zero, while the formula (8) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-five calculation terms in the formula (8) except the seven calculation terms of m*y, b*r, b*r/(b+r), m*y/(m+y), min(r, hrm), m*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (8) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms and the fraction terms relating to the specific hues, and the coefficients of the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 8, the color conversion is performed on the complementary color data C, M and Y obtained by color conversion from the input image data R, G, and B, so that it is possible to achieve good color reproduction in color conversion of printing data C, M and Y in a printing device or the like, and greater advantages can be obtained.

Embodiment 9

Figure 19:
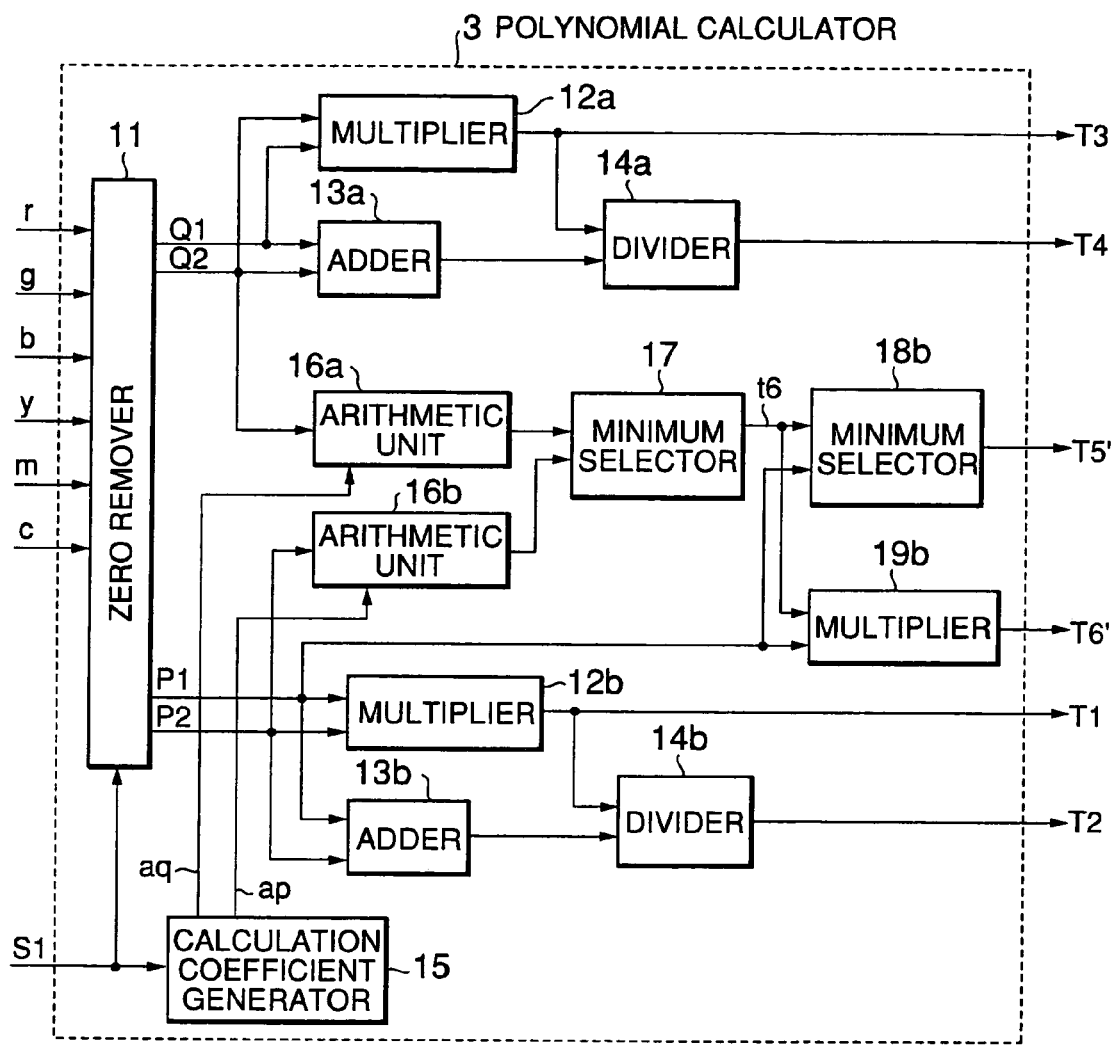
FIG. 19 is a block diagram showing another example of configuration of a polynomial calculator in a color conversion device of Embodiment 9.
Figure 20A:
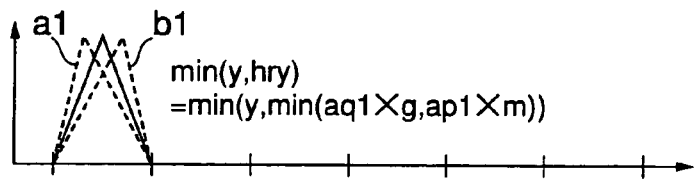
FIGS. 20A to 20F are schematic diagrams showing the relations between the hues and the first-order terms using comparison-result data in the color conversion device of Embodiment 9.
Figure 20B:
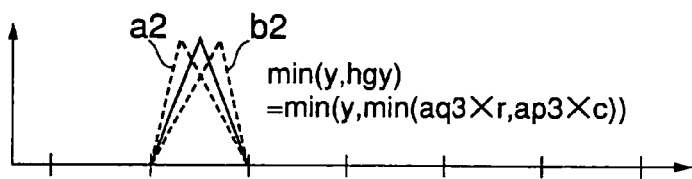
Figure 20C:
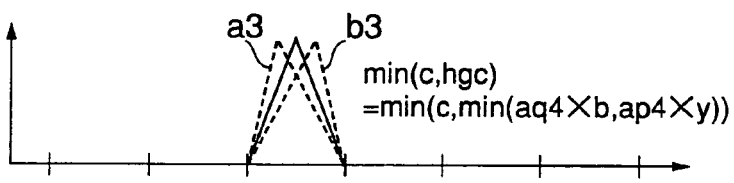
Figure 20D:
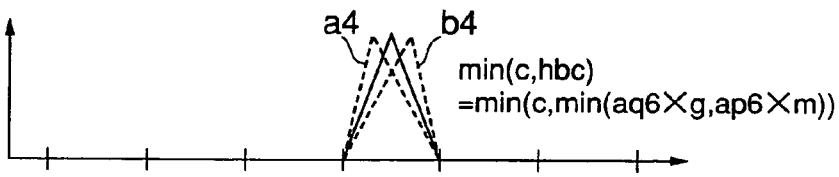
Figure 20E:
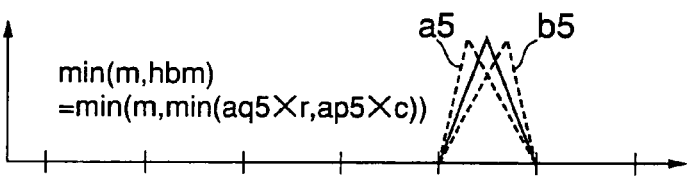
Figure 20F:
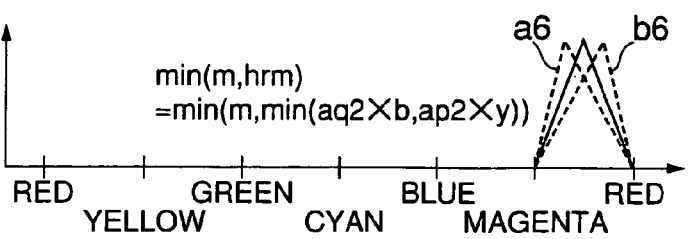

As another example, the polynomial calculator 3 may be formed as shown in FIG. 19, to calculate the polynomial data.

FIG. 19 is a block diagram showing another example of configuration of the polynomial calculator 3. In the drawing, reference numerals 11 to 17 denote members identical to those of the polynomial calculator shown in FIG. 2. Reference numeral 19b denotes a member identical to those in FIG. 16. Reference numeral 18b denotes a minimum value selector for selecting and outputting the minimum value of the input data.

Next, the operation of the polynomial calculator 3 shown in FIG. 19 will be described. The operation of the zero remover 11, and the operation for outputting T3=Q1*Q2, T4=T3/(Q1+Q2), T1=P1*P2 and T2=T1/(P1+P2) by the multipliers 12a and 12b, the adders 13a and 13b and the dividers 14a and 14b, and the operation for outputting t6=min(aq*Q2, ap*P2) by the the calculation coefficient generator 15, the calculators 16a and 16b and the minimum value selector 17 are identical to those of the embodiment described above with reference to FIG. 2. Thus, detailed explanation thereof will be omitted.

The output t6=min(aq*Q2, ap*P2) from the minimum value selector 17 is supplied to the minimum value selector 18b and the multiplier 19b. The minimum value selector 18b also receives the output data P1 from the zero remover 11, and outputs the minimum value T5'=min(P1, min(aq*Q2, ap*P2)) between P1 and t6=min(aq*Q2, ap*P2). The multiplier 19b receives the data P1 from the zero remover 11, and the output t6 from the minimum value selector 17, and performs multiplication P1 by t6=min(aq*Q2, ap*P2), and outputs the product T6'=P1*min(aq*Q2, ap*P2). Accordingly, the polynomial data T1, T2, T3, T4, T5' and T6' are outputted from the polynomial calculator shown in FIG. 16, and these outputs of the polynomial calculator are sent to the matrix calculator 4 or 4b.

Thus, according to the polynomial calculator 3 described with reference to FIG. 19, the formula used for determining the image data R, G and B obtained by color conversion by the method described with reference to FIG. 1 in connection with Embodiment 1 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ y*hry \\ y*hgy \\ c*hgc \\ c*hbc \\ m*hbm \\ m*hrm \end{bmatrix} + \begin{bmatrix} \alpha \\ \alpha \\ \alpha \end{bmatrix} \quad (9)$$

Here, for (Eij), i=1 to 3, and j=1 to 3, and for (Fij), i=1 to 3, and j=1 to 24, and $hry=\min(aq1*g, ap1*m)$, $hrm=\min(aq2*b, ap2*y)$, $hgy=\min(aq3*r, ap3*c)$, $hgc=\min(aq4*b, ap4*y)$, $hbm=\min(aq5*r, ap5*c)$, and $hbc=\min(aq6*g, ap6*m)$, and aq1 to aq6 and ap1 to ap6 indicate calculation coefficients generated by the calculation coefficient generator 15 shown in FIG. 19.

The difference between the number of calculation terms in the formula (9) and the number of calculation terms in FIG. 19 is that FIG. 19 shows a method of calculation for each pixel excluding data resulting in the calculation terms which are of a value zero, while the formula (9) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-four calculation terms in the formula (9) except the six calculation terms of m*y, b*r, b*r/(b+r), m*y/(m+y), min(m, hrm), and m*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (9) can be reduced to six effective data, and this reduction is achieved by exploiting a characteristic of the hue data. The combination of effective data is changed according to image data of the target pixel. For all image data, all the polynomial data can be effective.

FIGS. 20A to 20F schematically show relations between the six hues and first-order terms min(y, hry), min(y, hgy), min(c, hgc), min(c, hbc), min(m, hbm) and min(m, hrm), based on the comparison-result data. In the drawings, broken lines a1 to a6 and b1 to b6 represent characteristics obtained when the calculation coefficients aq1 to aq6 and ap1 to ap6 in hry, hrm, hgy, hgc, hbm and hbc are changed. Solid lines represent characteristics obtained when the values of the calculation coefficients aq1 to aq6 and ap1 to ap6 are 1. From FIGS. 20A to 207F, it can be understood that the first-order terms using comparison-result data contribute to changes in the inter-hue areas of red-yellow, yellow-green, green-cyan, cyan-blue, blue-magenta, and magenta-red.

In other words, for example, for the inter-hue area of red-yellow, since r=W, g=W/2 and b=0, with W being a constant, y=W, m=W/2, c=0, and min(y, hry)=W*W/2, and the other five terms are all zero.

Here, since the constant W represents a magnitude of a hue signal, a size of the constant W depends on color brightness or chroma of a pixel, and the first-order term min(r, hry) is a first-order function with respect to the chroma. The other product terms are also first-order functions with respect to the chroma in the inter-hue areas where the terms are effective. Accordingly, the effect on the color reproduction given by the first-order term based on each comparison-result data is a first-order function with respect to the chroma. In other words, the first-order term based on each comparison-result data serves as a first-order correction term for the chroma, in color reproduction. Accordingly, only min(y, hry) is an effective first-order term. Similarly, only min(y, hgy) is an effective term for yellow-green;

min(c, hgc) for green-cyan; min(c, hbc) for cyan-blue; min(m, hbm) for blue-magenta; and min(m, hrm) for magenta-red.

The relationship between the six hues and second-order calculation terms y*hry, y*hgy, c*hgc, c*hbc, m*hbm, and m*hrm which are product terms based on the comparison-result data and the hue data is identical to that described with reference to FIGS. 17A to 17F in connection with Embodiment 5 to Embodiment 8. Only y*hry is an effective second-order calculation term for red-yellow. Similarly, only y*hgy is an effective term for yellow-green; c*hgc for green-cyan; c*hbc for cyan-blue; m*hbm for blue-magenta; and m*hrm for magenta-red.

FIGS. 21A to 21B respectively show relations between the six hues and inter-hue areas and effective calculation terms. Thus, if the coefficient generator changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3 are changed, part of the inter-hue area where a calculation term in the inter-hue area is effective can be changed without giving any influence to the other hues.

As apparent from the foregoing, by changing the coefficients of the product terms and the fraction terms relating to the specific hues, it is possible to adjust only the target hue, among the six hues of red, blue, green, yellow, cyan and magenta, without affecting other hues. Moreover, by changing the coefficients relating the first-order and second-order terms using comparison-result data based on the hue data, it is possible to independently correct the inter-hue areas of red-yellow, yellow-green, green-cyan, cyan-blue, blue-magenta, and magenta-red, to change the six inter-hue areas. Furthermore, the product terms and the second-order terms using comparison-result data represent second-order calculations with respect to chroma, and the fraction terms and the first-order terms using comparison-result data represent first-order calculations with respect to chroma. As a result, by using both of the first-order and second-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 9, the color conversion is performed on the input image data R, G, and B, so that it is possible to achieve good color reproduction in a display device, such a monitor, or an image processing device using image data represented by R, G, and B, and greater advantages can be obtained.

In the above-description of Embodiment 9, hardware is used to perform the processing of the configuration of FIG. 16. Identical processing can be performed by software, and an effect identical to that of Embodiment 9 can be obtained.

Embodiment 10

According to the polynomial calculator 3 described with reference to FIG. 19 in connection with Embodiment 9, the formula used-for determining the complementary color data C, M and Y obtained by color conversion by the method described with reference to FIG. 12 in connection with Embodiment 2 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ y*hry \\ y*hgy \\ c*hgc \\ c*hbc \\ m*hbm \\ m*hrm \end{bmatrix} + \begin{bmatrix} \alpha \\ \alpha \\ \alpha \end{bmatrix} \quad (10)$$

Here, for (Eij), i=1 to 3, and j=1 to 3, and for (Fij), i=1 to 3, and j=1 to 24, and $hry=\min(aq1*g, ap1*m)$, $hrm=\min(aq2*b, ap2*y)$, $hgy=\min(aq3*r, ap3*c)$, $hgc=\min(aq4*b, ap4*y)$, $hbm=\min(aq5*r, ap5*c)$, and $hbc=\min(aq6*g, ap6*m)$, and aq1 to aq6 and ap1 to ap6 indicate calculation coefficients generated by the calculation coefficient generator 15 shown in FIG. 19.

The difference between the number of calculation terms in the formula (10) and the number of calculation terms in FIG. 19 is that FIG. 19 shows a method of calculation for each pixel excluding data resulting in the calculation terms which are of a value zero, while the formula (10) represents a general formula for a set of pixels. In other words, the six hue data have such a characteristic that at least two of them are zero, as in the above-described embodiments. For example, in the case where the value of the identification code S1 is 0, with the maximum and minimum values $\beta$ and $\alpha$ shown in FIG. 3 being respectively Ri and Gi, equations g=0 and c=0 hold. Accordingly, the twenty-four calculation terms in the formula (10) except the six calculation terms of m*y, b*r, b*r/(b+r), m*y/(m+y), min(m, hrm), and m*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (10) can be reduced to six effective data, and this reduction is achieved by exploiting a characteristic of the hue data. The combination of effective data is changed according to image data of the target pixel. For all image data, all the polynomial data can be effective.

The calculation terms by the polynomial calculator according to the formula (10) are identical to those of the formula (9) in Embodiment 9, and the relations between the six hues and inter-hue areas, and the effective calculation terms is identical to those shown in FIGS. 21A and 21B. Accordingly, as in Embodiment 9, if the coefficient generator changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3 are changed, part of the inter-hue area where a calculation term in the inter-hue area is effective can be changed without giving any influence to the other hues.

As apparent from the foregoing, by changing the coefficients of the product terms and the fraction terms relating to the specific hues, it is possible to adjust only the target hue, among the six hues of red, blue, green, yellow, cyan and magenta, without affecting other hues. Moreover, by changing the coefficients relating the first-order and second-order calculation terms using comparison-result data based on the hue data, it is possible to independently correct the inter-hue areas of red-yellow, yellow-green, green-cyan, cyan-blue, blue-magenta, and magenta-red, to change the six inter-hue areas. Furthermore, the product terms and the second-order terms using comparison-result data represent second-order calculations with respect to chroma, and the fraction terms and the first-order terms using comparison-result data represent first-order calculations with respect to chroma. As a result, by using both of the first-order and second-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 10, the color conversion is performed on the complementary color data obtained by conversion from the input image data R, G, and B, so that it is possible to achieve good color reproduction in color conversion of printing data C, M and Y in a printing device or the like, and greater advantages can be obtained.

Embodiment 11

According to the polynomial calculator 3 described with reference to FIG. 19 in connection with Embodiment 9, the formula used for determining the image data R, G and B obtained by color conversion by the method described with reference to FIG. 13 in connection with Embodiment 3 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ y*hry \\ y*hgy \\ c*hgc \\ c*hbc \\ m*hbm \\ m*hrm \\ \alpha \end{bmatrix} \quad (11)$$

Here, for (Eij), i=1 to 3, and j=1 to 3, and for (Fij), i=1 to 3, and j=1 to 25.

The difference between the number of calculation terms in the formula (11) and the number of calculation terms in the polynomial calculator in FIG. 19 is that FIG. 19 shows a method of calculation for each pixel excluding data resulting in the calculation terms which are of a value zero, while the formula (11) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-five calculation terms in the formula (11) except the seven calculation terms of m*y, b*r, b*r/(b+r), m*y/(m+y), min(m, hrm), m*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (11) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms and the fraction terms relating to the specific hues, and the coefficients of the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 11, the color conversion is performed on the input image data R, G, and B, so that it is possible to achieve good color reproduction in a display device such as a monitor, or an image processing device using image data represented by R, G and B, and greater advantages can be obtained.

Embodiment 12

According to the polynomial calculator 3 described with reference to FIG. 19 in connection with Embodiment 9, the formula used for determining the complementary color data C, M and Y obtained by color conversion by the method described with reference to FIG. 15 in connection with Embodiment 4 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ y*hry \\ y*hgy \\ c*hgc \\ c*hbc \\ m*hbm \\ m*hrm \\ \alpha \end{bmatrix} \quad (12)$$

Here, for (Eij), i=1 to 3, and j=1 to 3, and for (Fij), i=1 to 3, and j=1 to 25.

The difference between the number of calculation terms in the formula (12) and the number of calculation terms in the polynomial calculator in FIG. 19 is that FIG. 19 shows a method of calculation for each pixel excluding data resulting in the calculation terms which are of a value zero, while the formula (12) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-five calculation terms in the formula (12) except the seven calculation terms of m*y, b*r, b*r/(b+r), m*y/(m+y), min(m, hrm), m*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (12) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms and the fraction terms relating to the specific hues, and the coefficients of the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 12, the color conversion is performed on the complementary color data C, M and Y obtained by color conversion from the input image data R, G, and B, so that it is possible to achieve good color reproduction in color conversion of printing data C, M and Y in a printing device or the like, and greater advantages can be obtained.

Embodiment 13

Figure 22:
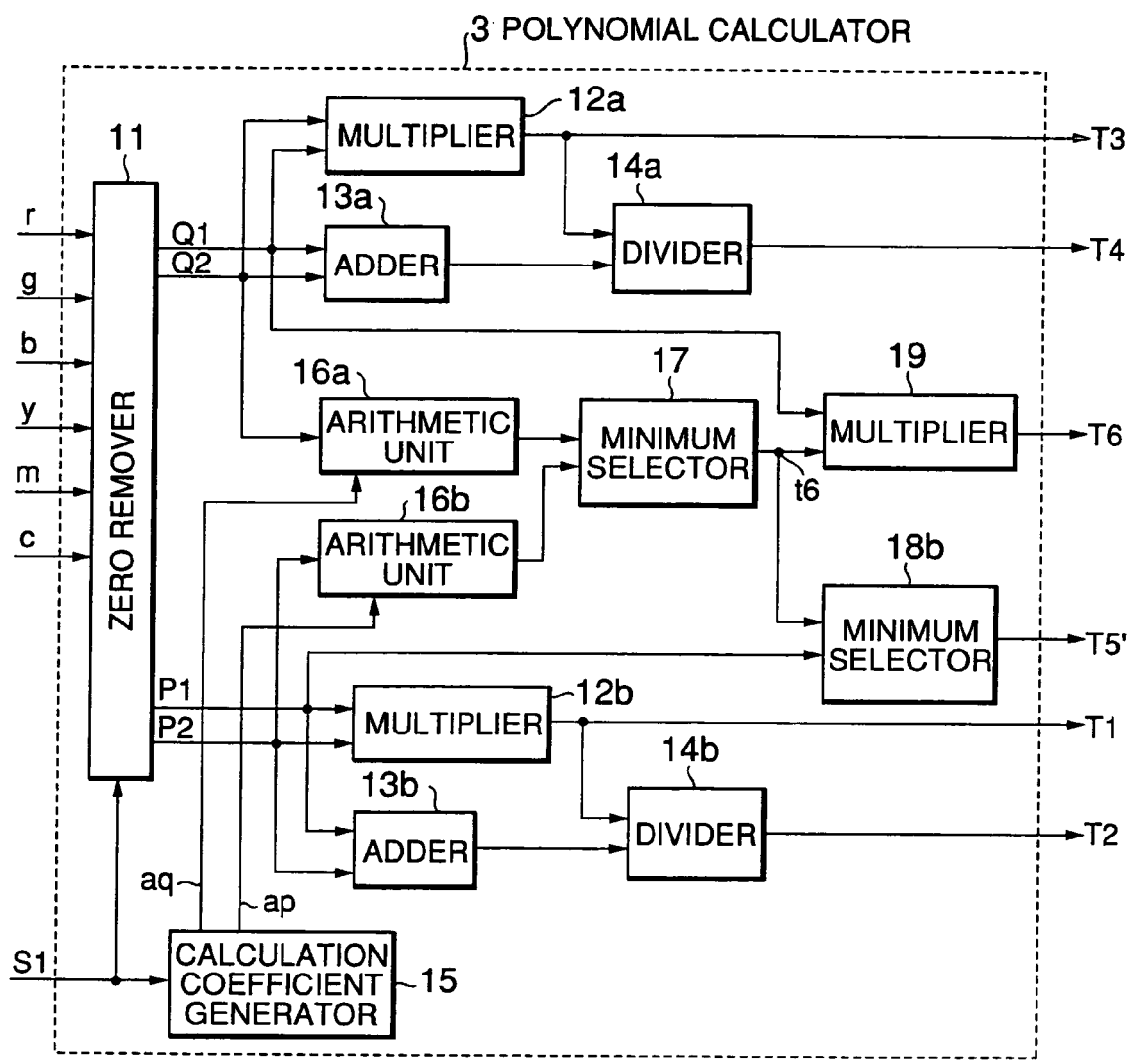
FIG. 22 is a block diagram showing another example of configuration a polynomial calculator in a color conversion device of Embodiment 13.

As another example, the polynomial calculator 3 may be formed as shown in FIG. 22, to calculate the polynomial data.

FIG. 22 is a block diagram showing another example of configuration of the polynomial calculator 3. In the drawing, reference numerals 11 to 17 and 19 denote members identical to those of the polynomial calculator shown in FIG. 2. Reference numeral 18*b* denotes a minimum value selector for selecting and outputting the minimum value of the input data.

Next, the operation of the polynomial calculator 3 shown in FIG. 22 will be described. The operation of the zero remover 11, and the operation for outputting T3=Q1*Q2, T4=T3/(Q1+Q2), T1=P1*P2 and T2=T1/(P1+P2) by the multipliers 12*a* and 12*b*, the adders 13*a* and 13*b* and the dividers 14*a* and 14*b*, and the operation for outputting t6=min(aq*Q2, ap*P2) by the calculation coefficient generator 15, the calculators 16*a* and 16*b* and the minimum value selector 17 are identical to those of the embodiment described above with reference to FIG. 2. Thus, detailed explanation thereof will be omitted.

The output t6=min(aq*Q2, ap*P2) from the minimum value selector 17 is supplied to the minimum value selector 18b and the multiplier 19. The minimum value selector 18b also receives the output data P1 from the zero remover 11, and outputs the minimum value T5'=min(P1, min(aq*Q2, ap*P2)) between P1 and t6=min(aq*Q2, ap*P2).

The multiplier 19 receives the data Q1 from the zero remover 11, and the output t6 from the minimum value selector 17, and performs multiplication Q1 by t6=min(aq*Q2, ap*P2), and outputs the product T6=Q1*min(aq*Q2, ap*P2). Accordingly, the polynomial data T1, T2, T3, T4, T6 and T5' are outputted from the polynomial calculator shown in FIG. 22, and these outputs of the polynomial calculator are sent to the matrix calculator 4 or 4b.

Thus, according to the polynomial calculator 3 described with reference to FIG. 22, the formula used for determining the image data R, G and B obtained by color conversion by the method described with reference to FIG. 1 in connection with Embodiment 1 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ r*hry \\ g*hgy \\ g*hgc \\ b*hbc \\ b*hbm \\ r*hrm \end{bmatrix} + \begin{bmatrix} \alpha \\ \alpha \\ \alpha \end{bmatrix} \quad (13)$$

Here, for (Eij), i=1 to 3, and j=1 to 3, and for (Fij), i=1 to 3, and j=1 to 24, and $hry=\min(aq1*g, ap1*m)$, $hrm=\min(aq2*b, ap2*y)$, $hgy=\min(aq3*r, ap3*c)$, $hgc=\min(aq4*b, ap4*y)$, $hbm=\min(aq5*r, ap5*c)$, and $hbc=\min(aq6*g, ap6*m)$, and aq1 to aq6 and ap1 to ap6 indicate calculation coefficients generated by the calculation coefficient generator 15 shown in FIG. 22.

The difference between the number of calculation terms in the formula (13) and the number of calculation terms in FIG. 22 is that FIG. 22 shows a method of calculation for each pixel excluding data resulting in the calculation terms which are of a value zero, while the formula (13) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations equations g=0 and c=0 hold hold. Accordingly, the twenty-four calculation terms in the formula (13) except the six calculation terms of m*y, b*r, b*r/(b+r), m*y/(m+y), min(m, hrm), and r*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (13) can be reduced to six effective data, and this reduction is achieved by exploiting a characteristic of the hue data. The combination of effective data is changed according to image data of the target pixel. For all image data, all the polynomial data can be effective.

The relations between the six hues and first-order terms min(y, hry), min(y, hgy), min(c, hgc), min(c, hbc), min(m, hbm) and min(m, hrm), based on the comparison-result data are identical to those described with reference to FIGS. 20A to 20F in connection with Embodiments 9 to 12. The relations between the six hues and the second-order terms r*hry, g*hgy, g*hgc, b*hbc, b*hbm, and r*hrm which are product terms based on the comparison-result data and the hue data are identical to those described with reference to FIGS. 10A to 10F in connection with Embodiments 1 to 4. Accordingly, it can be understood that the first-order terms and second-order terms using comparison-result data contribute to changes in the inter-hue areas of red-yellow, yellow-green, green-cyan, cyan-blue, blue-magenta, and magenta-red. It is also understood that only min(y, hry) and r*hry are effective first-order and second-orders terms for red-yellow; min(y, hgy) and g*hgy for yellow-green; min(c, hgc) and g*hgc for green-cyan; min(c, hbc) and b*hbc for cyan-blue; min(m, hbm) and b*hbm for blue-magenta; and min(m, hrm) and r*hrm for magenta-red.

FIGS. 23A and 23B respectively show relations between the six hues and inter-hue areas and effective calculation terms. Thus, if the coefficient generator changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3 are changed, part of the inter-hue area where a calculation term in the inter-hue area is effective can be changed without giving any influence to the other hues.

As apparent from the foregoing, by changing the coefficients of the product terms and the fraction terms relating to the specific hues, it is possible to adjust only the target hue, among the six hues of red, blue, green, yellow, cyan and magenta, without affecting other hues. Moreover, by changing the coefficients relating the first-order and second-order terms using comparison-result data based on the hue data, it is possible to independently correct the inter-hue areas of red-yellow, yellow-green, green-cyan, cyan-blue, blue-magenta, and magenta-red, to change the six inter-hue areas. Furthermore, the product terms and the second-order terms using comparison-result data represent second-order calculations with respect to chroma, and the fraction terms and the first-order terms using comparison-result data represent first-order calculations with respect to chroma. As a result, by using both of the first-order and second-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 13, the color conversion is performed on the input image data R, G, and B, so that it is possible to achieve good color reproduction in a display device, such a monitor, or an image processing device using image data represented by R, G, and B, and greater advantages can be obtained.

In the above-description of Embodiment 13, hardware is used to perform the processing of the configuration of FIG. 22. Identical processing can be performed by software, and an effect identical to that of Embodiment 13 can be obtained.

Embodiment 14

According to the polynomial calculator 3 described with reference to FIG. 22 in connection with Embodiment 13, the formula used for determining the complementary color data C, M and Y obtained by color conversion by the method described with reference to FIG. 12 in connection with Embodiment 2 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ r*hry \\ g*hgy \\ g*hgc \\ b*hbc \\ b*hbm \\ r*hrm \end{bmatrix} + \begin{bmatrix} \alpha \\ \alpha \\ \alpha \end{bmatrix} \quad (14)$$

Here, for (Eij), i=1 to 3, and j=1 to 3, and for (Fij), i=1 to 3, and j=1 to 24, and $hry=\min(aq1*g, ap1*m),$ $hrm=\min(aq2*b, ap2*y),$ $hgy=\min(aq3*r, ap3*c),$ $hgc=\min(aq4*b, ap4*y),$ $hbm=\min(aq5*r, ap5*c),$ and $hbc=\min(aq6*g, ap6*m),$ and aq1 to aq6 and ap1 to ap6 indicate calculation coefficients generated by the calculation coefficient generator 15 shown in FIG. 22.

The difference between the number of calculation terms in the formula (14) and the number of calculation terms in FIG. 22 is that FIG. 22 shows a method of calculation for each pixel excluding data resulting in the calculation terms which are of a value zero, while the formula (14) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-four calculation terms in the formula (14) except the six calculation terms of m*y, b*r, b*r/(b+r), m*y/(m+y), min(m, hrm), and r*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (14) can be reduced to six effective data, and this reduction is achieved by exploiting a characteristic of the hue data. The combination of effective data is changed according to image data of the target pixel. For all image data, all the polynomial data can be effective.

The calculation terms by the polynomial calculator according to the formula (14) are identical to those of the formula (13) in Embodiment 13, and the relations between the six hues and inter-hue areas, and the effective calculation terms is identical to those shown in FIGS. 23A and 23B. Accordingly, as in Embodiment 13, if the coefficient generator changes coefficients for a calculation term effective for a hue or an inter-hue area to be adjusted, only the target hue can be adjusted, and the inter-hue areas can also be corrected.

Further, if coefficients generated by the calculation coefficient generator 15 in the polynomial calculator 3 are changed, part of the inter-hue area where a calculation term in the inter-hue area is effective can be changed without giving any influence to the other hues.

As apparent from the foregoing, by changing the coefficients of the product terms and the fraction terms relating to the specific hues, it is possible to adjust only the target hue, among the six hues of red, blue, green, yellow, cyan and magenta, without affecting other hues. Moreover, by changing the coefficients relating the first-order and second-order calculation terms using comparison-result data based on the hue data, it is possible to independently correct the inter-hue areas of red-yellow, yellow-green, green-cyan, cyan-blue, blue-magenta, and magenta-red, to change the six inter-hue areas. Furthermore, the product terms and the second-order terms using comparison-result data represent second-order calculations with respect to chroma, and the fraction terms and the first-order terms using comparison-result data represent first-order calculations with respect to chroma. As a result, by using both of the first-order and second-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 14, the color conversion is performed on the complementary color data obtained by conversion from the input image data R, G, and B, so that it is possible to achieve good color reproduction in color conversion of printing data C, M and Y in a printing device or the like, and greater advantages can be obtained.

Embodiment 15

According to the polynomial calculator 3 described with reference to FIG. 22 in connection with Embodiment 13, the formula used for determining the image data R, G and B obtained by color conversion by the method described with reference to FIG. 13 in connection with Embodiment 3 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ r*hry \\ g*hgy \\ g*hgc \\ b*hbc \\ b*hbm \\ r*hrm \\ \alpha \end{bmatrix} \quad (15)$$

Here, for (Eij), i=1 to 3, and j=1 to 3, and for (Fij), i=1 to 3, and j=1 to 25.

The difference between the number of calculation terms in the formula (15) and the number of calculation terms in the polynomial calculator in FIG. 22 is that FIG. 22 shows a method of calculation for each pixel excluding data resulting in the calculation terms which are of a value zero, while the formula (15) represents a general formula for a set of pixels. In other words, the six hue data have such a-characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-five calculation terms in the formula (15) except the seven calculation terms of m*y, b*r, b*r/(b+r), m*y/(m+y), min(m, hrm), r*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (15) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms and the fraction terms relating to the specific hues, and the coefficients of the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 15, the color conversion is performed on the input image data R, G, and B, so that it is possible to achieve good color reproduction in a display device such as a monitor, or an image processing device using image data represented by R, G and B, and greater advantages can be obtained.

Embodiment 16

According to the polynomial calculator 3 described with reference to FIG. 22 in connection with Embodiment 13, the formula used for determining the complementary color data C, M and Y obtained by color conversion by the method described with reference to FIG. 15 in connection with Embodiment 4 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ c*m/(c+m) \\ m*y/(m+y) \\ y*c/(y+c) \\ r*g/(r+g) \\ g*b/(g+b) \\ b*r/(b+r) \\ \min(y, hry) \\ \min(y, hgy) \\ \min(c, hgc) \\ \min(c, hbc) \\ \min(m, hbm) \\ \min(m, hrm) \\ r*hry \\ g*hgy \\ g*hgc \\ b*hbc \\ b*hbm \\ r*hrm \\ \alpha \end{bmatrix} \quad (16)$$

Here, for (Eij), i=1 to 3, and j=1 to 3, and for (Fij), i=1 to 3, and j=1 to 25.

The difference between the number of calculation terms in the formula (16) and the number of calculation terms in the polynomial calculator in FIG. 22 is that FIG. 22 shows a method of calculation for each pixel excluding data resulting in the calculation terms which are of a value zero, while the formula (16) represents a general formula for a set of pixels. In other words, the six hue data have such a characteristic that at least two of them are zero, as in the above-described embodiments. For example, in the case where the value of the identification code S1 is 0, with the maximum and minimum values β and α shown in FIG. 3 being respectively Ri and Gi, equations g=0 and c=0 hold. Accordingly, the twenty-five calculation terms in the formula (16) except the seven calculation terms of m*y, b*r, b*r/(b+r), m*y/(m+y), min(m, hrm), r*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (16) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms and the fraction terms relating to the specific hues, and the coefficients of the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 16, the color conversion is performed on the complementary color data C, M and Y obtained by color conversion from the input image data R, G, and B, so that it is possible to achieve good color reproduction in color conversion of printing data C, M and Y in a printing device or the like, and greater advantages can be obtained.

Embodiment 17

Figure 24:
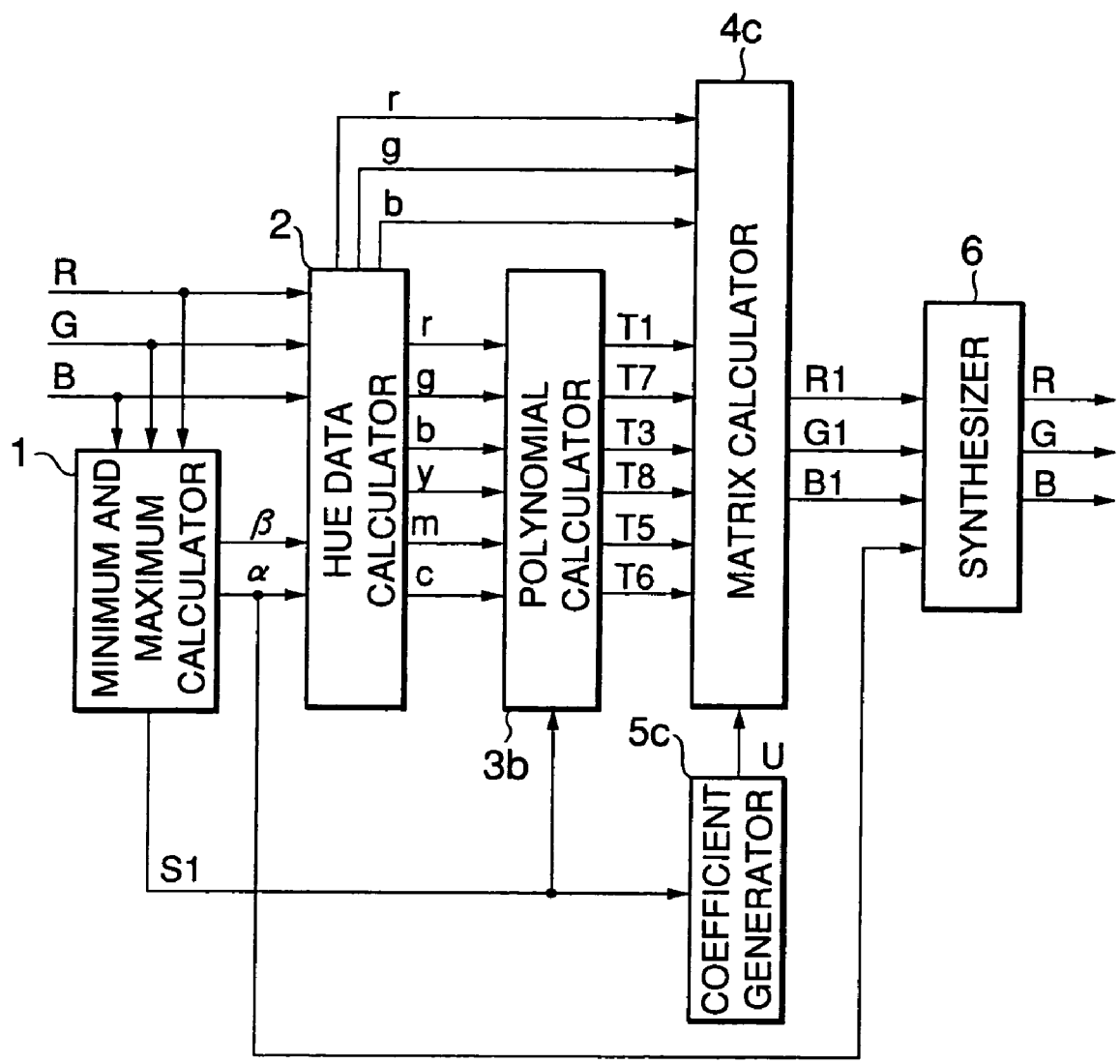
FIG. 24 is a block diagram showing an example of configuration of a color conversion device of Embodiment 17.

FIG. 24 is a block diagram showing another example of configuration of a color conversion device according to Embodiment 17 of the present invention. In the drawing, reference numerals 1, 2 and 6 denote members identical to those described with reference to FIG. 1 in connection with Embodiment 1. Reference numeral 3b denotes a polynomial calculator; 4c, a matrix calculator; and 5c, a coefficient generator.

Figure 25:
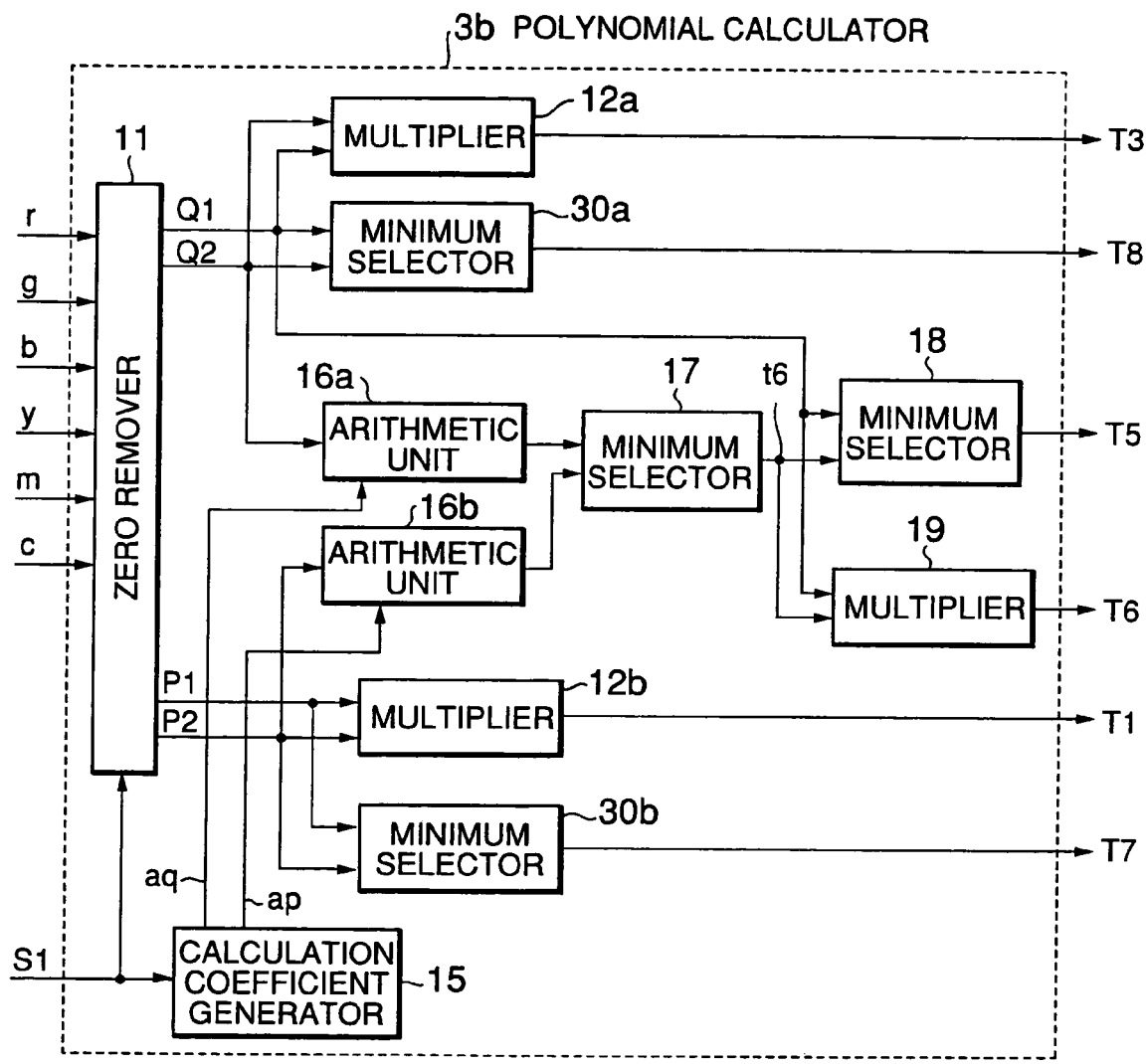
FIG. 25 is a block diagram showing an example of configuration of a polynomial calculator in the color conversion device of Embodiment 17.

FIG. 25 is a block diagram showing an example of configuration of the polynomial calculator 3b. In the drawing, reference numerals 11, 12a, 12b and 15 to 19 denote members identical to those in the polynomial calculator 3 described with reference to FIG. 2 in connection with Embodiment 1. Reference numerals 30a and 30b denote minimum value selectors for selecting and outputting minimum values of inputted data.

Next, the operation will be described. The operations of the minimum and maximum calculator 1 and the hue data calculator 2 are identical to the operations of those of Embodiment 1, so that detailed explanation thereof will be omitted. The polynomial calculator 3b selects the non-zero data Q1 and Q2 among r, g and b, and non-zero data P1 and P2 among y, m and c, in accordance with the identification code S1, and performs calculation on the selected data. This will be explained with reference to FIG. 25.

In the polynomial calculator 3b, the inputted hue data r, g, b, y, m and c and the identification code S1 are sent to the zero remover 11, which outputs, based on the identification code S1, two non-zero data Q1 and Q2 among r, g and b and two non-zero data P1 and P2 among y, m and c. The data Q1 and Q2 outputted from the zero remover 11 are inputted to the multiplier 12a, which determines and outputs the product T3=Q1*Q2. The data P1 and P2 outputted from the zero remover 11 are inputted to the multiplier 12b, which determines and outputs the product T1=P1*P2 is calculated and outputted. These operations are identical to those of Embodiment 1 described above with reference to FIG. 2. Also, the operations of the calculation coefficient generator 15, the calculators 16a and 16b, the minimum value selectors 17 and 18, and the multiplier 19 are identical to those of Embodiment 1. Detailed explanation thereof will therefore be omitted.

The data Q1 and Q2 outputted from the zero remover 11 are inputted to the minimum value selector 30a, which selects the minimum value T8=min(Q1, Q2). The data P1 and P2 outputted from the zero remover 11 are inputted to the minimum value selector 30b, which selects and outputs the minimum value T7=min(P1, P2). The above polynomial data T1, T3, T5, T6, T7, and T8 outputted from the polynomial calculator 3b, and these outputs of the polynomial calculator 3b are sent to the matrix calculator 4c.

The coefficient generator 5c shown in FIG. 24 generates calculation coefficients U (Fij) and fixed coefficients U (Eij) for the polynomial data based on the identification code S1, and sends the generated coefficients to the matrix calculator 4c. The matrix calculator 4c receives the hue data r, g and b from the hue data calculator 2, the polynomial data T1, T3, T5, T6, T7 and T8 from the polynomial calculator 3b, and the coefficients U from the coefficient generator 5c, and determines the image data R, G, and B according to the following formula:

$$\begin{bmatrix} R1 \\ G1 \\ B1 \end{bmatrix} = (Eij) \begin{bmatrix} r \\ g \\ b \end{bmatrix} + (Fij) \begin{bmatrix} T1 \\ T7 \\ T3 \\ T8 \\ T5 \\ T6 \end{bmatrix} \quad (38)$$

Here, with regard to (Eij), i=1 to 3, and j=1 to 3. With regard to (Fij), i=1 to 3, and j=1 to 6.

Figure 26:
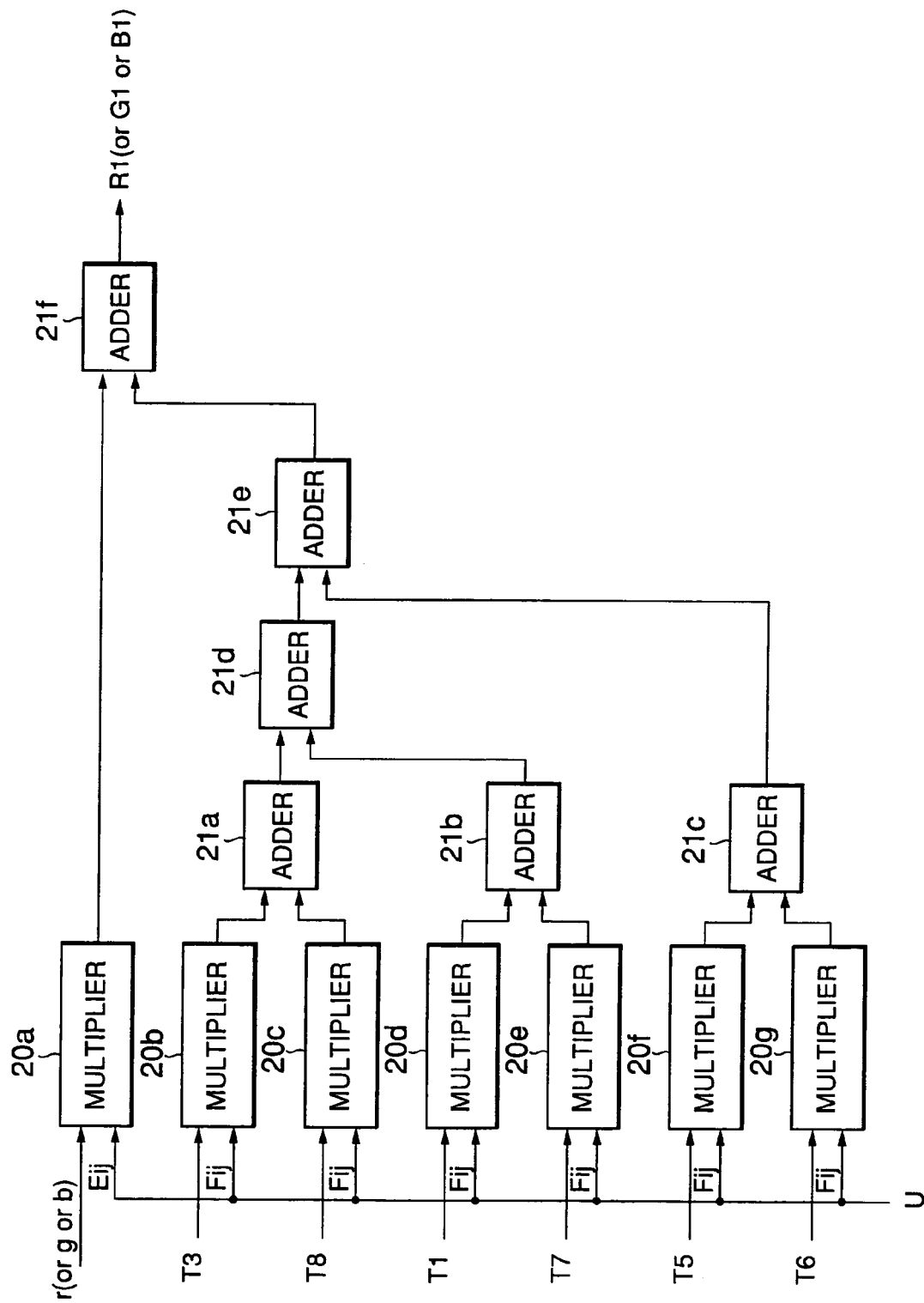
FIG. 26 is a block diagram showing a part of an example of configuration of a matrix calculator in the color conversion device of Embodiment 17.
Figure 27A:
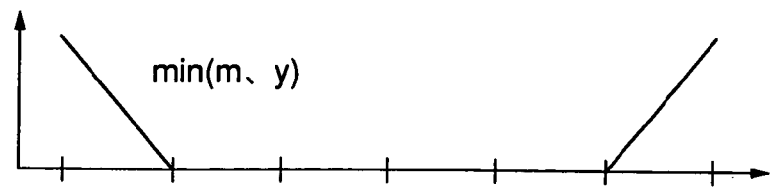
FIGS. 27A to 27F are schematic diagrams showing the relations between the hues and the first-order terms in the color conversion device of Embodiment 17.
Figure 27B:
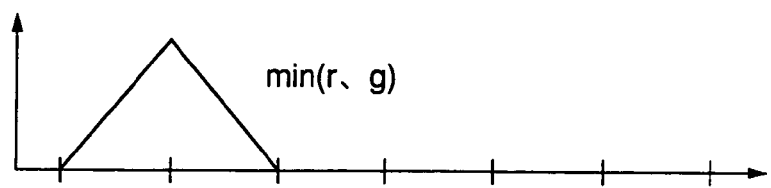
Figure 27C:
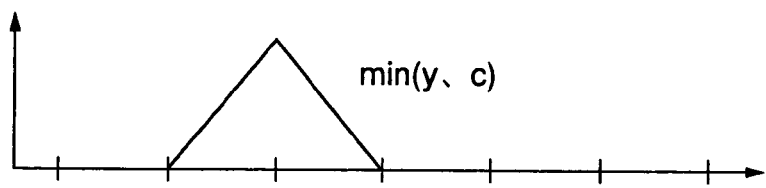
Figure 27D:
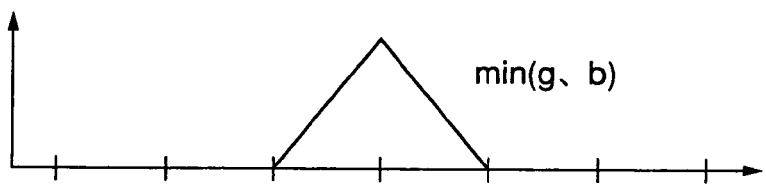
Figure 27E:
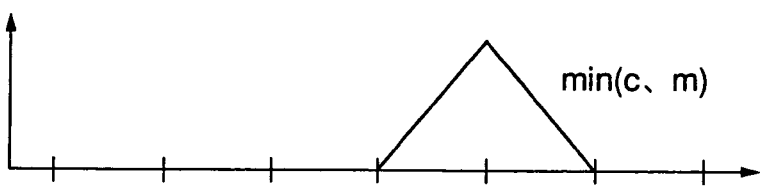
Figure 27F:
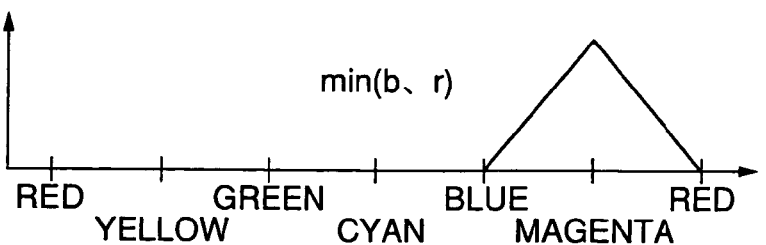

FIG. 26 is a block diagram showing a part of an example of configuration of the matrix calculator 4c, for calculating and outputting R1. In the drawing, reference numerals 20a to 20b and 21a to 21f denote members identical to those shown in FIG. 5.

Next, the operation of the matrix calculator 4c shown in FIG. 26 will be described. The multipliers 20a to 20g receive the hue data r, the polynomial data T1, T3, T5, T6, T7 and T8 from the polynomial calculator 3b, and the coefficients U (Eij) and U (Fij) from the coefficient generator 5c, and determine and output the respective products. The adders 21a to 21c receive the products outputted from the multipliers 20b to 20g, and add the respective input data, and output the respective sums. The adder 21d adds the data from the adders 21a and 21b. The adder 21e adds the data from the adders 21c and 21d. The adder 21f adds the output from the adder 21e and the output from the multiplier 20a, and outputs the sum total thereof as image data R1. In the configuration of FIG. 26, if the hue data r is substituted by g or b, image data G1 or B1 can be calculated.

Those of the coefficients (Eij) and (Fij) which respectively correspond to the hue data r, g or b are used. If the configuration of FIG. 26 are provided in parallel for the hue data r, g and b, high-speed matrix calculation can be performed.

The synthesizer 6 receives the image data R1, G1 and B1 from the matrix calculator 4c, and the minimum value α representing achromatic data, which is outputted from the minimum and maximum calculator 1, and performs addition, and outputs the image data R, G and B. The calculation formula for determining the image data R, G and B obtained by the color conversion device of FIG. 24 is given below:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ r*hry \\ r*hrm \\ g*hgy \\ g*hgc \\ b*hbm \\ b*hbc \end{bmatrix} + \begin{bmatrix} \alpha \\ \alpha \\ \alpha \end{bmatrix} \quad (17)$$

Here, for (Eij), i=1 to 3 and j=1 to 3, and for (Fij), i=1 to 3 and j=1 to 24.

The difference between the number of calculation terms in the formula (17) and the number of calculation terms in the polynomial calculator 3b in FIG. 24 is that FIG. 24 shows a method of calculation for each pixel excluding data resulting in the calculation terms which are of a value zero, while the formula (17) represents a general formula for a set of pixels. In other words, the six hue data have such a characteristic that at least two of them are zero, as described in connection with Embodiment 1. 3. For example, in the case where the value of the identification code S1 is 0, with the maximum and minimum values β and α shown in FIG. 3 being respectively Ri and Gi, equations g=0 and c=0 hold. Accordingly, the twenty-four calculation terms in the formula (17) except the six calculation terms of m*y, b*r, min(b, r), min(m, y), min(r, hrm) and r*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (17) can be reduced to six effective data, and this reduction is achieved by exploiting a characteristic of the hue data.

The combination of effective data is changed according to image data of the target pixel. For all image data, all the polynomial data can be effective.

FIGS. 27A to 27F schematically show relations between the six hue data and the calculation terms min(m, y), min (r, g), min(y, c), min(g, b), min(c, m) and min(b, r) based on the comparison-result data. Each calculation term has a characteristic of a first-order term. For example, with W being a constant, since r=W and g=b=0 for red, y=m=W and c=0. In this case, min(m, y)=W, and the other five terms are zero. The size of the constant W depends on color brightness or chroma of a pixel. Since min (m, y)=W, an effect of min(m, y) on color reproduction is a first-order function with regard to chroma. In other words, only min(m, y) is an effective first-order term for red. Similarly, the other calculation terms using the comparison-result data are first-order functions with regard to chroma for the hues for which the respective terms are effective. Only min(y, c) is an effective first-order term for green; min(c, m) for blue; min(g, b) for cyan; min(b, r) for magenta; and min(r, g) for yellow.

FIGS. 28A and 28B show relations between the six hues and the inter-hue areas, and those of the calculation terms obtained by the polynomial calculator 3b shown in FIG. 24 which are effective for the respective hues and inter-hue areas. Thus, if the coefficient generator 5c changes coefficients for calculation terms effective for a hue or an inter-hue area to be adjusted, only the target hue can be adjusted, and the inter-hue areas can also be corrected. Further, if coefficients generated by the calculation coefficient generator 15 in the polynomial calculator 3b are changed, part of the inter-hue area where a calculation term in the inter-hue area is effective can be changed without giving any influence to the other hues.

If the coefficients U (Eij) generated by the coefficient generator 5c in Embodiment 17 are set as in the formula (33) and the coefficients of U (Fij) are all set to zero, no color conversion is performed, as was described in connection with Embodiment 1. If, among the coefficients U (Fij), those for the product terms and the calculation terms using comparison-result data which relate to the hues or inter-hue areas to be changed are set to certain appropriate values, and the other coefficients are set to zero, only the target hues or inter-hue areas can be adjusted. For example, coefficients for the first-order term min(m, y) relating to red are set, the hue red is changed. For changing inter-hue area red-yellow, the coefficients for the first-order term min(r, hry) and the coefficients for the second-order term r*hry are used.

The hues to which the first-order fraction terms T4=Q1*Q2/(Q1+Q2) and T2=P1*P2/(P1+P2) in Embodiments 1 to 16 relate and the hues to which the first-order terms T8=min(Q1, Q2) and T7=min(P1, P2) based on the comparison-result data in Embodiment 17 are identical to one another. However, in the case of the calculation terms using comparison-result data in Embodiment 17, the first-order terms effective for a specific hue can be obtained just through selection of the minimum values of the respective hue data. Accordingly, processing can be simplified, and the processing speed can be increased, compared with the case in which the calculation terms are obtained by multiplication and division.

As apparent from the foregoing, by changing the coefficients of the product terms and the calculation terms using comparison-result data based on the hue data, it is possible to adjust only the target hue, among the six hues of red, blue, green, yellow, cyan and magenta, without affecting other hues. Moreover, by changing the coefficients relating the first-order and second-order terms relating to the inter-hue areas, it is possible to independently correct the inter-hue areas of red-yellow, yellow-green, green-cyan, cyan-blue, blue-magenta, and magenta-red, to change the six inter-hue areas. Furthermore, the product terms and the second-order terms using comparison-result data represent second-order calculations with respect to chroma, and the first-order terms using comparison-result data represent first-order calculations with respect to chroma. As a result, by using both of the first-order and second-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 9, the color conversion is performed on the input image data R, G, and B, so that it is possible to achieve good color reproduction in a display device, such a monitor, or an image processing device using image data represented by R, G, and B, and greater advantages can be obtained.

In Embodiment 17 described above, the hue data r, g and b, y, m and c, and the maximum and minimum values β and α were calculated based on the inputted image data R, G and B so as to obtain the calculation terms for the respective hues, and after the matrix calculation, the image-data R, G and B were obtained. However, after the outputted image data are obtained, the data R, G and B may be converted into complementary color data C, M and Y. If the six hue data, the maximum value β and the minimum value α can be obtained, and the calculation terms shown in FIG. 28 can be obtained, and the coefficients used in the matrix calculation can be changed for the respective hues and inter-hue areas, the same effects will be realized.

In the above-description of Embodiment 17, hardware is used to perform the processing of the configuration of FIG. 24. Identical processing can be performed by software, and an effect identical to that of Embodiment 17 can be obtained.

Embodiment 18

In Embodiment 17, the hue data r, g and b, y, m and c, and the maximum and minimum values β and α were calculated based on the inputted image data R, G and B so as to obtain the calculation terms for the respective hues, and after the matrix calculation, the image data R, G and B were obtained. But the image data R, G and B may first be converted into complementary color data C, M and Y, and then color conversion-may be executed by inputting the complementary color data C, M and Y.

Figure 29:
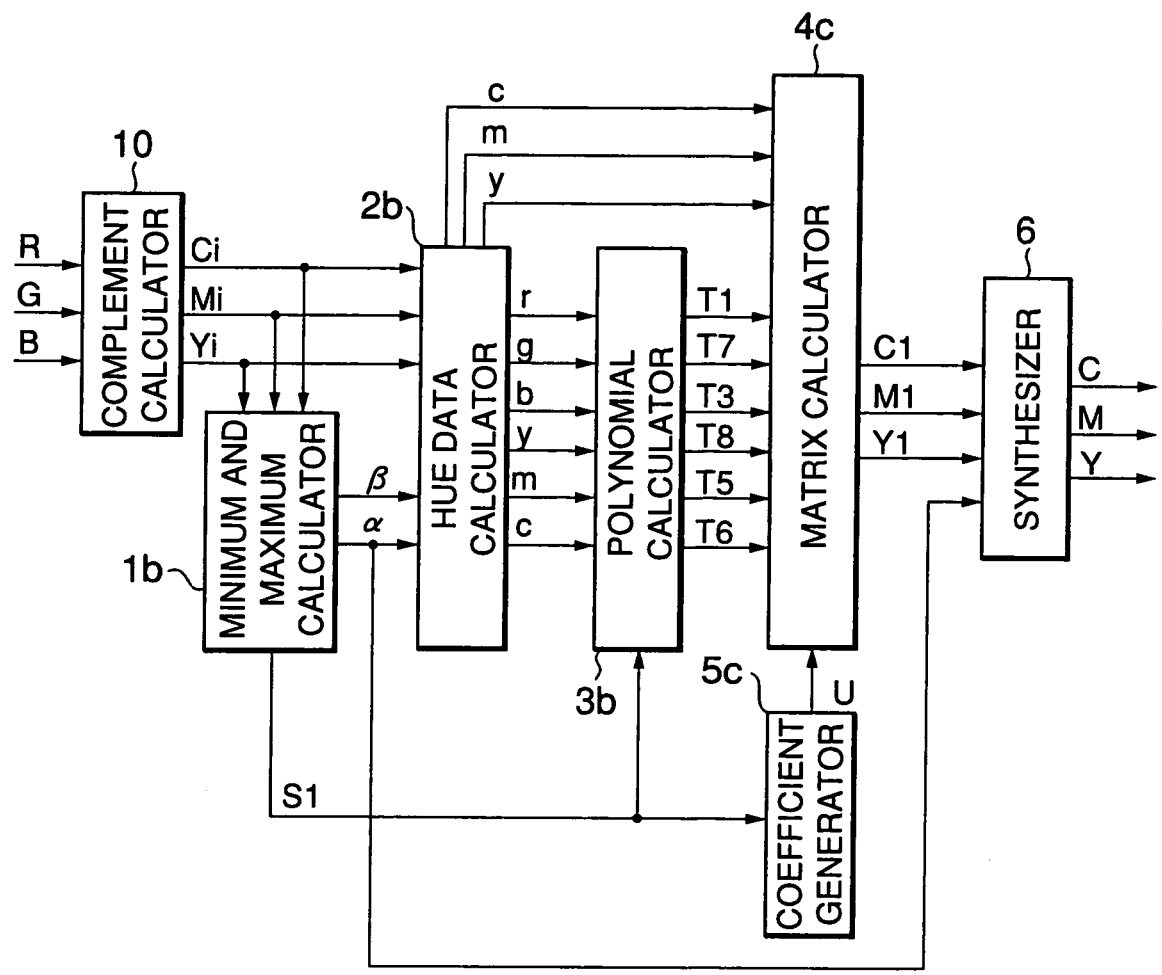
FIG. 29 is a block diagram showing an example of configuration of a color conversion device of Embodiment 18.

FIG. 29 is a block diagram showing an example of configuration of a color conversion device of Embodiment 18 of the present invention. In the drawing, reference numerals 1b, 2b, 10 and 6 denote members identical to those described with reference to FIG. 12 in connection with Embodiment 2, and reference numerals 3b, 4c and 5c denote members identical to those described with reference to FIG. 24 in connection with Embodiment 17.

Next, the operation will be described. The complement calculator 10 receives the image data R, G and B, and outputs complementary color data Ci, Mi and Yi obtained by determining 1's complements. The minimum and maximum calculator 1b outputs the maximum and minimum values β and α of each of these complementary color data and an identification code S1 for indicating, among the six hue data, data which are zero.

Then, the hue data calculator 2b receives the the complementary color data Ci, Mi and Yi and the maximum and minimum values β and α from the minimum and maximum calculator 1b, performs subtraction of r=β−Ci, g=β−Mi, b=β−Yi, y=Yi−α, m=Mi−α, and c=Ci−α, and outputs six hue data r, g, b, y, m and c. Here, at least two among these six hue data are zero. The identification code S1 outputted from the minimum and maximum calculator 1b is used for specifying, among the six hue data, data which is zero. The value of the identification code depends on which of Ci, Mi and Yi the maximum and minimum values β and α are. Relations between the data among the six hue data which are zero, and the values of the identification code are the same as those in Embodiment 1, and thus further explanation will be omitted.

Then, the six hue data r, g, b, y, m and c outputted from the hue data calculator 2 are sent to the polynomial calculator 3b, and the hue data c, m and y are also sent to the matrix calculator 4c. The polynomial calculator 3b also receives the identification code S1 outputted from the minimum and maximum calculator 1, and performs calculation by selecting, from the hue data, two data Q1 and Q2 which are not zero, and from the hue data y, m and c, two data P1 and P2 which are not of a value zero. The operations are similar to those described in connection with Embodiment 17 with reference to FIG. 25, and their details are omitted.

The outputs from the polynomial calculator 3b are sent to the matrix calculator 4c. The coefficient generator 5c generates calculation coefficients U (Fij) and fixed coefficients U (Eij) for the polynomial data based on the identification code S1, and sends the generated coefficients to the matrix calculator 4c. Based on the hue data c, m and y from the hue data calculator 2b, polynomial data T1, T3, and T5 to T8 from the polynomial calculator 3b and coefficients U from the coefficient generator 5c, the matrix calculator 4c outputs the results of calculation according to the following formula (39), as image data C1, M1 and Y1.

$$\begin{bmatrix} C1 \\ M1 \\ Y1 \end{bmatrix} = (Eij) \begin{bmatrix} c \\ m \\ y \end{bmatrix} + (Fij) \begin{bmatrix} T1 \\ T7 \\ T3 \\ T8 \\ T5 \\ T6 \end{bmatrix} \quad (39)$$

For (Eij), i=1 to 3 and j=1 to 3, and for (Fij), i=1 to 3 and j=1 to 6.

The operation at the matrix calculator 4c is similar to that described with reference to FIG. 26 in connection with Embodiment 17, but the inputted hue data is c (or m, y) and C1 (or M1, Y1) is calculated and outputted. The detailed description thereof is therefore omitted.

The synthesizer 6 receives the image data C1, M1 and Y1 from the matrix calculator 4c and the minimum value α outputted from the minimum and maximum calculator 1b representing the achromatic data, performs addition, and outputs image data C, M and Y. The formula used for obtaining the image data obtained by color conversion by the color-conversion device of FIG. 29 is therefore as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ r*hry \\ r*hrm \\ g*hgy \\ g*hgc \\ b*hbm \\ b*hbc \end{bmatrix} + \begin{bmatrix} \alpha \\ \alpha \\ \alpha \end{bmatrix} \quad (18)$$

Here, for (Eij), i=1 to 3 and j=1 to 3, and for (Fij), i=1 to 3 and j=1 to 24.

The difference between the number of calculation terms in the formula (18) and the number of calculation terms in FIG. 29 is that FIG. 29 shows a method of calculation for each pixel excluding data resulting in the calculation terms which are of a value zero, while the formula (18) represents a general formula for a set of pixels. In other words, as in the above-described embodiments, the six hue data have such a characteristic that at least two of them are zero. For example, in the case where the value of the identification code S1 is 0, with the maximum and minimum values β and α being respectively Ri and Gi, equations g=0 and c=0 hold. Accordingly, the twenty-four calculation terms in the formula (18) except the six calculation terms of m*y, b*r, min(b, r), min(m, y), min (r, hrm) and r*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (18) can be reduced to six effective data, and this reduction is achieved by exploiting a characteristic of the hue data.

The combination of effective data changes depending on the image data of the target pixel (the pixel in question), and all the polynomial data are effective in all the image data.

The calculation terms of the above formula (18) produced by the polynomial calculator are identical to those of of the formula (17) described in connection with Embodiment 17, and the relations between the six hues and inter-hue areas, and the effective calculation terms are identical to those shown in FIGS. 28A and 28B. Accordingly, as in the case of Embodiment 17, by changing coefficients of the effective calculation terms for hues or inter-hue areas to be adjusted in the coefficient generator 5c, it is possible to adjust only the target hues or inter-hue area. Further, by changing coefficients generated by the calculation coefficient generator 15 in the polynomial calculator 3b, the calculation terms effective in the areas can be changed without influencing the other hues.

If the coefficients U (Ejj) generated by the coefficient generator 5c of Embodiment 17 are set as in the formula (33), and the coefficients U (Fij) are all set to zero, no color conversion is performed, as was described in connection with the above embodiments. By setting those coefficients U (Fij) for the product terms, and calculation terms based on comparison-result data which relate to the hues or inter-hue areas to be changed, and setting the other coefficients to zero, it is possible to adjust only the particular hues or inter-hue areas.

For instance, if the coefficients relating to the first-order calculation term min(m, y) relating to red is set, the hue red is changed. For changing the inter-hue area, the coefficients relating to the first-order term min(r, hry) and the second-order term r*hry are used.

As apparent from the foregoing, by changing the coefficients of the product term and first-order calculation terms based on the comparison data of the hue data, it is possible to adjust only the target hue among the six hues of red, blue, green, yellow, cyan and magenta, without affecting other hues. By changing tie the coefficients for the first-order terms and second-order terms relating to inter-hue areas, it is possible to correct the six inter-hue areas of red-yellow, yellow-green, green-cyan, cyan-blue, blue-magenta, and magenta-red independently. Moreover, by using both the second-order terms and the first-order terms, it is possible to correct the non-linearity of the chroma in image printing or the like. Accordingly, it is possible to obtain a color conversion device or color conversion method with which the conversion characteristics can be flexibly varied, and which does not require a large-capacity memory. In addition, in the Embodiment 2, the input image data R, G, and B are converted to complementary color data C, M, and Y, and the color conversion is performed on the complementary color data C, M, and Y, so that it is possible to perform good color reproduction in of print data C, M, and Y in a printing device or the like.

In the above-description of Embodiment 18, hardware is used to perform the processing of the configuration shown in FIG. 29. Identical processing can be performed by software in the color conversion device, and an effect identical to that of Embodiment 18 can be obtained.

Embodiment 19

In Embodiment 17, part of the matrix calculator 4c is assumed to be as shown in the block diagram of FIG. 26, to perform the calculation according to the formula (17). As an alternative, coefficients for the minimum value α which is achromatic data may be generated in the coefficient generator, as shown in FIG. 30, to adjust the achromatic component.

Figure 30:
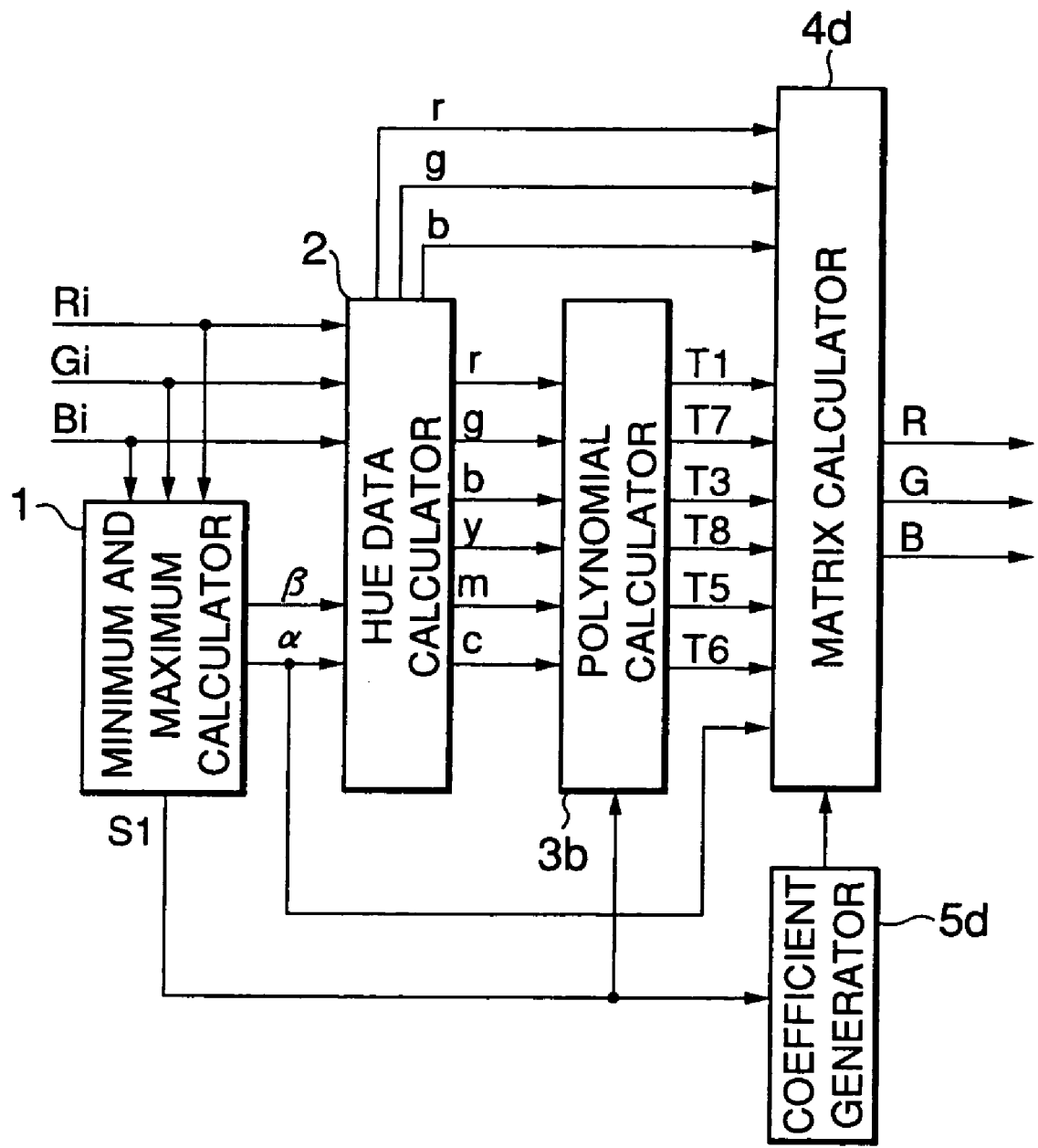
FIG. 30 is a block diagram showing an example of configuration of a color conversion device of Embodiment 19.

FIG. 30 is a block diagram showing an example of configuration of the color conversion device according to Embodiment 19. In the figure, reference numerals 1, 2 and 3b denote members identical to those described in connection with Embodiment 17 with reference to FIG. 24. Reference numeral 4d denotes a matrix calculator, and 5d denotes a coefficient generator.

The operation will next be described. The operations at the minimum and maximum calculator 1 for determining the maximum value β, the minimum value α, and the identification code S1, based on the input data, at the hue data calculator 2 for determining the six hue data, and at the polynomial calculator 3b for determining the calculation terms are identical to those of Embodiment 17, so their details are omitted.

The coefficient generator 5d in FIG. 30 generates calculation coefficients U (Fij) and fixed coefficients U (Eij) for the polynomial data based on the identification code S1, and sends the generated coefficients to the matrix calculator 4d. Based on the hue data r, g, and b from the hue data calculator 2, polynomial data T1, T3, and T5 to T8 from the polynomial calculator 3b, the minimum value from the minimum and maximum calculator 1, and coefficients U from the coefficient generator 5d, the matrix calculator 4d performs calculation in accordance with the following formula (40) to adjust the achromatic component.

$$\begin{bmatrix} R \\ G \\ B \end{bmatrix} = (Eij) \begin{bmatrix} r \\ g \\ b \end{bmatrix} + (Fij) \begin{bmatrix} T1 \\ T7 \\ T3 \\ T8 \\ T5 \\ T6 \\ \alpha \end{bmatrix} \quad (40)$$

For (Eij), i=1 to 3 and j=1 to 3, and for (Fij), i=1 to 3 and j=1 to 7.

Figure 31:
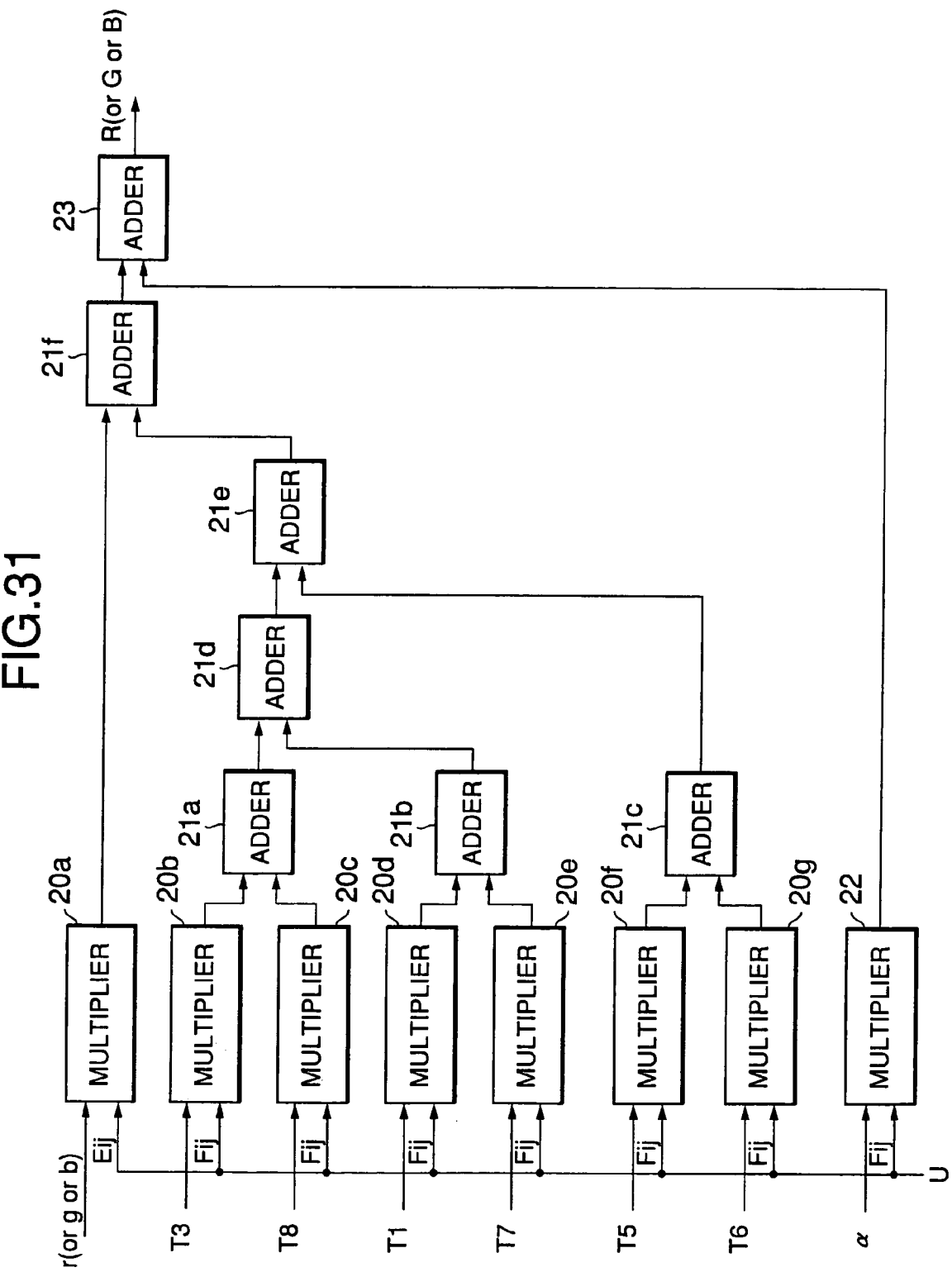
FIG. 31 is a view showing a part of an example of configuration of a matrix calculator 4d in the color conversion device of Embodiment 19.

FIG. 31, which is a block diagram, shows an example of configuration of part of the matrix calculator 4d. In FIG. 31, reference numerals 20a to 20g, 21a to 21f denote members identical to those in the matrix calculator 4c of Embodiment 17. Reference numerals 22 and 23 denote members identical to those in the matrix calculator 4b of Embodiment 3 in FIG. 14.

Next, the operation of the matrix calculator 4d of FIG. 31 will be described. The multipliers 20a to 20g receive the hue data r, the polynomial data T1, T3, and T5 to T8 from the polynomial calculator 3b and the coefficients U (Eij) and U (Fij) from the coefficient generator 5d, and output the products thereof. The adders 21a and 21f add the products and/or sums. Their operations are identical to those in the matrix calculator in the above-described embodiments. The multiplier 22 receives he minimum value α of the R, G, B, from the minimum and maximum calculator 1, which corresponds to the achromatic component, and the coefficients U (Fij) from the coefficient generator 5d, and determines the product thereof, which is sent to the adder 23, and added to the output of the adder 21f. The total sum is outputted as output R of the image data R.

In the example of configuration shown in FIG. 31, if the hue data r is replaced by the hue data g or b, image data G or B can be calculated.

The part of the coefficients (Eij) and (Fij) corresponding to the hue data r, g and b are used. In other words, if three configuration, each similar to that of FIG. 31, are used in parallel for the hue data r, g and b, matrix calculation can be performed at a higher speed.

Thus, the matrix calculator 4d performs calculation on the various calculation terms and the minimum value α which is the achromatic data, using coefficients, adding the result to the hue data, to produce image data R, G and B. The formula used for producing the image data is given below:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ r*hry \\ r*hrm \\ g*hgy \\ g*hgc \\ b*hbm \\ b*hbc \\ \alpha \end{bmatrix} \quad (19)$$

Here, for (Eij), i=1 to 3 and j=1 to 3, and for (Fij), i=1 to 3 and j=1 to 25.

The difference between the number of calculation terms in the formula (19) and the number of calculation terms in FIG. 30 is that FIG. 30 shows a method of calculation for each pixel excluding data resulting in the calculation terms in the polynomial calculator which are of a value zero, while the formula (19) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-five calculation terms in the formula (19) except the seven calculation terms of m*y, b*r, min(b, r), min(m, y), min(r, hrm), r*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (19) can be reduced to seven effective data, and this reduction is achieved by exploiting a characteristic of the hue data.

The combination of effective data is changed according to image data of the target pixel. For all image data, all the polynomial data can be effective.

If all the coefficients relating to the minimum value α are of a value "1," the achromatic data is not converted, and will be a value identical to that of the achromatic data in the input data. If the coefficients in the matrix calculation are changed, it is possible to select reddish black, bluish black or the like, so that it is possible to adjust the achromatic component.

As apparent from the foregoing, by changing the coefficients of the product terms, the first-order calculation terms using comparison-result data based on the hue data, and the first-order and second-order terms relating to inter-hue areas, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 19, the color conversion is performed on the input image data R, G, and B, so that it is possible to achieve good color reproduction in a display device such as a monitor, or an image processing device using image data represented by R, G and B, and greater advantages can be obtained.

In Embodiment 19 described above, the hue data r, g and b, y, m and c, and the maximum and minimum values β and α were calculated based on the inputted image data R, G and B so as to obtain the calculation terms for the respective hues, and after the matrix calculation, the image data R, G and B were obtained. However, after the outputted image data are obtained, the data R, G and B may be converted into complementary color data C, M and Y. In this case, the same effects will be realized.

In the above-description of Embodiment 19, hardware is used to perform the required processing. Identical processing can be performed by software, as was also stated in connection with the above embodiments, and an effect identical to that of Embodiment 19 can be obtained.

Embodiment 20

In Embodiment 18, the configuration is such that the hue data and the calculation terms, and the minimum value α are added together, as shown in formula (18). As an alternative, coefficients for the minimum value α which is achromatic data may be generated in the coefficient generator, as shown in FIG. 32, to adjust the achromatic component.

Figure 32:
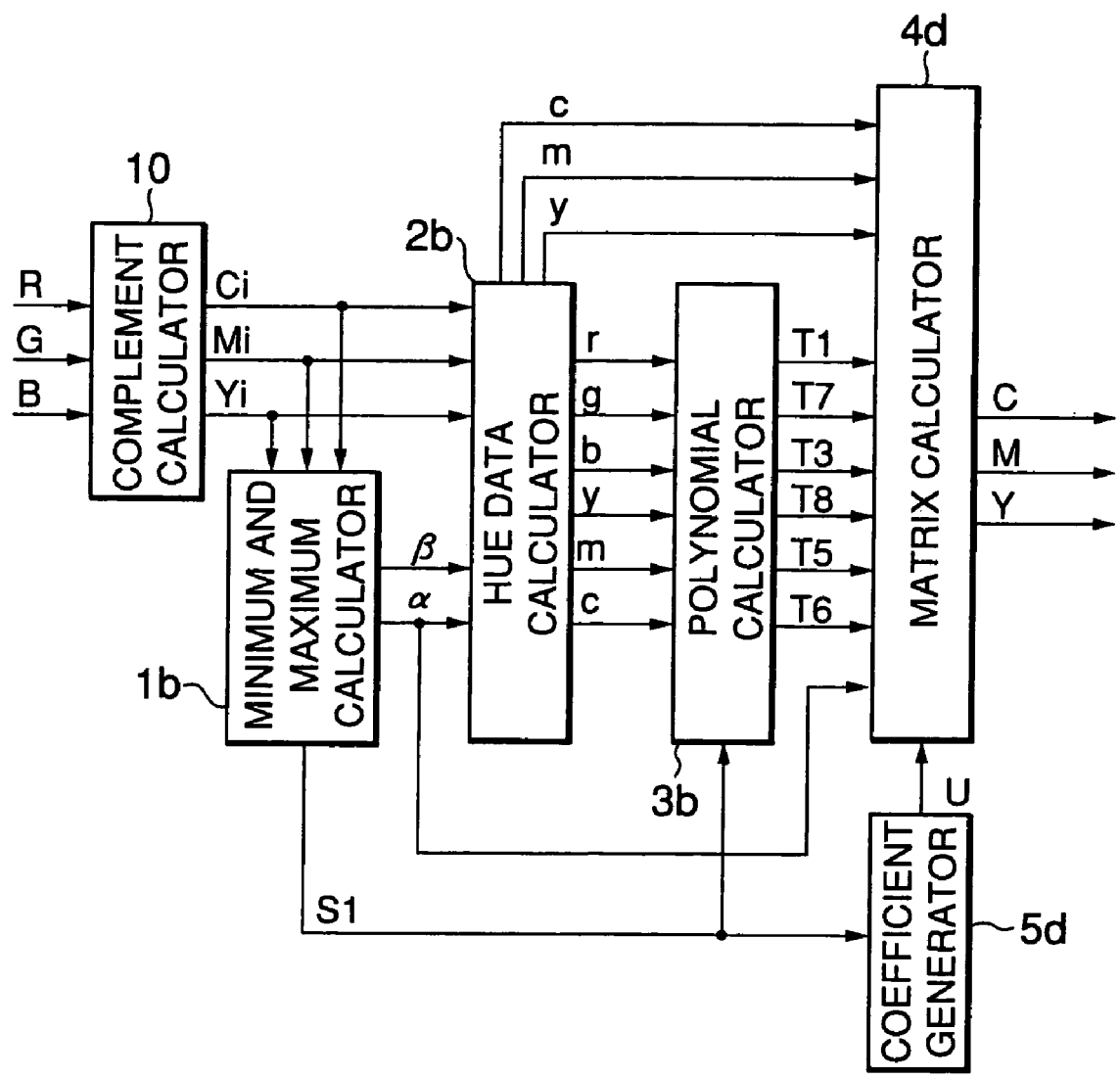
FIG. 32 is a block diagram showing an example of configuration of a color conversion device of Embodiment 20.

FIG. 32 is a block diagram showing an example of configuration of the color conversion device according to Embodiment 20. In the figure, reference numerals 10, 1b, 2b and 3b denote members identical to those of Embodiment 18 shown in FIG. 29, while reference numerals 4d and 5d denote members identical to those of Embodiment 19 shown in FIG. 30.

The operation will next be described. The image data R, G and B are inputted to the complement calculator 10, which produces the complementary color data Ci, Mi and Yi by determining 1's complements. The minimum and maximum calculator 1b determines the maximum value β, the minimum value α, and the identification code S1, while the hue data calculator 2b determines the six hue data. The polynomial calculator 3b determines the calculation terms. These operations are identical to those of Embodiment 18 with regard to the complementary color data C, M and Y, so their details are omitted.

The coefficient generator 5d in FIG. 32 generates calculation coefficients U (Fij) and fixed coefficients U (Eij) for the polynomial data based on the identification code S1, and sends the generated coefficients to the matrix calculator 4d. Based on the hue data c, m, and y from the hue data calculator 2b, polynomial data T1, T3, and T5 to T8 from the polynomial calculator 3b the minimum value from the minimum and maximum calculator 1b, and coefficients U from the coefficient generator 5d, the matrix calculator 4d performs calculation in accordance with the following formula (41) to adjust the achromatic component.

$$\begin{bmatrix} C \\ M \\ Y \end{bmatrix} = (Eij) \begin{bmatrix} c \\ m \\ y \end{bmatrix} + (Fij) \begin{bmatrix} T1 \\ T7 \\ T3 \\ T8 \\ T5 \\ T6 \\ \alpha \end{bmatrix} \quad (41)$$

For (Eij), i=1 to 3 and j=1 to 3, and for (Fij), i=1 to 3 and j=1 to 7.

The operation of the matrix calculator 4d is similar to that described with reference to FIG. 31 in connection with Embodiment 19, with the inputted hue data c (or m or y) being substituted to determine and output C (or M or Y), so that its detailed description is omitted.

Thus, the matrix calculator 4d performs calculation on the various calculation terms and the minimum value α which is the achromatic data, using coefficients, adding the result to the hue data, to produce image data C, M, and Y. The formula used for producing the image data is given below:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ r*hry \\ r*hrm \\ g*hgy \\ g*hgc \\ b*hbm \\ b*hbc \\ \alpha \end{bmatrix} \quad (20)$$

Here, for (Eij), i=1 to 3 and j=1 to 3, and for (Fij), i=1 to 3 and j=1 to 25.

As in the above-described embodiments, the difference between the number of calculation terms in the formula (20) and the number of calculation terms in FIG. 32 is that FIG. 32 shows a method of calculation for each pixel excluding data resulting in the calculation terms in the polynomial calculator which are of a value zero, while the formula (20) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-five calculation terms in the formula (20) except the seven calculation terms of m*y, b*r, min(b, r), min(m, y), min(r, hrm), r*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (20) can be reduced to seven effective data, and this reduction is achieved by exploiting a characteristic of the hue data.

The combination of effective data is changed according to image data of the target pixel. For all image data, all the polynomial data can be effective.

If all the coefficients relating to the minimum value α are of a value "1," the achromatic data is not converted, and will be a value identical to that of the achromatic data in the input data. If the coefficients in the matrix calculation are changed, it is possible to select reddish black, bluish black or the like, so that it is possible to adjust the achromatic component.

As apparent from the foregoing, by changing the coefficients of the product terms, the first-order terms using comparison-result data based on the hue data, and the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 20, the color conversion is performed on the complementary color data C, M, and Y, having been obtained by conversion from the input image data R, G, and B, so that it is possible to achieve good color reproduction in color conversion of the printing data C, M, and Y in a printing device or the like, and greater advantages can be obtained.

In the above-description of Embodiment 204, hardware is used to perform the required processing. Identical processing can be performed by software, as was also stated in connection with the above-described embodiments, and an effect identical to that of Embodiment 20 can be obtained.

Embodiment 21

In Embodiments 17 to 20 described above, an example of the polynomial calculator 3b shown in FIG. 25 was used, and the polynomial data are calculated and outputted. As an alternative, a configuration shown in FIG. 33 may be used to calculate polynomial data.

Figure 33:
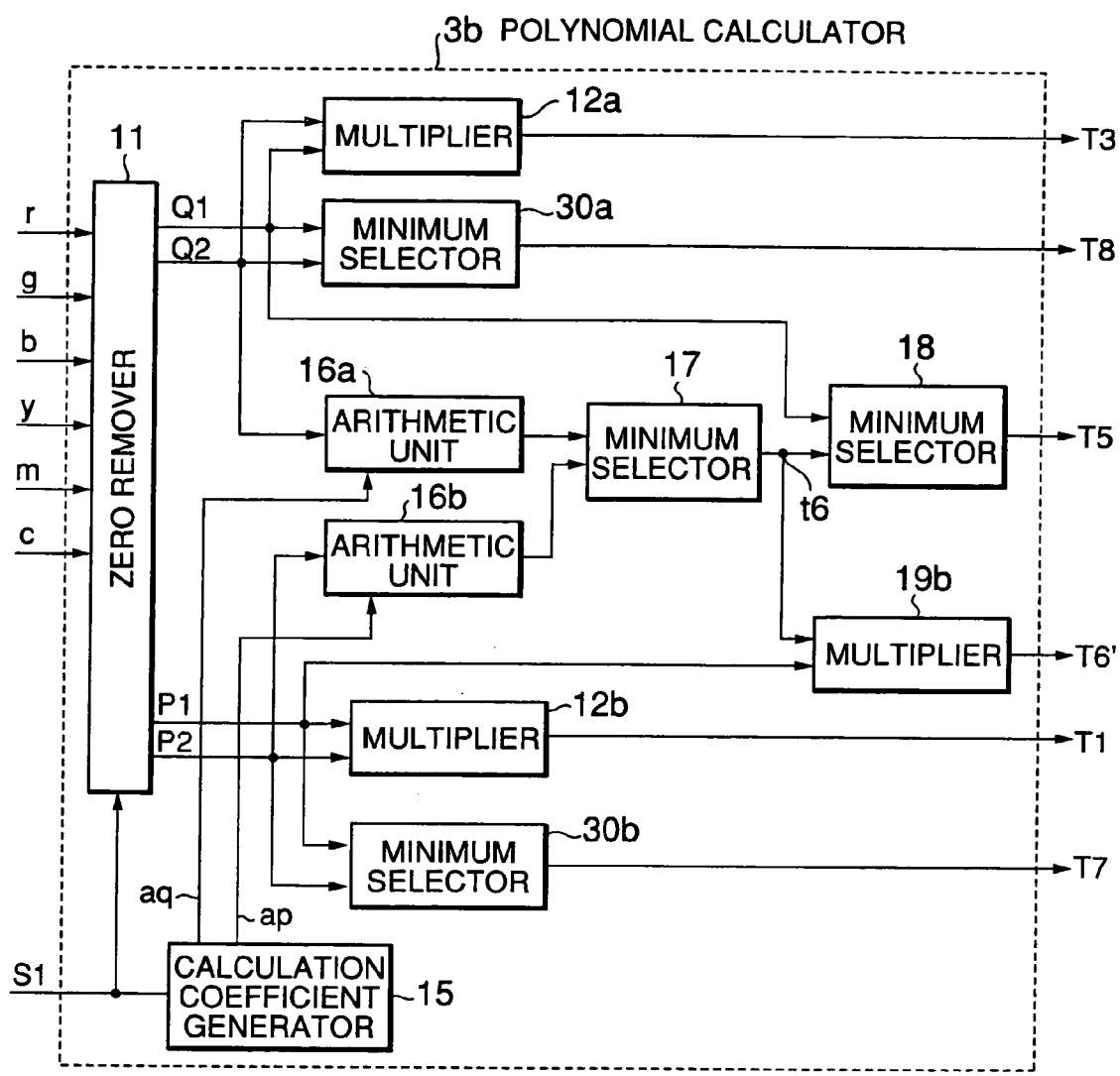
FIG. 33 is a block diagram showing another example of configuration of a polynomial calculator in a color conversion device of Embodiment 21.

FIG. 33 is a block diagram showing another example of configuration of the polynomial calculator 3b. In the drawing, reference numerals 11, 12a, 12b, 15 to 18, 30a, and 30b denote members identical to those of the polynomial calculator of Embodiment 17 shown in FIG. 25. Reference numeral 19b denotes a multiplier identical to that of Embodiment 5 shown in FIG. 16.

Next, the operation of the polynomial calculator 3b shown in FIG. 33 will be described. The operation of the zero remover 11, the operation for outputting T3=Q1*Q2 and T1=P1*P2 by means of the multipliers 12a and 12b, the operation for outputting T8=min(Q1, Q2), T7=min(P1, P2), by means of the minimum value selectors 30a and 300b, and the operation for outputting t6=min(aq*Q2, ap*P2) by means of the calculation coefficient generator 15, the calculators 16a and 16b and the minimum value selector 17, and the operation for outputting the minimum values T5=min(Q1, min(aq*Q2, ap*P2)) between Q1 and t6 by means of the minimum value selector 18 are identical to those of Embodiment 17 described above with reference to FIG. 25. Thus, detailed explanation thereof will be omitted.

The output t6=min(aq*Q2, ap*P2) from the minimum value selector 17 is also supplied to the multiplier 19b, which also receives the data P1 from the zero remover 11, and performs multiplication P1 by t6=min(aq*Q2, ap*P2), and outputs the product T6'=P1*min(aq*Q2, ap*P2). Accordingly, the polynomial data T1, T3, T5, T7, T8 and T6' are outputted from the polynomial calculator shown in FIG. 33, and these outputs of the polynomial calculator are sent to the matrix calculator 4c or 4d.

Thus, according to the polynomial calculator 3b described with reference to FIG. 33, the formula used for determining the image data R, G and B obtained by color conversion by the method described with reference to FIG. 1 in connection with Embodiment 1 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ r*hry \\ m*hrm \\ y*hgy \\ c*hgc \\ m*hbm \\ c*hbc \end{bmatrix} + \begin{bmatrix} \alpha \\ \alpha \\ \alpha \end{bmatrix} \quad (21)$$

Here, for (Eij), i=1 to 3, and j=1 to 3, and for (Fij), i=1 to 3, and j=1 to 24, and $hry=\min(aq1*g, ap1*m)$, $hrm=\min(aq2*b, ap2*y)$, $hgy=\min(aq3*r, ap3*c)$, $hgc=\min(aq4*b, ap4*y)$, $hbm=\min(aq5*r, ap5*c)$, and $hbc=\min(aq6*g, ap6*m)$, and aq1 to aq6 and ap1 to ap6 indicate calculation coefficients generated by the calculation coefficient generator shown in FIG. 33.

The difference between the number of calculation terms in the formula (21) and the number of calculation terms in FIG. 33 is that FIG. 33 shows a method of calculation for each pixel excluding data resulting in the calculation terms which are of a value zero, while the formula (21) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-four calculation terms in the formula (21) except the six calculation terms of m*y, b*r, min(b, r), min(m, y), min(r, hrm), and m*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (21) can be reduced to six effective data, and this reduction is achieved by exploiting a characteristic of the hue data. The combination of effective data is changed according to image data of the target pixel. For all image data, all the polynomial data can be effective.

The relations between the six hues and the second-order calculation terms y*hry, y*hgy, c*hgc, c*hbc, m*hbm, and m*hrm, which are product terms based on the comparison-result data and the hue data are identical to those shown in FIGS. 17A to 17F. Only y*hry is an effective second-order term for red-yellow. Similarly, only y*hgy is an effective term for yellow-green; c*hgc for green-cyan; c*hbc for cyan-blue; m*hbm for blue-magenta; and m*hrm for magenta-red.

FIGS. 34A and 34B respectively show relations between the six hues and inter-hue areas and effective calculation terms. Thus, if the coefficient generator changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3b are changed, part of the inter-hue area where a calculation term in the inter-hue area is effective can be changed without giving any influence to the other hues.

As apparent from the foregoing, by changing the coefficients of the product terms and the first-order terms using comparison-result data based on the hue data, it is possible to adjust only the target hue, among the six hues of red, blue, green, yellow, cyan and magenta, without affecting other hues. Moreover, by changing the coefficients relating to the first-order and second-order terms relating to the inter-hue areas, it is possible to independently correct the inter-hue areas of red-yellow, yellow-green, green-cyan, cyan-blue, blue-magenta, and magenta-red, to change the six inter-hue areas. By using both of the first-order and second-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 21, the color conversion is performed on the input image data R, G, and B, so that it is possible to achieve good color reproduction in a display device, such a monitor, or an image processing device using image data represented by R, G, and B, and greater advantages can be obtained.

In the above-description of Embodiment 21, hardware is used to perform the processing of the configuration of FIG. 33. Identical processing can be performed by software, and an effect identical to that of Embodiment 21 can be obtained.

Embodiment 22

According to the polynomial calculator 3b described with reference to FIG. 33 in connection with Embodiment 21, the formula used for determining the complementary color data C, M and Y obtained by color conversion by the method described with reference to FIG. 29 in connection with Embodiment 18 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ y*hry \\ m*hrm \\ y*hgy \\ c*hgc \\ m*hbm \\ c*hbc \end{bmatrix} + \begin{bmatrix} \alpha \\ \alpha \\ \alpha \end{bmatrix} \quad (22)$$

Here, for (Eij), i =1 to 3, and j=1 to 3, and for (Fij), i=1 to 3, and j=1 to 24, and $hry=\min(aq1*g, ap1*m)$, $hrm=\min(aq2*b, ap2*y)$, $hgy=\min(aq3*r, ap3*c)$, $hgc=\min(aq4*b, ap4*y)$, $hbm=\min(aq5*r, ap5*c)$, and $hbc=\min(aq6*g, ap6*m)$, and aq1 to aq6 and ap1 to ap6 indicate calculation coefficients generated by the calculation coefficient generator 15 shown in FIG. 33.

The difference between the number of calculation terms in the formula (22) and the number of calculation terms in FIG. 33 is that FIG. 33 shows a method of calculation for each pixel excluding data resulting in the calculation terms which are of a value zero, while the formula (22) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-four calculation terms in the formula (22) except the six calculation terms of m*y, b*r, min(b, r), min(m, y), min(r, hrm), and m*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (22) can be reduced to six effective data, and this reduction is achieved by exploiting a characteristic of the hue data. The combination of effective data is changed according to image data of the target pixel. For all image data, all the polynomial data can be effective.

The calculation terms by the polynomial calculator according to the formula (22) are identical to those of the formula (21) in Embodiment 21, and the relations between the six hues and inter-hue areas, and the effective calculation terms is identical to those shown in FIGS. 34A and 34B. Accordingly, if the coefficient generator changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3b are changed, part of the inter-hue area where a calculation term in the inter-hue area is effective can be changed without giving any influence to the other hues.

As apparent from the foregoing, by changing the coefficients of the product terms and the calculation terms using comparison-result data based on the hue data, it is possible to adjust only the target hue, among the six hues of red, blue, green, yellow, cyan and magenta, without affecting other hues. Moreover, by changing the coefficients relating the first-order and second-order terms, it is possible to independently correct the inter-hue areas of red-yellow, yellow-green, green-cyan, cyan-blue, blue-magenta, and magenta-red, to change the six inter-hue areas. Furthermore, by using both of the first-order and second-order calculation terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 22, the color conversion is performed on the complementary color data obtained by conversion from the input image data R, G, and B, so that it is possible to achieve good color reproduction in color conversion of printing data C, M and Y in a printing device or the like, and greater advantages can be obtained.

Embodiment 23

According to the polynomial calculator 3b described with reference to FIG. 33 in connection with Embodiment 21, the formula used for determining the image data R, G and B obtained by color conversion by the method described with reference to FIG. 30 in connection with Embodiment 19 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ y*hry \\ m*hrm \\ y*hgy \\ c*hgc \\ m*hbm \\ c*hbc \\ \alpha \end{bmatrix} \quad (23)$$

Here, for (Eij), i=1 to 3, and j=1 to 3, and for (Fij), i=1 to 3, and j=1 to 25.

The difference between the number of calculation terms in the formula (23) and the number of calculation terms in the polynomial calculator in FIG. 33 is that FIG. 33 shows a method of calculation for each pixel excluding data resulting in the calculation terms which are of a value zero, while the formula (23) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-five calculation terms in the formula (23) except the seven calculation terms of m*y, b*r, min(b, r), min(m, y), min(r, hrm), m*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (23) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms, the calculation terms using comparison-result data based on the hue data, and the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value $\alpha$ which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 23, the color conversion is performed on the input image data R, G, and B, so that it is possible to achieve good color reproduction in a display device such as a monitor, or an image processing device using image data represented by R, G and B, and greater advantages can be obtained.

Embodiment 24

According to the polynomial calculator $3b$ described with reference to FIG. 33 in connection with Embodiment 21, the formula used for determining the complementary color data C, M and Y obtained by color conversion by the method described with reference to FIG. 32 in connection with Embodiment 20 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(r, hry) \\ \min(r, hrm) \\ \min(g, hgy) \\ \min(g, hgc) \\ \min(b, hbm) \\ \min(b, hbc) \\ y*hry \\ m*hrm \\ y*hgy \\ c*hgc \\ m*hbm \\ c*hbc \\ \alpha \end{bmatrix} \quad (24)$$

Here, for (Eij), i=1 to 3, and j=1 to 3, and for (Fij), i=1 to 3, and j=1 to 25.

The difference between the number of calculation terms in the formula (24) and the number of calculation terms in the polynomial calculator in FIG. 33 is that FIG. 33 shows a method of calculation for each pixel excluding data resulting in the calculation terms which are of a value zero, while the formula (24) represents a general formula for a set of pixels. In other words, the six hue data have such a characteristic that at least two of them are zero, as in the above-described embodiments. For example, in the case where the value of the identification code S1 is 0, with the maximum and minimum values $\beta$ and $\alpha$ shown being respectively Ri and Gi, equations g=0 and c=0 hold. Accordingly, the twenty-five calculation terms in the formula (24) except the seven calculation terms of m*y, b*r, min(b, r), min(m, y), min(r, hrm), m*hrm, and $\alpha$, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (24) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms, the calculation terms using comparison-result data based on the hue data, and the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value $\alpha$ which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 24, the color conversion is performed on the complementary color data C, M and Y obtained by color conversion from the input image data R, G, and B, so that it is possible to achieve good color reproduction in color conversion of printing data C, M and Y in a printing device or the like, and greater advantages can be obtained.

Embodiment 25

Figure 35:
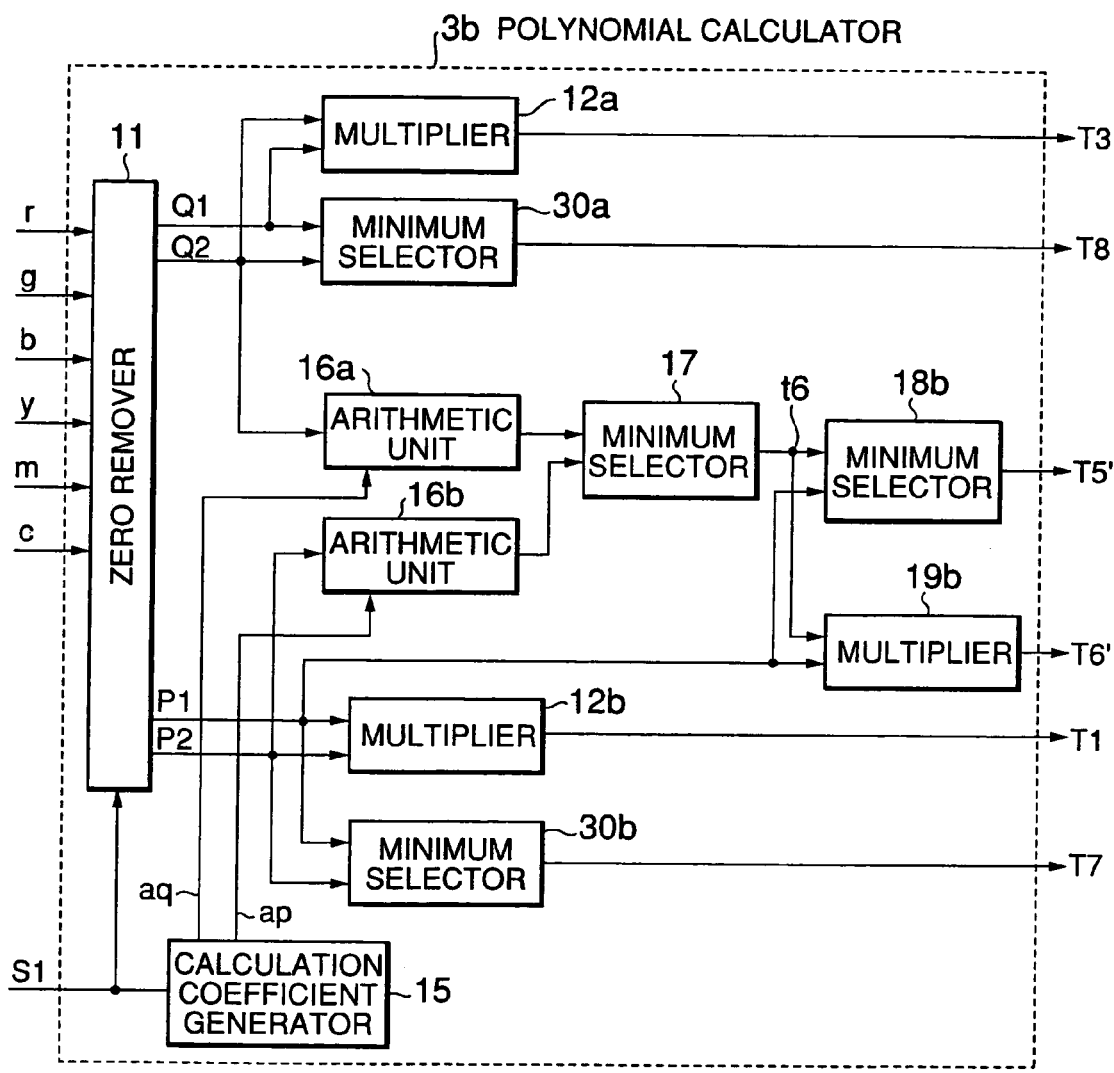
FIG. 35 is a block diagram showing another example of configuration of a polynomial calculator in a color conversion device of Embodiment 25.

As another example, the polynomial calculator $3b$ may be formed as shown in FIG. 35, to calculate the polynomial data.

FIG. 35 is a block diagram showing another example of configuration of the polynomial calculator $3b$. In the drawing, reference numerals 11, 12a, 12b, 15 to 17, 30a, and 30b denote members identical to those of the polynomial calculator of Embodiment 17 shown in FIG. 25. Reference numerals 18b and 19b denotes members identical to those of Embodiment 9 shown in FIG. 19.

Next, the operation of the polynomial calculator $3b$ shown in FIG. 35 will be described. The operation of the zero remover 11, and the operation for outputting T3=Q1*Q2, and T1=P1*P2 by means of the multipliers 12a and 12b, the operation for outputting T8=min(Q1, Q2), and T7=min(P1, P2) by means of the minimum value selectors 30a and 30b, and the operation for outputting t6=min(aq*Q2, ap*P2) by means of the calculation coefficient generator 15, the calculators 16a and 16b and the minimum value selector 17 are identical to those of Embodiment 17 described above with reference to FIG. 25. Thus, detailed explanation thereof will be omitted.

The output t6=min(aq*Q2, ap*P2) from the minimum value selector 17 is supplied to the minimum value selector 18b and the multiplier 19b. The minimum value selector 18b also receives the output data P1 from the zero remover 11, and outputs the minimum value T5'=min(P1, min(aq*Q2, ap*P2)) between P1 and t6=min(aq*Q2, ap*P2). The multiplier 19b receives the data P1 from the zero remover 11, and the output t6 from the minimum value selector 17, and performs multiplication P1 by t6=min(aq*Q2, ap*P2), and outputs the product T6'=P1*min(aq*Q2, ap*P2). Accordingly, the polynomial data T1, T3, T7, T8, T5' and T6' are outputted from the polynomial calculator shown in FIG. 35, and these outputs of the polynomial calculator are sent to the matrix calculator 4c or 4d.

Thus, according to the polynomial calculator 3b described with reference to FIG. 35, the formula used for determining the image data R, G and B obtained by color conversion by the method described with reference to FIG. 24 in connection with Embodiment 17 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ y*hry \\ y*hgy \\ c*hgc \\ c*hbc \\ m*hbm \\ m*hrm \end{bmatrix} + \begin{bmatrix} \alpha \\ \alpha \\ \alpha \end{bmatrix} \quad (25)$$

Here, for (Eij), i=1 to 3, and j=1 to 3, and for (Fij), i=1 to 3, and j=1 to 24, and $hry$=min($aq1*g$, $ap1*m$), $hrm$=min($aq2*b$, $ap2*y$), $hgy$=min($aq3*r$, $ap3*c$), $hgc$=min($aq4*b$, $ap4*y$), $hbm$=min($aq5*r$, $ap5*c$), and $hbc$=min($aq6*g$, $ap6*m$), and aq1 to aq6 and ap1 to ap6 indicate calculation coefficients generated by the calculation coefficient generator 15 shown in FIG. 35.

The difference between the number of calculation terms in the formula (25) and the number of calculation terms in FIG. 35 is that FIG. 35 shows a method of calculation for each pixel excluding data resulting in the calculation terms which are of a value zero, while the formula (25) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-four calculation terms in the formula (25) except the six calculation terms of m*y, b*r, min(b, r), min(m, y), min(m, hrm), and m*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (25) can be reduced to six effective data, and this reduction is achieved by exploiting a characteristic of the hue data. The combination of effective data is changed according to image data of the target pixel. For all image data, all the polynomial data can be effective.

The relations between the six hues and the first-order calculation terms min(y, hry), min(y, hgy), min(c, hgc), min(c, hbc), min(m, hbm) and min(m, hrm), based on the comparison-result data are identical to those shown in FIGS. 20A to 20F.

For red-yellow, only min(y, hry) is an effective first-order term. Similarly, only min(y, hgy) is an effective term for yellow-green; min(c, hgc) for green-cyan; min(c, hbc) for cyan-blue; min(m, hbm) for blue-magenta; and min(m, hrm) for magenta-red.

The relationship between the six hues and second-order calculation terms y*hry, y*hgy, c*hgc, c*hbc, m*hbm, and m*hrm which are product terms based on the comparison-result data and the hue data is identical to that described with reference to FIGS. 17A to 17F. Only y*hry is an effective second-order calculation term for red-yellow. Similarly, only y*hgy is an effective term for yellow-green; c*hgc for green-cyan; c*hbc for cyan-blue; m*hbm for blue-magenta; and m*hrm for magenta-red.

FIGS. 31A and 31B respectively show relations between the six hues and inter-hue areas and effective calculation terms. Thus, if the coefficient generator changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3b are changed, part of the inter-hue area where a calculation term in the inter-hue area is effective can be changed without giving any influence to the other hues.

As apparent from the foregoing, by changing the coefficients of the product terms and the calculation terms using comparison-result data based on the hue data, it is possible to adjust only the target hue, among the six hues of red, blue, green, yellow, cyan and magenta, without affecting other hues. Moreover, by changing the coefficients relating the first-order and second-order terms relating to the inter-hue areas it is possible to independently correct the inter-hue areas of red-yellow, yellow-green, green-cyan, cyan-blue, blue-magenta, and magenta-red, to change the six inter-hue areas. Furthermore, by using both of the first-order and second-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 9, the color conversion is performed on the input image data R, G, and B, so that it is possible to achieve good color reproduction in a display device, such as a monitor, or an image processing device using image data represented by R, G, and B, and greater advantages can be obtained.

In the above-description of Embodiment 25, hardware is used to perform the processing of the configuration of FIG. 35. Identical processing can be performed by software, and an effect identical to that of Embodiment 25 can be obtained.

Embodiment 26

According to the polynomial calculator 3*b* described with reference to FIG. 35 in connection with Embodiment 25, the formula used for determining the complementary color data C, M and Y obtained by color conversion by the method described with reference to FIG. 29 in connection with Embodiment 18 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ y*hry \\ y*hgy \\ c*hgc \\ c*hbc \\ m*hbm \\ m*hrm \end{bmatrix} + \begin{bmatrix} \alpha \\ \alpha \\ \alpha \end{bmatrix}$$

(26)

Here, for (Eij), i=1 to 3, and j=1 to 3, and for (Fij), i=1 to 3, and j=1 to 24, and $hry = \min(aq1*g, ap1*m)$, $hrm = \min(aq2*b, ap2*y)$, $hgy = \min(aq3*r, ap3*c)$, $hgc = \min(aq4*b, ap4*y)$, $hbm = \min(aq5*r, ap5*c)$, and $hbc = \min(aq6*g, ap6*m)$, and aq1 to aq6 and ap1 to ap6 indicate calculation coefficients generated by the calculation coefficient generator 15 shown in FIG. 35.

The difference between the number of calculation terms in the formula (26) and the number of calculation terms in FIG. 35 is that FIG. 35 shows a method of calculation for each pixel excluding data resulting in the calculation terms which are of a value zero, while the formula (26) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-four calculation terms in the formula (26) except the six calculation terms of m*y, b*r, min(b, r), min(m, y), min(m, hrm), and m*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (26) can be reduced to six effective data, and this reduction is achieved by exploiting a characteristic of the hue data. The combination of effective data is changed according to image data of the target pixel. For all image data, all the polynomial data can be effective.

The calculation terms by the polynomial calculator according to the formula (26) are identical to those of the formula (25) in Embodiment 25, and the relations between the six hues and inter-hue areas, and the effective calculation terms is identical to those shown in FIGS. 36A and 36B. Accordingly, if the coefficient generator changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3*b* are changed, part of the inter-hue area where a calculation term in the inter-hue area is effective can be changed without giving any influence to the other hues.

As apparent from the foregoing, by changing the coefficients of the product terms and the calculation terms using comparison-result data based on the hue data, it is possible to adjust only the target hue, among the six hues of red, blue, green, yellow, cyan and magenta, without affecting other hues. Moreover, by changing the coefficients relating to the first-order and second-order terms relating to the inter-hue areas, it is possible to independently correct the inter-hue areas of red-yellow, yellow-green, green-cyan, cyan-blue, blue-magenta, and magenta-red, to change the six inter-hue areas. Furthermore, by using both of the second-order and first-order calculation terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 10, the color conversion is performed on the complementary color data obtained by conversion from the input image data R, G, and B, so that it is possible to achieve good color reproduction in color conversion of printing data C, M and Y in a printing device or the like, and greater advantages can be obtained.

Embodiment 27

According to the polynomial calculator 3b described with reference to FIG. 35 in connection with Embodiment 25, the formula used for determining the image data R, G and B obtained by color conversion by the method described with reference to FIG. 30 in connection with Embodiment 19 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ y*hry \\ y*hgy \\ c*hgc \\ c*hbc \\ m*hbm \\ m*hrm \\ \alpha \end{bmatrix} \quad (27)$$

Here, for (Eij), i=1 to 3, and j=1 to 3, and for (Fij), i=1 to 3, and j=1 to 25.

The difference between the number of calculation terms in the formula (27) and the number of calculation terms in the polynomial calculator in FIG. 35 is that FIG. 35 19 shows a method of calculation for each pixel excluding data resulting in the calculation terms which are of a value zero, while the formula (27) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-five calculation terms in the formula (27) except the seven calculation terms of m*y, b*r, min(b, r), min(m, y), min(m, hrm), m*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (27) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms, the calculation terms using comparison-result data based on the hue data, and the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 27, the color conversion is performed on the input image data R, G, and B, so that it is possible to achieve good color reproduction in a display device such as a monitor, or an image processing device using image data represented by R, G and B, and greater advantages can be obtained.

Embodiment 28

According to the polynomial calculator 3b described with reference to FIG. 35 in connection with Embodiment 25, the formula used for determining the complementary color data C, M and Y obtained by color conversion by the method described with reference to FIG. 32 in connection with Embodiment 20 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ y*hry \\ y*hgy \\ c*hgc \\ c*hbc \\ m*hbm \\ m*hrm \\ \alpha \end{bmatrix} \quad (28)$$

Here, for (Eij), i=1 to 3, and j=1 to 3, and for (Fij), i=1 to 3, and j=1 to 25.

The difference between the number of calculation terms in the formula (28) and the number of calculation terms in the polynomial calculator in FIG. 35 is that FIG. 35 shows a method of calculation for each pixel excluding data resulting in the calculation terms which are of a value zero, while the formula (28) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-five calculation terms in the formula (28) except the seven calculation terms of m*y, b*r, min(b, r), min(m, y), min(m, hrm), m*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (28) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms, the calculation terms using comparison-result data based on the hue data, and the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 28, the color conversion is performed on the complementary color data C, M and Y obtained by color conversion from the input image data R, G, and B, so that it is possible to achieve good color reproduction in color conversion of printing data C, M and Y in a printing device or the like, and greater advantages can be obtained.

Embodiment 29

Figure 37:
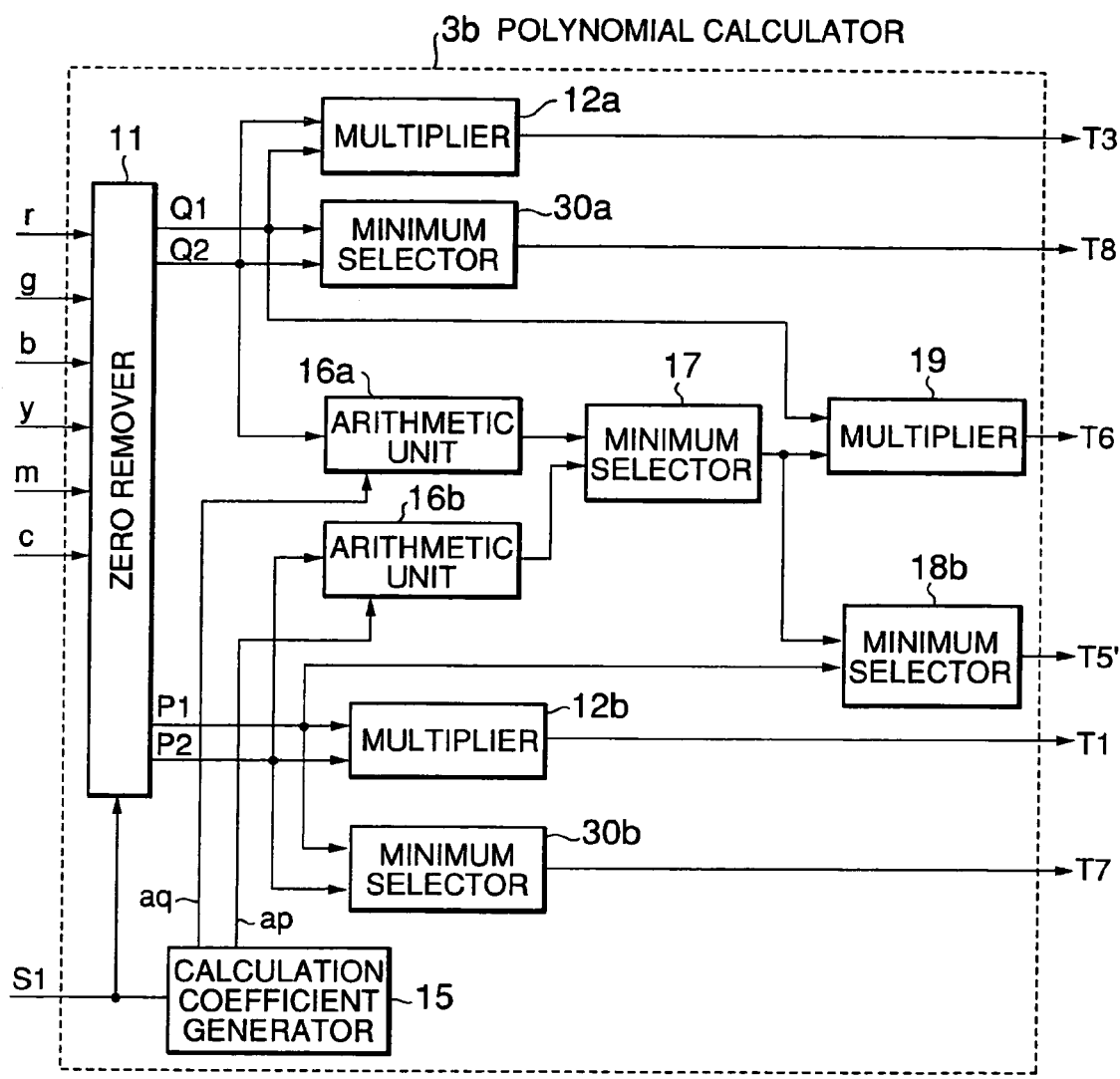
FIG. 37 is a block diagram showing another example of configuration a polynomial calculator in the color conversion device of Embodiment 29.
Figure 39:
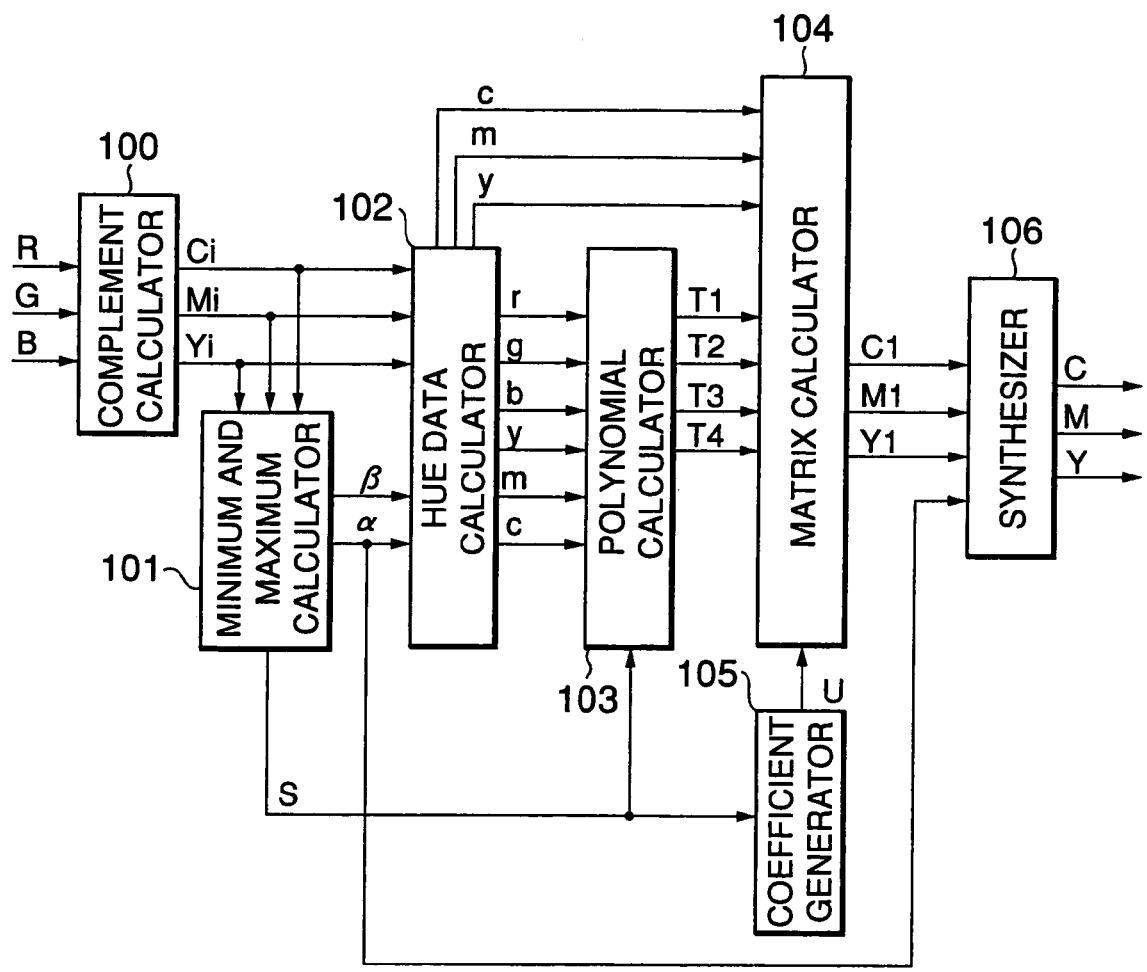
FIG. 39 is a block diagram showing an example of configuration of a conventional color conversion device.
Figure 40A:
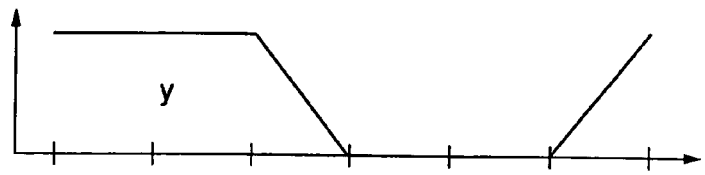
FIGS. 40A to 40F are schematic diagrams showing the relations between six hues and hue data in the conventional color conversion device.
Figure 40B:
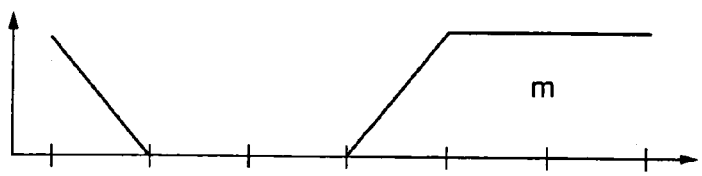
Figure 40C:
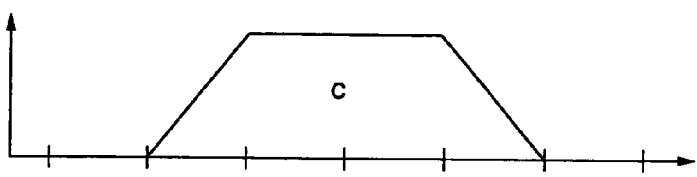
Figure 40D:
Figure 40E:
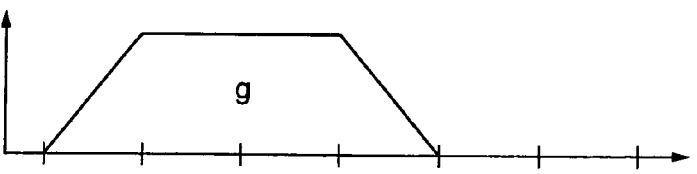
Figure 40F:
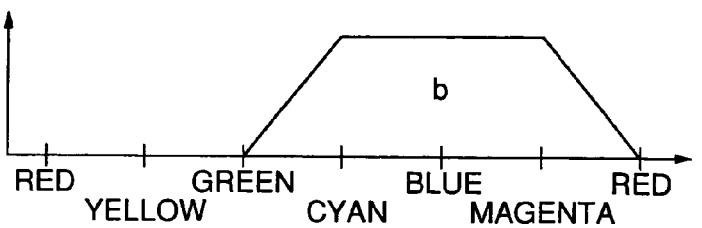
Figure 41A:
FIGS. 41A to 41F are schematic diagrams showing the relations between the hues and the product terms in a matrix calculator in the conventional color conversion device.
Figure 41B:
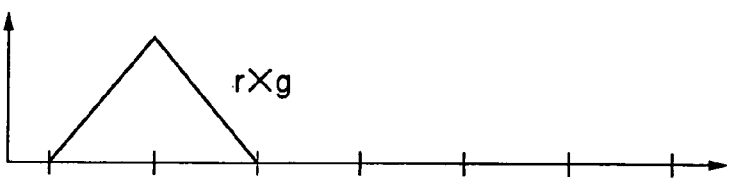
Figure 41C:
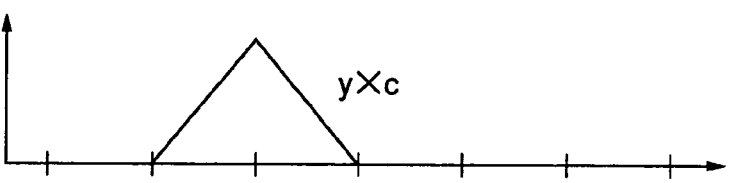
Figure 41D:
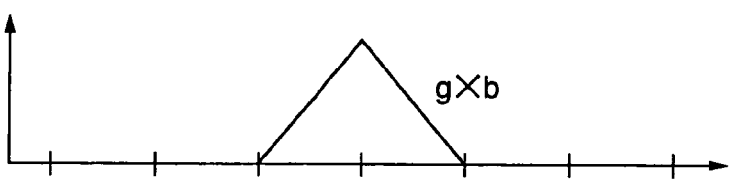
Figure 41E:
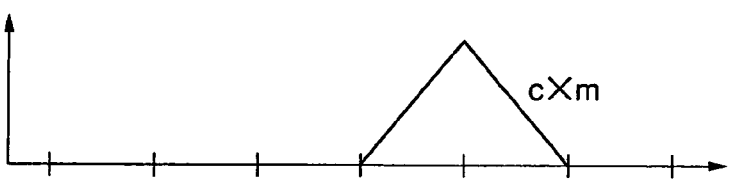
Figure 41F:
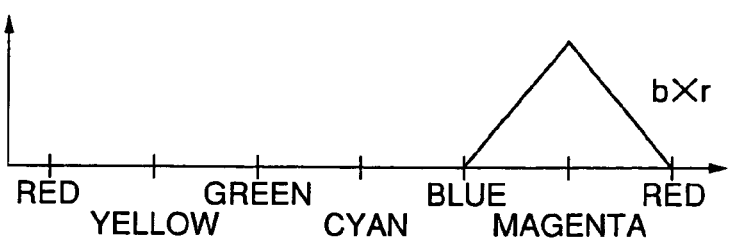

As another example, the polynomial calculator 3b may be formed as shown in FIG. 37, to calculate the polynomial data.

FIG. 37 is a block diagram showing another example of configuration of the polynomial calculator 3b. In the drawing, reference numerals 11, 12a, 12b, 15 to 17, 19, 30a and 30b denote members identical to those of the polynomial calculator of Embodiment 17 shown in FIG. 25. Reference numeral 18b denotes a member identical to that of Embodiment 13 shown in FIG. 22.

Next, the operation of the polynomial calculator 3b shown in FIG. 37 will be described. The operation of the zero remover 11 for outputting T3=Q1*Q2, and T1=P1*P2, the operation of the minimum value selectors 30a and 30b for outputting T8=min(Q1, Q2), and T7=min(P1, P2), and the operation for outputting t6=min(aq*Q2, ap*P2) by means of the calculation coefficient generator 15, the calculators 16a and 16b and the minimum value selector 17 are identical to those of Embodiment 17 described with reference to FIG. 25. Thus, detailed explanation thereof will be omitted.

The output t6=min(aq*Q2, ap*P2) from the minimum value selector 17 is supplied to the minimum value selector 18b and the multiplier 19. The minimum value selector 18b also receives the output data P1 from the zero remover 11, and outputs the minimum value T5'=min(P1, min(aq*Q2, ap*P2)) between P1 and t6=min(aq*Q2, ap*P2).

The multiplier 19 receives the data Q1 from the zero remover 11, and the output t6 from the minimum value selector 17, and performs multiplication Q1 by t6=min(aq*Q2, ap*P2), and outputs the product T6=Q1*min(aq*Q2, ap*P2). Accordingly, the polynomial data T1, T3, T7, T8, T6 and T5' are outputted from the polynomial calculator shown in FIG. 37, and these outputs of the polynomial calculator are sent to the matrix calculator 4c or 4d.

Thus, according to the polynomial calculator 3b described with reference to FIG. 37, the formula used for determining the image data R, G and B obtained by color conversion by the method described with reference to FIG. 24 in connection with Embodiment 17 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ r*hry \\ g*hgy \\ g*hgc \\ b*hbc \\ b*hbm \\ r*hrm \end{bmatrix} + \begin{bmatrix} \alpha \\ \alpha \\ \alpha \end{bmatrix} \quad (29)$$

Here, for (Eij), i=1 to 3, and j=1 to 3, and for (Fij), i=1 to 3, and j=1 to 24, and $hry=\min(aq1*g, ap1*m)$, $hrm=\min(aq2*b, ap2*y)$, $hgy=\min(aq3*r, ap3*c)$, $hgc=\min(aq4*b, ap4*y)$, $hbm=\min(aq5*r, ap5*c)$, and $hbc=\min(aq6*g, ap6*m)$, and aq1 to aq6 and ap1 to ap6 indicate calculation coefficients generated by the calculation coefficient generator 15 shown in FIG. 37.

The difference between the number of calculation terms in the formula (29) and the number of calculation terms in FIG. 37 is that FIG. 37 shows a method of calculation for each pixel excluding data resulting in the calculation terms which are of a value zero, while the formula (29) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations equations g=0 and c=0 hold hold. Accordingly, the twenty-four calculation terms in the formula (29) except the six calculation terms of m*y, b*r, min(b, r), min(m, y), min(m, hrm), and r*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (29) can be reduced to six effective data, and this reduction is achieved by exploiting a characteristic of the hue data. The combination of effective data is changed according to image data of the target pixel. For all image data, all the polynomial data can be effective.

The relations between the six hues and first-order terms min(y, hry), min(y, hgy), min(c, hgc), min(c, hbc), min(m, hbm) and min(m, hrm), based on the comparison-result data are identical to those described with reference to FIGS. 20A to 20F. The relations between the six hues and the second-order terms r*hry, g*hgy, g*hgc, b*hbc, b*hbm, and r*hrm which are product terms based on the comparison-result data and the hue data are identical to those described with reference to FIGS. 10A to 10F. Accordingly, it can be understood that the first-order terms and second-order terms using comparison-result data contribute to changes in the inter-hue areas of red-yellow, yellow-green, green-cyan, cyan-blue, blue-magenta, and magenta-red. It is also understood that only min(y, hry) and r*hry are effective first-order and second-orders terms for red-yellow; min(y, hgy) and g*hgy for yellow-green; min (c, hgc) and g*hgc for green-cyan; min(c, hbc) and b*hbc for cyan-blue; min(m, hbm) and b*hbm for blue-magenta; and min(m, hrm) and r*hrm for magenta-red.

FIGS. 38A and 38B respectively show relations between the six hues and inter-hue areas and effective calculation terms. Thus, if the coefficient generator changes coefficients for a calculation term effective for a hue or an inter-hue area to be adjusted, only the target hue can be adjusted, and the inter-hue areas can also be corrected. Further, if coefficients generated by the calculation coefficient generator 15 in the polynomial calculator 3b are changed, part of the inter-hue area where a calculation term in the inter-hue area is effective can be changed without giving any influence to the other hues.

As apparent from the foregoing, by changing the coefficients of the product terms and the calculation terms using comparison-result data based on the hue data, it is possible to adjust only the target hue, among the six hues of red, blue, green, yellow, cyan and magenta, without affecting other hues. Moreover, by changing the coefficients for the first-order and second-order terms relating to the inter-hue areas, it is possible to independently correct the inter-hue areas of red-yellow, yellow-green, green-cyan, cyan-blue, blue-magenta, and magenta-red, to change the six inter-hue areas. Furthermore, by using both of the first-order and second-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 13, the color conversion is performed on the input image data R, G, and B, so that it is possible to achieve good color reproduction in a display device, such a monitor, or an image processing device using image data represented by R, G, and B, and greater advantages can be obtained.

In the above-description of Embodiment 29, hardware is used to perform the processing of the configuration of FIG. 37. Identical processing can be performed by software, and an effect identical to that of Embodiment 29 can be obtained.

Embodiment 30

According to the polynomial calculator 3b described with reference to FIG. 37 in connection with Embodiment 29, the formula used for determining the complementary color data C, M and Y obtained by color conversion by the method described with reference to FIG. 29 in connection with Embodiment 18 will be as follows:

$$\begin{bmatrix} C \\ M \\ Y \end{bmatrix} = (Eij)\begin{bmatrix} c \\ m \\ y \end{bmatrix} + (Fij)\begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ r*hry \\ g*hgy \\ g*hgc \\ b*hbc \\ b*hbm \\ r*hrm \end{bmatrix} + \begin{bmatrix} \alpha \\ \alpha \\ \alpha \end{bmatrix} \quad (30)$$

Here, for (Eij), i=1 to 3, and j=1 to 3, and for (Fij), i=1 to 3, and j=1 to 24, and $hry=\min(aq1*g, ap1*m)$, $hrm=\min(aq2*b, ap2*y)$, $hgy=\min(aq3*r, ap3*c)$, $hgc=\min(aq4*b, ap4*y)$, $$hbm=\min(aq5*r, ap5*c), \text{ and}$$

$$hbc=\min(aq6*g, ap6*m), \text{ and}$$

aq1 to aq6 and ap1 to ap6 indicate calculation coefficients generated by the calculation coefficient generator 15 shown in FIG. 37.

The difference between the number of calculation terms in the formula (30) and the number of calculation terms in FIG. 37 is that FIG. 37 shows a method of calculation for each pixel excluding data resulting in the calculation terms which are of a value zero, while the formula (30) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-four calculation terms in the formula (30) except the six calculation terms of m*y, b*r, min(b, r), min(m, y), min(m, hrm), and r*hrm, i.e., the eighteen data are of a value zero. Similarly, in the case where the identification code is of the other values, since at least two data among the hue data are of a value zero, the eighteen data (twenty-four calculation terms minus the six calculation terms) are of a value zero. Accordingly, twenty-four polynomial data for one pixel of the formula (30) can be reduced to six effective data, and this reduction is achieved by exploiting a characteristic of the hue data. The combination of effective data is changed according to image data of the target pixel. For all image data, all the polynomial data can be effective.

The calculation terms by the polynomial calculator according to the formula (30) are identical to those of the formula (13) in Embodiment 29, and the relations between the six hues and inter-hue areas, and the effective calculation terms is identical to those shown in FIGS. 38A and 38B. Accordingly, if the coefficient generator changes coefficients for a calculation term effective for a hue or an inter-hue area to be adjusted, only the target hue can be adjusted, and the inter-hue areas can also be corrected.

Further, if coefficients generated by the calculation coefficient generator 15 in the polynomial calculator 3b are changed, part of the inter-hue area where a calculation term in the inter-hue area is effective can be changed without giving any influence to the other hues.

As apparent from the foregoing, by changing the coefficients of the product terms and the calculation terms using comparison-result data based on the hue data, it is possible to adjust only the target hue, among the six hues of red, blue, green, yellow, cyan and magenta, without affecting other hues. Moreover, by changing the coefficients for the first-order and second-order terms relating to the inter-hue areas, it is possible to independently correct the inter-hue areas of red-yellow, yellow-green, green-cyan, cyan-blue, blue-magenta, and magenta-red, to change the six inter-hue areas. Furthermore, by using both of the second-order and first-order terms, it is possible to correct the non-linearity of image printing or the like with respect to chroma. Accordingly, it is possible to obtain a color conversion device or color conversion method with which the conversion characteristics can be changed flexibly, and which does not require a large-capacity memory. In addition, in the Embodiment 30, the color conversion is performed on the complementary color data obtained by conversion from the input image data R, G, and B, so that it is possible to achieve good color reproduction in color conversion of printing data C, M and Y in a printing device or the like, and greater advantages can be obtained.

Embodiment 31

According to the polynomial calculator 3b described with reference to FIG. 37 in connection with Embodiment 29, the formula used for determining the image data R, G and B obtained by color conversion by the method described with reference to FIG. 30 in connection with Embodiment 19 will be as follows:

$$\begin{bmatrix} R \\ G \\ B \end{bmatrix} = (Eij) \begin{bmatrix} r \\ g \\ b \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ r*hry \\ g*hgy \\ g*hgc \\ b*hbc \\ b*hbm \\ r*hrm \\ \alpha \end{bmatrix} \quad (31)$$

Here, for (Eij), i=1 to 3, and j=1 to 3, and for (Fij), i=1 to 3, and j=1 to 25.

The difference between the number of calculation terms in the formula (31) and the number of calculation terms in the polynomial calculator in FIG. 37 is that FIG. 37 shows a method of calculation for each pixel excluding data resulting in the calculation terms which are of a value zero, while the formula (31) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-five calculation terms in the formula (31) except the seven calculation terms of m*y, b*r, min(b, r), min(m, y), min(m, hrm), r*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (31) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms, the calculation terms using comparison-result data based on the hue data, and the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 31, the color conversion is performed on the input image data R, G, and B, so that it is possible to achieve good color reproduction in a display device such as a monitor, or an image processing device using image data represented by R, G and B, and greater advantages can be obtained.

Embodiment 32

According to the polynomial calculator 3b described with reference to FIG. 37 in connection with Embodiment 29, the formula used for determining the complementary color data C, M and Y obtained by color conversion by the method described with reference to FIG. 32 in connection with Embodiment 20 will be as follows:

$$\begin{bmatrix} C \\ M \\ Y \end{bmatrix} = (Eij) \begin{bmatrix} c \\ m \\ y \end{bmatrix} + (Fij) \begin{bmatrix} c*m \\ m*y \\ y*c \\ r*g \\ g*b \\ b*r \\ \min(c, m) \\ \min(m, y) \\ \min(y, c) \\ \min(r, g) \\ \min(g, b) \\ \min(b, r) \\ \min(y, hry) \\ \min(y, hgy) \\ \min(c, hgc) \\ \min(c, hbc) \\ \min(m, hbm) \\ \min(m, hrm) \\ r*hry \\ g*hgy \\ g*hgc \\ b*hbc \\ b*hbm \\ r*hrm \\ \alpha \end{bmatrix} \quad (32)$$

Here, for (Eij), i=1 to 3, and j=1 to 3, and for (Fij), i=1 to 3, and j=1 to 25.

The difference between the number of calculation terms in the formula (32) and the number of calculation terms in the polynomial calculator in FIG. 37 is that FIG. 37 shows a method of calculation for each pixel excluding data resulting in the calculation terms which are of a value zero, while the formula (32) represents a general formula for a set of pixels. In other words, the six hue data have such a characteristic that at least two of them are zero, as in the above-described embodiments. For example, in the case where the value of the identification code S1 is 0, with the maximum and minimum values β and α being respectively Ri and Gi, equations g=0 and c=0 hold. Accordingly, the twenty-five calculation terms in the formula (32) except the seven calculation terms of m*y, b*r, min(b, r), min(m, y), min(m, hrm), r*hrm, and α, i.e., the eighteen data are of a value zero. Similarly, in the case where the identification code is of the other values, since at least two data among the hue data are of a value zero, the eighteen data (twenty-five calculation terms minus the seven calculation terms) are of a value zero. Accordingly, twenty-five polynomial data for one pixel of the formula (32) can be reduced to seven effective data, and this reduction is achieved by exploiting a characteristic of the hue data. The combination of effective data is changed according to image data of the target pixel. For all image data, all the polynomial data can be effective.

As apparent from the foregoing, by changing the coefficients of the product terms, the calculation terms using comparison-result data based on the hue data, and the first-order and second-order terms relating to the specific inter-hue area, it is possible to adjust only the target hue, or inter-hue area among the six hues of red, blue, green, yellow, cyan and magenta, and inter-hue areas, without affecting other hues, and other inter-hue areas. By using both of the first-order and second-order calculation terms, it is possible to correct the non-linearity of image printing or the like with respect to chroma. By changing the coefficients relating to the minimum value α which is the achromatic data, it is possible to adjust only the achromatic component, without affecting the hue components, and, for instance, it is possible to select among the standard black, reddish black, bluish black, and the like. Accordingly, it is possible to obtain a color conversion device or color conversion method with which the conversion characteristics can be changed flexibly, and which does not require a large-capacity memory. In addition, in the Embodiment 32, the color conversion is performed on the complementary color data C, M and Y obtained by color conversion from the input image data R, G, and B, so that it is possible to achieve good color reproduction in color conversion of printing data C, M and Y in a printing device or the like, and greater advantages can be obtained.

The invention claimed is:

1. A color conversion device for converting first color data to second color data comprising:
   a first calculator for generating a plurality of hue data representing achromatic components of a first color data;
   a code generator for generating an identification code that indicates a hue of the first color data;
   a selector for selecting the hue data according to the identification code;
   a second calculator for generating calculation terms, each of which is effective for a specific hue, based on the selected hue data;
   a coefficient generator for providing matrix coefficients based on the identification code; and a matrix calculator that performs matrix calculation using the calculation terms and the matrix coefficients to produce the second color data.

2. The color conversion device according to claim 1, further comprising:

a minimum and maximum calculator for determining a minimum value and a maximum value of the first color data, wherein the code generator generates the identification code, based on the minimum value and the maximum value.

3. A color conversion method for converting first color data to second color data, the method comprising:

generating a plurality of hue data representing achromatic components of the first color data;

generating an identification code that indicates a hue of the first color data;

selecting the hue data according to the identification code;

generating calculation terms, each of which is effective for a specific hue, based on the selected hue data;

providing matrix coefficients based on the identification code; and performing matrix calculation using the calculation term and the matrix coefficients to produce the second color data.

4. The color conversion method according to claim 3, further comprising:

determining a minimum value and a maximum value of the first color data, wherein the identification code is generated based on the minimum value and the maximum value.

* * * * *